United States Patent [19]
Abe et al.

[11] Patent Number: 6,052,695
[45] Date of Patent: Apr. 18, 2000

[54] ACCURATE COMPLETION OF TRANSACTION IN COOPERATIVE TYPE DISTRIBUTED SYSTEM AND RECOVERY PROCEDURE FOR SAME

[75] Inventors: Kenichi Abe; Yukiharu Imafuku; Hitoshi Kirita; Toshiyuki Inoue; Hiroaki Takahashi; Yoji Shigehata; Yuichi Konno; Kazuaki Narata; Tadao Odanaka, all of Tokyo, Japan

[73] Assignee: NTT Data Communications Systems Corporation, Tokyo, Japan

[21] Appl. No.: 08/737,040

[22] PCT Filed: Feb. 27, 1996

[86] PCT No.: PCT/JP96/00440

§ 371 Date: Oct. 25, 1996

§ 102(e) Date: Oct. 25, 1996

[87] PCT Pub. No.: WO96/27157

PCT Pub. Date: Sep. 6, 1996

[30]     Foreign Application Priority Data

| Feb. 28, 1995 | [JP] | Japan | 7/064830 |
|---|---|---|---|
| Feb. 28, 1995 | [JP] | Japan | 7/064831 |
| Feb. 28, 1995 | [JP] | Japan | 7/064832 |
| Feb. 28, 1995 | [JP] | Japan | 7/064833 |
| Mar. 2, 1995 | [JP] | Japan | 7/068592 |
| Mar. 24, 1995 | [JP] | Japan | 7/091614 |

[51] Int. Cl.[7] ................................................ G06F 17/30
[52] U.S. Cl. ................... 707/202; 707/201; 395/182.13; 395/182.18; 395/185.02; 395/670; 395/186
[58] Field of Search ................................. 707/618, 201, 707/202; 395/182.13, 182.18, 185.02, 670, 186

[56]         References Cited

U.S. PATENT DOCUMENTS

| 4,819,159 | 4/1989 | Shipley et al. . | |
| 5,095,421 | 3/1992 | Freund . | |
| 5,452,445 | 9/1995 | Hallmark et al. | 707/104 |

(List continued on next page.)

FOREIGN PATENT DOCUMENTS

| 578406A1 | 12/1992 | European Pat. Off. | G06F 17/30 |
| 0578406A1 | 1/1994 | European Pat. Off. . | |
| 1-194040 | 8/1989 | Japan | G06F 12/00 |

(List continued on next page.)

OTHER PUBLICATIONS

Author: Sadayuki Hikata; Title: Logical Architecture of Distributed Database System; Date: May 25, 1989; Pertinent pp.: 25–28.

Author: George Samaras et al. Title: "Two–Phase Commit Optimizations and Tradeoffs in the Commercial Environment", Proceedings of the International Conference on Data Engineering Date: Apr. 19, 1993 Pertinent pp.: 235,236.

*Primary Examiner*—Paul R. Lintz
*Assistant Examiner*—Jean M. Corrielus
*Attorney, Agent, or Firm*—Koda & Androlia

[57]              ABSTRACT

The transaction processing throughput of a system in which a plurality of servers cooperatively perform distributed processing of transactions is improved. The servers (1a, 1b, 1c, . . .) are connected to each other through a communication network (2), and a resources (16) and a log 18 are distributed over these servers. When one of the servers, e.g., the server (1a) receives a transaction, the server (1a) instructs the servers (1b, 1c, . . .) over which the resource 16 relating to this transaction are distributed to update their resources, acquires the log data representing the updating contents and stores the log data in its log (18)

The servers (1b, 1c, . . .) update the resources in accordance with the instruction. Even when a fault occurs in one of the servers (1b, 1c, . . .) during the transaction processing so that the updating of the resources has not been executed, the system assumes that all the resource has been updated and proceeds to processing the following transaction. The server in which the fault acquires the log data related to the failed transaction from the log (18) of the server (1a) after the server has restored from the fault, and correctly updates its own database (16) based on the log data. The log data storing method for the transaction processing, the log retrieving method for the recovery processing, and the method of judging whether or not the resources have been updated during the recovery processing are all improved and of high speed.

13 Claims, 40 Drawing Sheets

U.S. PATENT DOCUMENTS

| | | | |
|---|---|---|---|
| 5,465,328 | 11/1995 | Dievendorff et al. | 395/182.13 |
| 5,499,367 | 3/1996 | Bamford et al. | 707/202 |
| 5,581,750 | 12/1996 | Haderle et al. | 707/202 |
| 5,613,113 | 3/1997 | Goldring | 707/202 |
| 5,638,508 | 6/1997 | Kanai et al. | 395/182.18 |
| 5,682,527 | 10/1997 | Cooper et al. | 707/202 |
| 5,696,967 | 12/1997 | Hayashi et al. | 707/202 |
| 5,701,480 | 12/1997 | Raz | 395/671 |

FOREIGN PATENT DOCUMENTS

| | | | |
|---|---|---|---|
| 1-281543 | 11/1989 | Japan | G06F 12/00 |
| 2-43643 | 2/1990 | Japan | G06F 12/00 |
| 3-4339 | 1/1991 | Japan | G06F 12/00 |
| 4-184641 | 7/1992 | Japan | G06F 12/00 |
| 4-199339 | 7/1992 | Japan | G06F 12/00 |
| 5-143423 | 6/1993 | Japan | G06F 12/00 |

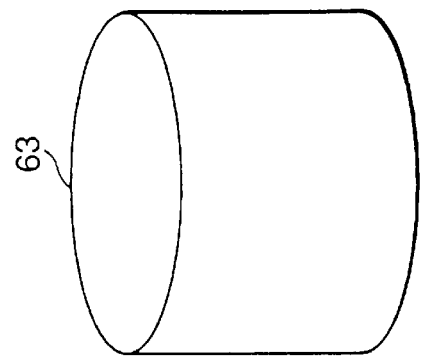
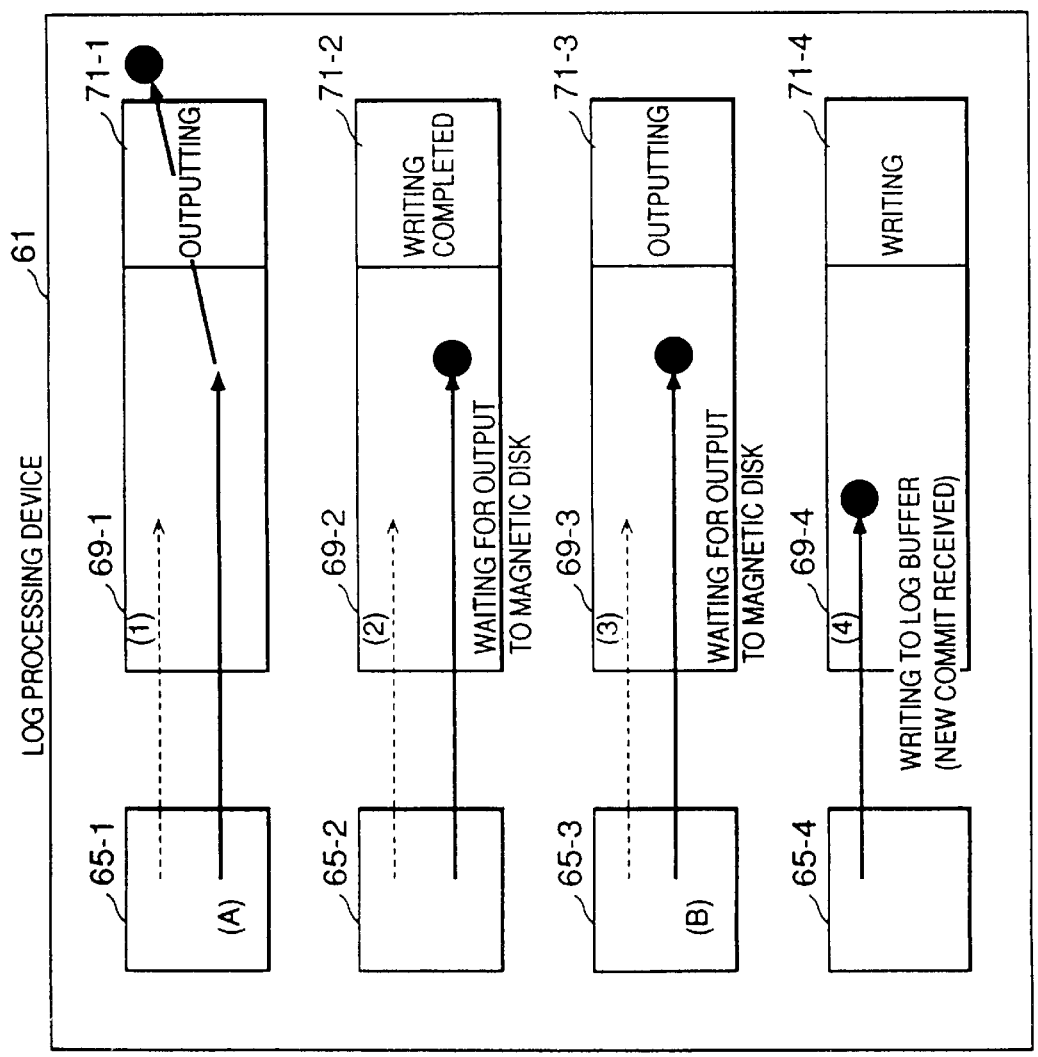
FIG. 22

FIG. 41(A)
FIG. 41(B)

ACCURATE COMPLETION OF TRANSACTION IN COOPERATIVE TYPE DISTRIBUTED SYSTEM AND RECOVERY PROCEDURE FOR SAME

FIELD OF THE INVENTION

The present invention generally relates to on-line data base processing such as procedures for performing bank deposits and transfers on-line, or procedures for performing airline reservations and ticket issue on-line; and in particular relates to technical improvements for completing such processing of transactions accurately and harmoniously in a cooperative type distributed system such as one in which a plurality of processing devices which are connected together by signal transmission circuits, buses, channels, or the like maintain a database which is divided into sections. The present invention further relates to an improved processing technique, for such an cooperative type distributed system, for making an entry in the log upon transaction commit, for recovery after a failure has occurred, and for referring to the log upon recovery.

BACKGROUND OF THE INVENTION

Processing for performing bank account deposits and transfers on-line may in practice, for example, consist of the sequence of procedures in which request messages are sent from terminals to a host, resources (in the present specification, "resources" is a general term for databases, files, memory tapes or the like) are accessed in the host and are processed, and answer messages are returned from the host to the terminals. These procedures as a whole constitute a single theoretical unit of on-line database processing, and this single theoretical unit is termed a "transaction".

A transaction changes the contents of the resources, but the content of the resources after this change must have a correct meaning from the point of view of the user. For this reason, a transaction must be either committed (completed) or aborted (completely not processed), but must not be left in a part way performed or fragmentary state.

Now, as one possibility for an on-line database processing system, there has been proposed a cooperative type distributed system in which a plurality of processing devices which are connected together by signal transmission circuits maintain a resource which is divided into sections, and cooperate so as to perform distributed processing of transactions. When this cooperative type distributed system is compared with a more usual system in which a single large sized mainframe computer performs centralized processing of the resources, it excels with regard to reduction of cost, dispersal of the risk of failure, and flexibility for increasing or decreasing the size of the system.

However, since with this type of distributed system a single transaction involves resource updating processing by a plurality of processing devices, it is necessary to ensure that the resource updating processing by this plurality of processing devices is consistent; in other words, that the situation does not arise in which, although a certain device has updated a resource with relation to a particular transaction, a different device has not performed such updating. The "two phase commit" method conceived of by N. J. Gray is known as a transaction processing method for this purpose.

With this "two phase commit" method, a transaction is separated into two phases: hypothetical updating and actual updating. When some terminal issues a request for a transaction, this request is received by a single processing device. In the initial hypothetical updating phase, this single processing device which has received the transaction (hereinafter termed the coordinator) inquires from the one or more processing devices (hereinafter termed the participant or devices) which maintain the database or databases to be updated whether such updating is possible or not, and responses are returned from these participants to the coordinator as to whether or not such updating is possible. As a result, the system only proceeds to the actual updating phase in the event that responses have been returned from all of the participants to the effect that such updating is possible. In this actual updating phase, commit commands are issued from the coordinator to all of the participants, and each of the participants which has received the commit command actually updates its corresponding resource; and thereafter updating completion messages are returned to the coordinator from each of the participants.

According to the procedure which these two phases described above constitute, the commit command is issued and the actual updating of the databases is performed only in the event that all of the processing devices which perform distributed processing for the transaction are able to update the resources.

However, there are some problems with this "two phase commit" procedure, as follows.

First, since signal interchange between the above described coordinator and participant or devices must be performed a minimum of four times, a signal transmission overhead is entailed the length of which cannot be ignored. As a result the overall speed of processing of the system is low.

Further, since transaction processing proceeds by the procedure being repeated of messages being dispatched as described above from the coordinator to the participant or devices, and by replies to these messages then being returned from the participant or devices to the coordinator, accordingly, if in the midst of transaction processing a blocking failure or the like occurs in any one of the processing devices, at this time point the processing by all the processing devices is stopped, which is undesirable. One method for solving this problem is to cancel the processing of any single transaction if it has been stopped for more than a fixed time period, and then to continue to the processing of the next transaction. However, the waiting for this fixed time period reduces the overall speed of processing of the system.

Furthermore, with the "two phase commit" procedure, stopping part way through or rolling back of the actual updating procedures for the other processing devices can no longer be performed in the actual updating phase after the commit command has been issued, even if one of the processing devices fails with the actual updating procedure. Therefore in this case the actual updating procedure is undesirably executed for the other processing devices, and as a result the consistency of the resource updating procedure is compromised.

This type of "two phase commit" procedure is not one which can perfectly satisfy the requirement for transaction processing to proceed accurately and smoothly.

Further, cooperative type distributed systems which have been known in the prior art, as well as being subject to the problems detailed above in connection with the "two phase commit" procedure, also have the following types of problem.

First, with prior art systems, the apportionment of duties as the master and participants is decided upon in a fixed manner among the plurality of processing devices. In other words, the flexibility of being able to alter the apportionment of duties of the plurality of processing devices according to circumstances is lacking.

Further, prior art systems are subject to the following problems even with regard to the procedure for storing (in other words, writing) a log entry in storage when a transaction is committed. As will be described hereinafter in detail, each of the various known log storage techniques is suitable either for times of high traffic or for times of low traffic, but none of them is suitable for both types of condition. Moreover, with prior art log storage techniques, the time period for storing a log entry for a single transaction is long.

Yet further, the problem arises with prior art systems that the processing time is long even for recovery of a resource after an error has occurred in that resource. The cause of this, as will be explained hereinafter in detail, is the combination of the fact that the burden of recovery processing is concentrated upon the single processing device which manages the resource which is to be recovered, the fact that the processing program for determining whether or not the resource has actually been updated is complicated, and the fact that referring to the log takes some considerable time.

OBJECTS OF THE INVENTION

A first objective of the present invention is to solve the above described problems with regard to cooperative type distributed systems.

A second objective of the present invention is to propose a transaction processing technique which is improved so as to ensure consistency of resources in a cooperative type distributed system.

A third objective of the present invention is to propose a cooperative type distributed system in which the apportionment of duties as the master and participants among the plurality of processing devices can be flexibly altered.

A fourth objective of the present invention is to propose a log storage technique which can be applied both during times of high traffic and during times of low traffic.

A fifth objective of the present invention is to propose a log storage technique with which the time period required in practice for storing a log entry for a single transaction is short.

A sixth objective of the present invention is, when a certain resource is to be recovered, to ensure that recovery is performed quickly without concentrating load upon the server which manages this resource.

A seventh object of the present invention is to make it possible to use a more simple program and a smaller file area in order to determine whether or not the resource has actually been updated.

An eighth object of the present invention is to reduce the time for referring to the log.

SUMMARY OF THE INVENTION

In a cooperative type distributed system according to a first aspect of the present invention, at least one from a plurality of processing devices can become a coordinator for receiving a transactions, and the other processing devices can become participants for performing distributed processing of the transactions which are received. Resources such as databases or files are distributed over a plurality of the participants. The coordinator issues items of update information for the resources relating to the transactions to the participants among which are distributed the resources which are the subject of updating. One of the coordinator and the participants includes a log for recording all the items of update information which the coordinator has issued. An identification code of the transaction is appended to each of the items of update information in this log. Each of the participants updates the distributed resource in response to the items of update information from the coordinator. If any of the participants has failed in the updating of the resources, thereafter a recovery procedure for this resource is performed. In this recovery procedure, this participant specifies the transaction in the past at which this participant failed in the updating, acquires from the log the item of update information to which is appended the identification code of the specified transaction, and updates this resource based upon the acquired item of update information.

With this system, all of the items of update information which have been issued from the coordinator are recorded in the log which is at a predetermined place in the system. When the resource updating during processing of any transaction has failed, afterwards, each of the participants extracts from the log the item of update information related to this transaction, and correctly updates the resource based upon the extracted item of update information. The coordinator does not need to be concerned with whether or not the participants have executed the updating correctly. Accordingly, the number of transmissions of signals between the coordinator and the participants is reduced, and therefore the transmission overhead is short. Further, even if a local blocking or the like breakdown occurs in one of the participants, it is not necessary to stop the system as a whole.

In the preferred embodiment all of the processing devices have the same structure, and thereby each processing device can become both the coordinator and a participant.

With this preferred embodiment, each processing device has a log in which is recorded all of the items of update information which have been issued when each processing device has been the coordinator, and thereby the authenticity of logging is assured.

With this preferred embodiment, each of the processing devices performs lock control of the resource which is distributed to each processing device, for each record within this resource. Due to this, since the portion of a resource which is locked during the processing of a single transaction is minimized, the limitation of access for the processing of other transactions is minimized, and as a result the possibility of processing a plurality of transactions in parallel is enhanced.

Further, with this preferred embodiment, each of the processing devices includes a lock/unlock log for the resource which is distributed to each processing device, and by referring to this log each device can specifies the transaction at which the updating was failed. Due to this, each processing device can execute recovery processing separately and independently from the other devices.

A device according to a second aspect of the present invention for storing a plurality of log items all together comprises a queue in which write requests for log data items are enqueued. This device intermittently determines the number of write requests which are present in this wait queue, dequeues the write requests by the determined number from the wait queue, and writes in an non volatile storage all together the log data items which are related to the dequeued write requests. This process is repeated continuously (in other words, without interposing any unnecessary interval), when one or more write requests are present in the wait queue.

According to this device, at each intermittent opportunity, only the write requests which are present in the wait queue at this time point are dequeued and processed, and the subsequent write requests which have been further enqueued during this processing are processed at the next opportunity. Due to this, the log writing procedure is executed steadily even in the case that a large number of write requests are successively enqueued at a time of high traffic. Further, according to this device, write requests in the wait queue do not wait for a long time but are processed efficiently, since the above described procedure is continuously repeated if at least one write request is present in the wait queue. Accordingly, in the case that there are not many log write requests such as at a time of low traffic or the like, these requests are processed by being enqueued and promptly dequeued. As a result a high throughput is obtained both in times of high traffic and in times of low traffic.

In a preferred embodiment, after a plural number of items of log data relating to the write requests which have been dequeued have first been accumulated in a memory, then they are transferred from said memory into storage all together. Generally the access to memory such as RAM is high speed, while the access to storage such as a disk device is low speed. Accordingly the number of accesses to storage is reduced and the throughput is enhanced by, after a plurality of items of log data have been temporarily accumulated in high speed memory, writing them all together into low speed storage.

This embodiment comprises a counter which is increased according to enqueuement of the write requests and is decreased according to dequeuement thereof, and a work area into which the value of this counter is copied at intermittent opportunities, so that the count value in this work area shows the number of said write requests at each opportunity. According to this simple construction, it is possible accurately to check the number of write requests in the wait queue at each opportunity.

A device according to a third aspect of the present invention for processing items of log data all together comprises a plurality of log processing threads for receiving a plurality of items of log data in parallel. Each of the log processing threads acquires a right to output to storage under the condition that no other log processing thread has acquired the output right. The log processing thread which has acquired the output right outputs to storage all together not only the item of log data which this thread has received, but also the items of log data (if any such exist) which other threads have received.

According to this device, if a plurality of items of log data have arrived successively, a plurality of log processing threads are started and receive these items of log data in parallel. Next, each of these plurality of log processing threads tries to acquire the right to output the items of log data to storage. As a result, when one thread acquires the output right, at this time point this one thread puts together all the items of log data which are received in the plurality of threads and outputs them to storage. While this all together output is being performed, as subsequent items of log data arrive, other threads are started and receive them. After this, one of these other threads acquires the output right and again puts together and outputs to storage all of the subsequent items of log data which have being received during the last all together outputting. As a result, a high throughput is obtained.

In a cooperative type distributed system according to a fourth aspect of the present invention, a resource is managed by at least one processing device, and a log which accumulates items of log data based upon updating commands for this resource is distributed over at least two processing devices. When the resource is to be recovered, a processing device which manages the resource requests the necessary items of log data from the processing devices which manage the log, and the processing devices which manage the log search out the requested items of log data from the log and send them to the processing device which manages the resource. When this is done, the processing device which manages the resource updates the resource according to these items of log data.

According to this system, since the log is distributed over the plurality of processing devices, during the recovery procedure, the required items of log data are searched out by the parallel processing of this plurality of processing devices. Accordingly the load upon a single processing device is reduced, and the time period for the recovery procedure is shortened.

In a preferred embodiment, each item of log data shows an image of the resource after updating. Due to this, for recovery of the resource, it is not necessary to repeat the updating sequentially from the time point at which a backup was stored, and it is sufficient only to update the resource based upon the most recent item of log data.

Further, in this preferred embodiment, each of the processing devices manages the log related to the updating commands which it has issued. Due to this, the log does not experience any influence due to signal transfer errors or breakdown of other processing devices during transaction processing, and the reliability of the log is improved.

Further, in this preferred embodiment, a lock log for the resource is taken advantage of for specifying items of log data which are necessary for the recovery processing. The lock log is necessary as a reference for managing exclusion control for updating of the resource. Accordingly, no special log is required for specifying the necessary items of log data for the recovery processing.

According to a fifth aspect of the present invention, a device for a transaction processing system which determines whether or not actual updating of a resource has been executed, comprises an update flag which is allocated to a transaction during processing by the system, and a flag log file for recording the history of the update flag. In processing each transaction, first an initial value of the update flag is read in, and, when a commit command for this transaction is issued, a value reversed from the initial value is written in the flag log file. After this, when the actual updating of the resource is executed based upon this commit command, the update flag is reversed. If a breakdown occurs during processing of some transaction, during the subsequent recovery procedure, the value of each of the update flags and each of the reversed values in the flag log file is compared, and from the result of this comparison it is checked whether or not the resource has been actually updated.

According to this device, since the update flags are allocated to transactions which are being processed, it will be sufficient to provide as many update flags as the maximum number of transactions which can be executed in parallel by the system, and the memory size required for the update flags is small.

When during the processing of some transaction a commit command is issued, the reversed value of the initial value of the update flag (=the value of the flag when the transaction is commenced) which is allocated to this transaction is recorded in the flag log file. Further, when the actual updating of the resource is executed according to this commit command, the value of the update flag which has been allocated to this transaction is actually reversed. On the other hand, if although the commit command has been issued a breakdown has occurred and the actual updating has not been possible, then the initial value of the update flag is maintained without being reversed. Accordingly, if the actual updating has been executed, then the value of the update flag and the reversed value of the flag log file will agree, while on the other hand if the actual updating has failed, then they will both disagree. Accordingly, it is possible to decide whether or not the actual updating has been executed by the simple procedure of comparing the value of the update flag and the reversed value of the flag log file. As a result, the time period for the recovery procedure is shortened.

In a preferred embodiment, the procedure of managing and moreover comparing the update flags and the flag log file is provided as a separate process from the process of processing transactions. Due to this, the process of processing transactions is released from the process of determination of resource updating, and the structure becomes simplified. Further, the structure of the update flags and the flag log file is also simplified.

A log search device according to a sixth aspect of the -present invention comprises a log file which stores items of log data which include time stamps in order of the time stamps, and receives a log search request containing time information and reads out from a search range in the log file the time stamps of items of log data. And it compares the time stamp which has been read out and the time information of the log search request, and, if the result is that the latter is later than the former, it limits the search range to a range having a time stamp later than the time stamp which has been read out. The time stamp for each item of log data is again read out from this search range which has been limited, and the same comparison as above is performed.

This device operates so as to exclude from the search range the range of the log file which has time stamp which shows a time earlier than the time information which is included in the log search request. It is clear that the subject of the search does not exist in this excluded range. Since the search range is narrowed down in this manner, the search time period is shortened.

In a preferred embodiment, the items of log data are sequentially read out in order from that one which has the latest time stamp in the direction from the final end of the file towards its head, and a check is made as to whether or not it corresponds to the object of search. This procedure is repeatedly performed while the object of search cannot be found, and finally, if the time stamp which has been read out undesirably becomes not later than the time information in the search request, then at this time point it is decided that the object of search is not present within the log, and the search procedure is discontinued. Accordingly, searching corresponding to the file range which has time information earlier than the time information in the search request is not performed at all.

BRIEF DESCRIPTION OF THE DRAWINGS

FIG. 22 is an explanatory figure showing in stages the concrete operation of the third embodiment.

FIG. 41 is a data structure diagram showing the structure of a transaction identification code and an item of logging data which are used in the sixth embodiment.

DESCRIPTION OF THE PREFERRED EMBODIMENTS

6.1 The First Embodiment

Figure 1:
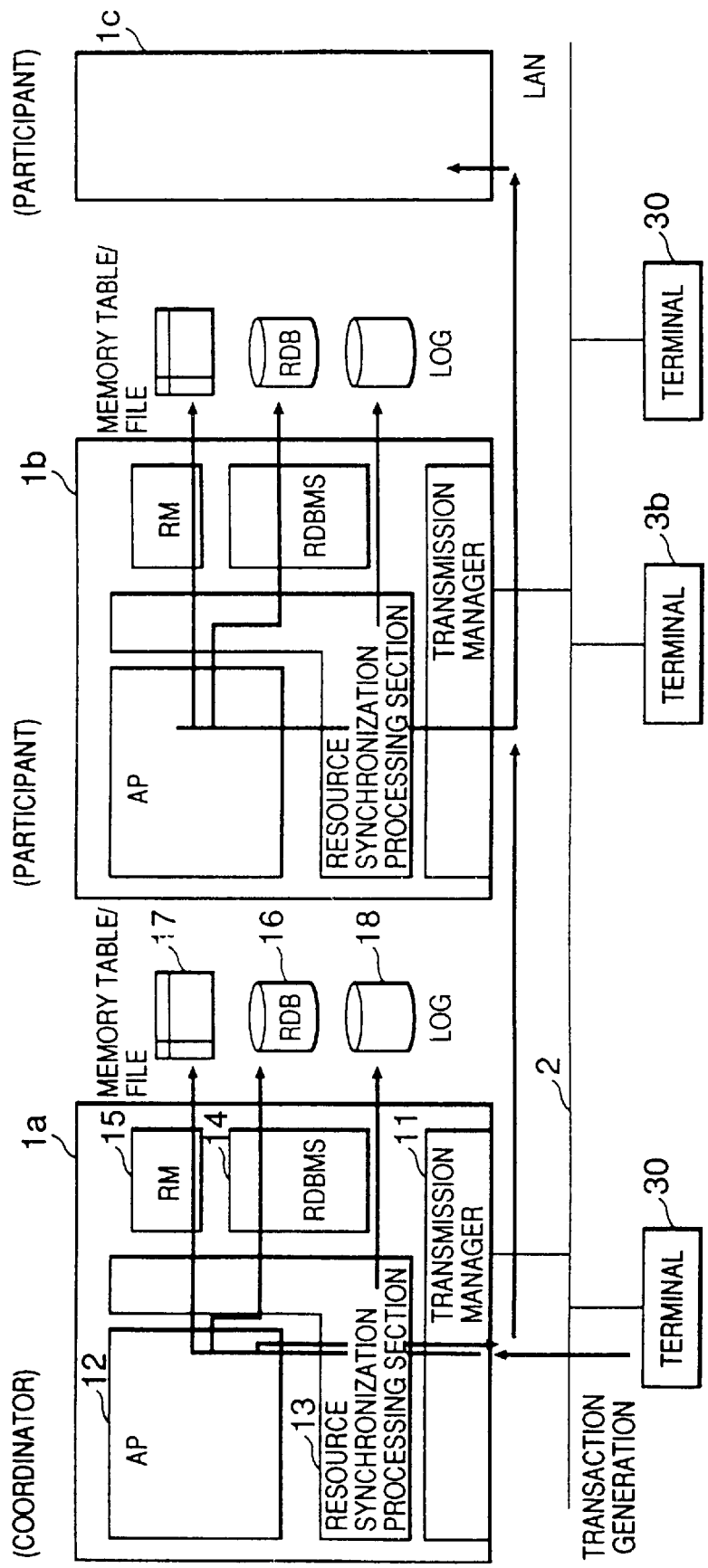
FIG. 1 is a block diagram showing the overall construction of an embodiment of the cooperative type distributed system of the present invention.

FIG. 1 is a block diagram showing the overall construction of a first embodiment of the cooperative type distributed system of the present invention. As shown in FIG. 1, a plurality of distributed processing devices (hereinafter termed "servers") 1a, 1b, 1c, etc. which cooperate to perform distributed processing of transactions are connected together via a signal transmission network 2 (for example a LAN). Further, a large number of terminal devices 3a, 3b, 3c, etc. are connected to this signal transmission network 2. These terminal devices 3a, 3b, 3c, etc. may for example be workstations or personal computers, and they interchange with the servers 1a, 1b, 1c, etc. signal messages related to transactions via the signal transmission network 2. Typically, the terminal devices 3a, 3b, 3c, etc. dispatch to one or the other of the servers 1a, 1b, 1c, etc. requests from users for transactions.

Each of the servers 1a, 1b, 1c, etc. includes the same structural elements, and they mutually cooperate together to execute processing of transactions. Each of the servers 1a, 1b, 1c, etc. can serve as a "coordinator" which receives transactions which have been requested from terminals, and furthermore can also serve as a "participant" which performs distributed processing of transactions which have been received by other servers.

A representative internal construction for the first server 1a is shown in FIG. 1. Each of the servers 1a, 1b, 1c, etc., as shown in the figure, comprises a signal transmission manager 11, an application program 12, a resource synchronization processing section 13, a database management section 14, a resource management section 15, a storage section (database) 16, a memory table / file section 17, and a log section 18.

The signal transmission manager 11 has the function of performing signal transmission via the signal transmission network 2 between the terminal devices 3a, 3b, 3c, etc. and other servers.

The application program 12 has the function of executing transaction processing related to tasks of this system itself.

The resource synchronization processing section 13 has the function of working together with the application program 12 to perform local processing for transactions on each server, control for performing distributed processing of transactions on other servers, and recovery processing of transactions.

The database management section 14 has the function of managing a local database 16 which each server is in charge of. A collection of records which are directly controlled by each server is stored in this local database 16.

The resource management section 15 has the function of managing the local memory table / file section 17 upon each server.

As has already been described, in this specification, the databases 16 and the memory table sections 17 will collectively be described as "resources".

In the log 18 of each server there are recorded in time sequence all of the changes, relating to all of the transactions which have been received by this server, which must be added with respect to the resources which are managed by this server and the other servers (irrespective of whether or not they have actually been added or not). In other words, in the log 18 of each server there are recorded in time sequence all of the changes with regard to all of the resources within the system for the transactions which have been received by this server, which all must be executed if they have been committed. Accordingly, even if an error occurs in the updating of the database of some server with regard to the distributed processing of some transaction, it is possible afterwards to update and to correct that database accurately, by referring to the log 18 of the server which received that transaction.

The operation of this system will be described in the case that the first server 1a has become the coordinator and the other servers 1b, 1c, etc. have become the participants, by way of example.

When for example the terminal 3a issues a request message for a transaction, the signal transmission manager 11 of the server 1a receives this message from the signal transmission network 2 and transmits it to the application program 12. The application program 12 responds to this message, and starts the processing for the transaction which has been requested by this message.

In this transaction processing, the application program 12 of the coordinator 1a performs the following three operations, roughly speaking. First, it commands the database management section 14 and the resource management section 15 via the resource synchronization processing section 13 to update the local database 16 and the memory table / file section 17 of which the coordinator 1a is in charge. Second, it dispatches commands to the signal transmission network 2 via the resource synchronization processing section 13 in order to update the resources of the other servers 1b, 1c, etc. which are the participants. Third, it writes the details of all of the updates related to the resources of the coordinator 1a and the participants 1b, 1c, etc. which must be performed for the processing of this transaction into the log 18 via the resource synchronization processing section 13.

In each of the participants 1b, 1c, etc. the signal transmission manager 11 receives the above described updating command from the coordinator 1a from the signal transmission network 2, and passes it over to the resource synchronization processing section 13. The resource synchronization processing section 13 of each of the participants performs updating processing for each database 16 and memory table / file section 17 based upon this updating command.

In the above described operation, the coordinator 1a does not know whether or not the participants 1b, 1c, etc. have actually executed the updating accurately according to the commands, and presumes that accurate updating has been executed. And the coordinator 1a dispatches a message to the terminal 3a to the effect that the transaction has been committed when the above described three operations have been completed.

Here, in the event that a resource failure in any of the participants has occurred and its updating has not been accurately performed, then the resource of that participant—only—will remain in the same state as before the updating, and as a result the consistency of the contents of the resources will be deteriorated, since the resources of the other devices will undesirably have been updated. However, after this failure has been recovered from, the updating history for this participant relating to this transaction is procured from the log 18 of the coordinator, and while referring thereto the updating is forcibly repeated in a correct manner. By doing this, the consistency of the resources is rehabilitated.

Figure 2:
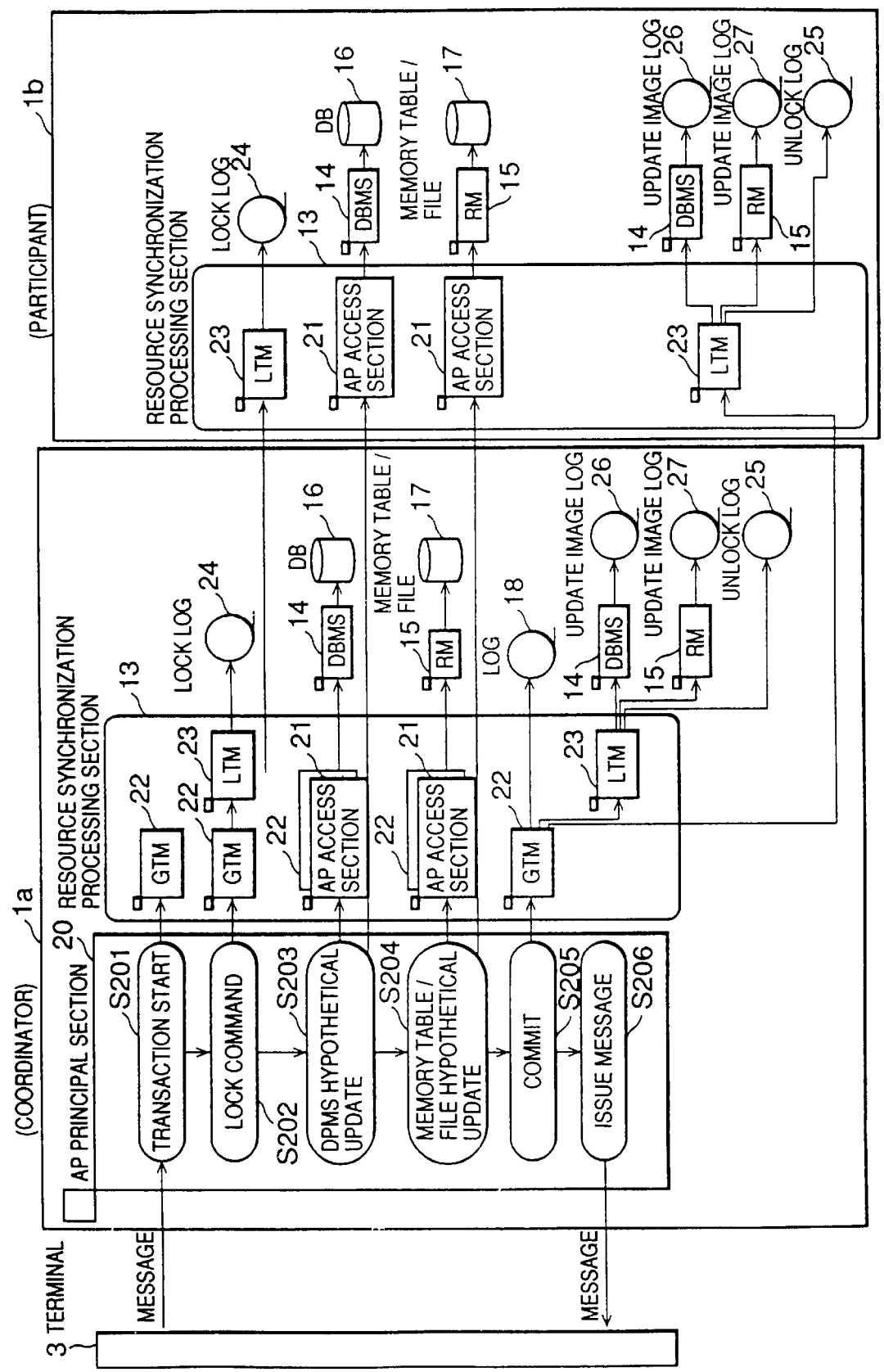
FIG. 2 is a block diagram showing the operation of the first embodiment and the functions of the parts in more detail.

FIG. 2 is a block diagram showing the details of the above operation.

As shown in the figure within the block for the server 1a, the application program 12 for each server comprises a principal section 20 (hereinafter termed the AP principal section) and an access section 21 (hereinafter termed the AP access section). The AP principal section 20 performs a core portion of the transaction processing shown in the figures as a flow chart. The AP access section 21 performs processing for accessing the database 16 and the memory table / file section 17.

The resource synchronization processing section 13 of each server comprises a global transaction management section 22 (hereinafter termed the GTM) and a local transaction management section 23 (hereinafter termed the LTM). The GTM 22 of each server, in the processing of each individual transaction, manages procedures relating to global resources both for that server and also for the other servers. The LTM 23 of each server, in the processing of each individual transaction, manages the procedures for that server relating to local resources.

The resource synchronization processing section 13 for each server further comprises two logs, in detail a lock log 24 and an unlock log 25, for performing exclusion control related to the resources of that server.

The database 16 comprises an update image log 26 for recording in time sequence the details of the updates which have been added to this database 16. Further, the memory table / file section 17 comprises an update image log 27 for recording in time sequence the details of the updates which have been updated to this memory table / file section 17. These update image logs 26 and 27 are for recording the update history of the local resources for each server, and by contrast to this the log 18 is for recording the update history of the global resources, not only for this server but also for all the other servers.

According to the above described construction, when the AP principal section 20 of the application program 12 of the coordinator 1a receives a request message for some terminal, it starts the transaction procedure which has been requested by that message (the step S201), and issues a transaction start command to the GTM 22 of the resource synchronization processing section 13. The GTM 22 generates an identification code for this transaction.

Next, the AP principal section 20 issues a lock command (a command which prohibits access by other transaction processing) to the GTM 22 for exclusion control with regard to all of the resources which are to be accessed within the system (the step S202). The GTM 22 on the one hand sends a lock command to the LTM 23 of the coordinator 1a for the resources within the coordinator 1a, and on the other hand sends lock commands via the signal transmission network 2 to the LTMs 23 of the participants 1b, 1c, etc. for the resources within the participants 1b, 1c, etc.. In each one of the coordinator and the participants, the LTM 23 responds to the lock command by storing (writing) in the lock log 24 the lock data relating to the resource which should be locked (which signifies that this resource has been locked) and the identification code for the above transaction. By doing this, it comes to be recorded in the lock log 24 for each server, which records (or memory tables, or files) among the resources of each server have been locked (access prohibited) in relation to which transaction.

Next, the AP principal section 20 of the coordinator 1a issues a hypothetical updating command to the GTM 22 in relation to all of the resources (the databases 16 and the memory table / file sections 17) which are to be updated (the steps S203 and 204). In this hypothetical updating command there is included information specifying the details of the updating relating to all of the resources which are to be updated. Or, this hypothetical updating command is a unified call for a collection of a plurality of accesses performed by the AP access section 21 with respect to the resources which are to be updated. The GTM 22 of the coordinator 1a temporarily stores this hypothetical updating command in the memory, and next sends a hypothetical updating command for the resources of the coordinator 1a to the database management section 14 and the resource management section 15 of the coordinator 1a via the AP access section 21, and moreover sends from the signal transmission network 2 a hypothetical updating command for the resources of the participants 1b, 1c, etc. via the AP access portion 21 of each participant 1b, 1c, etc. to the database and resource management sections 14 and 15 of each participant 1b, 1c, etc.. In each of the coordinator and the participants, the database and resource management sections 14 and 15 issue hypothetical updating commands to the respective databases 16 and memory table / file sections 17.

If any failure has occurred in any server in the above process up to the hypothetical updating, the transaction in question is rolled back, and the states of all the servers are returned to the states before the generation of the transaction in question.

When on the other hand the hypothetical updating procedure is successful, next the AP principal section 20 of the coordinator 1a issues a commit command to the GTM 22 for actually updating all of the resources which are to be updated (the step S205). When this is done, the GTM 22 first initially refers to the hypothetical updating command which has been stored in the memory in the previous hypothetical updating procedure, and records in the log 18 the updating details relating to all the resources required to be updated. Next, the GTM 22 sends commit commands for the LTM 23 of the coordinator 1a and for the LTMs 23 for the related participants 1b, 1c, etc.. When this is done, the LTM 23 of each server issues its commit commands for the corresponding database 16 and memory table / file section 17 via the corresponding database management section 14 and resource management section 15. By doing this actual updating is performed for the corresponding databases 16 and memory table / file sections 17, and when the actual updating has succeeded the details of this updating are recorded in the corresponding update image logs 26 and 27.

Further, when the actual updating for the respective resources has succeeded, the respective LTMs 23 store (write) in the respective unlock logs 25 unlock data related to the respective resources (which signifies that the locking of these resources has been released). The items of unlock data in these unlock logs 25 correspond in pairs with the items of lock data in the lock logs 24.

When the above described commit procedure has been completed, the AP principal section 20 of the coordinator 1a returns a message indicating that the transaction has been committed to the terminal, and thereby the processing of a single transaction is terminated.

Now, in the event that during the above described commit procedure a failure has occurred in any one of the resources so that the actual updating of this resource has failed, then the state is maintained in which the lock data in the lock log 24 remain unmatched even after the transaction processing has been completed, since the unlock data for this resource cannot be stored in the unlock log 25. In other words, this resource is maintained in the locked state. This resource in the locked state is kept just as it was in the state before the failure occurred, since access to it has been absolutely prohibited during subsequent transaction processing.

After processing for eliminating this failure has been performed, the resource in which the failure has occurred is forcibly corrected to an accurate state by performing recovery procedures such as detailed below. That is to say, first, the lock and unlock logs 24 and 25 are searched, and it is detected which transaction was taking place at the time that the failure occurred. Next, dispatch is requested from the server which was the coordinator in the processing of this transaction which has been detected of the information relating to this transaction in its log 18. Since, as has already been explained, the correct update details recorded for processing each transaction are recorded in this log 18, the updating of this resource in which the failure occurred is executed based upon these correct update details. In the event that after the failure occurred on a certain resource some other transactions have taken place which require access to this resource, it is not necessary to consider these other subsequent transactions during the recovery procedure, since these other transactions are rolled back at the stage of lock data storing, and therefore it is acceptable to perform reupdating only in relation to the transaction which was processed when the failure occurred.

It is ensured in the manner described above that the state in which there is consistency over all of the resources is substantially always guaranteed, even if a failure has occurred in any of the resources, due to the forcible recovery processing after the failure has been eliminated.

Moreover the operation of the system can quickly proceeds to the processing of subsequent transactions, since in the processing of each transaction the coordinator assumes that the transaction has been committed after it has sent commit commands to the participants, without any dependence upon the success or the failure of the actual commit in the participants. Further, since the coordinator is not concerned with the success or the failure of the commit in the participants, the number of messages interchanged between the coordinator and the participants is also smaller than in the "two phase commit" prior art. As a result the transmission overhead is compressed, and moreover the working of the overall system no longer stops even if blocking occurs in any of the participants, so that accordingly the working of the entire system takes place at high speed and becomes smooth.

As has already been explained, in the event that failure has occurred in a portion of the resources, this failed portion is maintained in the locked state until the recovery procedure has been performed, and access during subsequent transactions is prohibited. Due to this, if the grading of exclusion control (in other words, the minimum unit-size of resource which is locked or unlocked) is large, the negative effects of access prohibition upon processing of subsequent transactions become great, which is not desirable. Therefore, it is advisable for the grading of exclusion control to be a record, that is the minimum unit for access.

Figure 3:
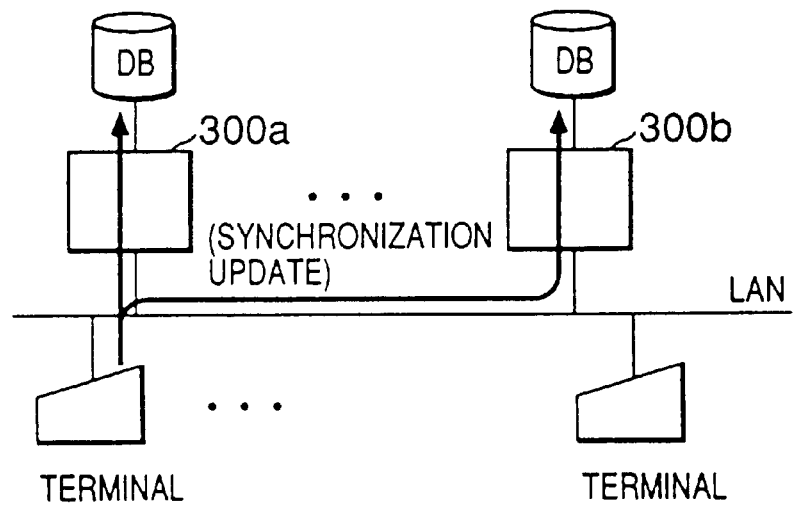
FIG. 3 is a block diagram showing one exemplary system construction to which the present invention can be applied.

FIG. 3 shows one typical exemplary system construction to which the present invention can be applied. As shown in the figure, a plurality of servers 300a, 300b, etc. are connected in parallel by a transmission network. Any one of the servers 300a, 300b, etc. is capable of becoming the coordinator. For example, with a bank withdrawal processing system, each of the servers 300a, 300b, etc. is disposed in one of the branches of the bank, and can become the coordinator with respect to transactions (deposits, withdrawals, transfers, etc.) which are input from terminals in the respective branches. Further, since with this system construction there is no hierarchical relationship between the servers 300a, 300b, etc., therefore expansion or contraction of the system can be easily performed, such as for example adding servers in response to increase of traffic.

Figure 4:
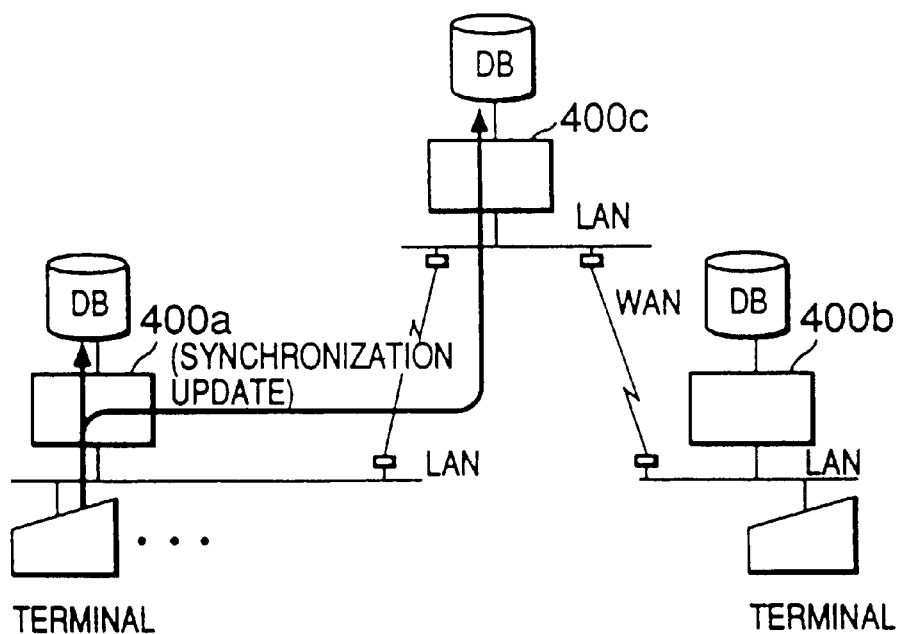
FIG. 4 is a block diagram showing another exemplary system construction to which the present invention can be applied.

FIG. 4 shows another exemplary system construction to which the present invention can be applied. This construction is one in which a plurality of servers 400a, 400b, 400c, etc. are connected in a layered construction. For example, in the case of a banking system, a method using so called distributed processing is possible, in which the server 400a in the top layer is a device in the main office, while the other servers 400b, 400c, etc. are devices in the branches, and processing of transactions which is concluded within the individual branches is individually performed in each of the servers, while processing of transactions which is opened in association with the main office or with another branch is performed by cooperation between the server of this branch and the server of the main office or of the other branch. This type of system structure is suitable for construction of large scale systems. In this case, there is the merit that expansion or contraction of the system can be performed for each layer independently of the other layers.

Now with the above described embodiment each server keeps a complete log relating to the transactions which have been processed when it became the coordinator, but it is not absolutely necessary for this to be done. For example, a specified one, or two or more, of the servers in the system may keep a complete log as representatives for all of the servers, or a server may be provided specially dedicated to logging management. In this case, there is the demerit that it is not possible to guarantee the accuracy of the log if a signal transmission failure occurs, since it is necessary to send signals containing the information relating to the update details such as the above described hypothetical updating commands to the server which keeps the log from the servers which do not keep logs. However, the other side of this is that searching the log during the recovery processing is easy, since the log is managed as one unit. What type of log management is to be performed should be selected system by system while considering these types of merits and demerits. Further it is also possible, by employing both unitary logging management and distributed logging management at the same time, to make the most of the merits of both of them together.

Figure 5:
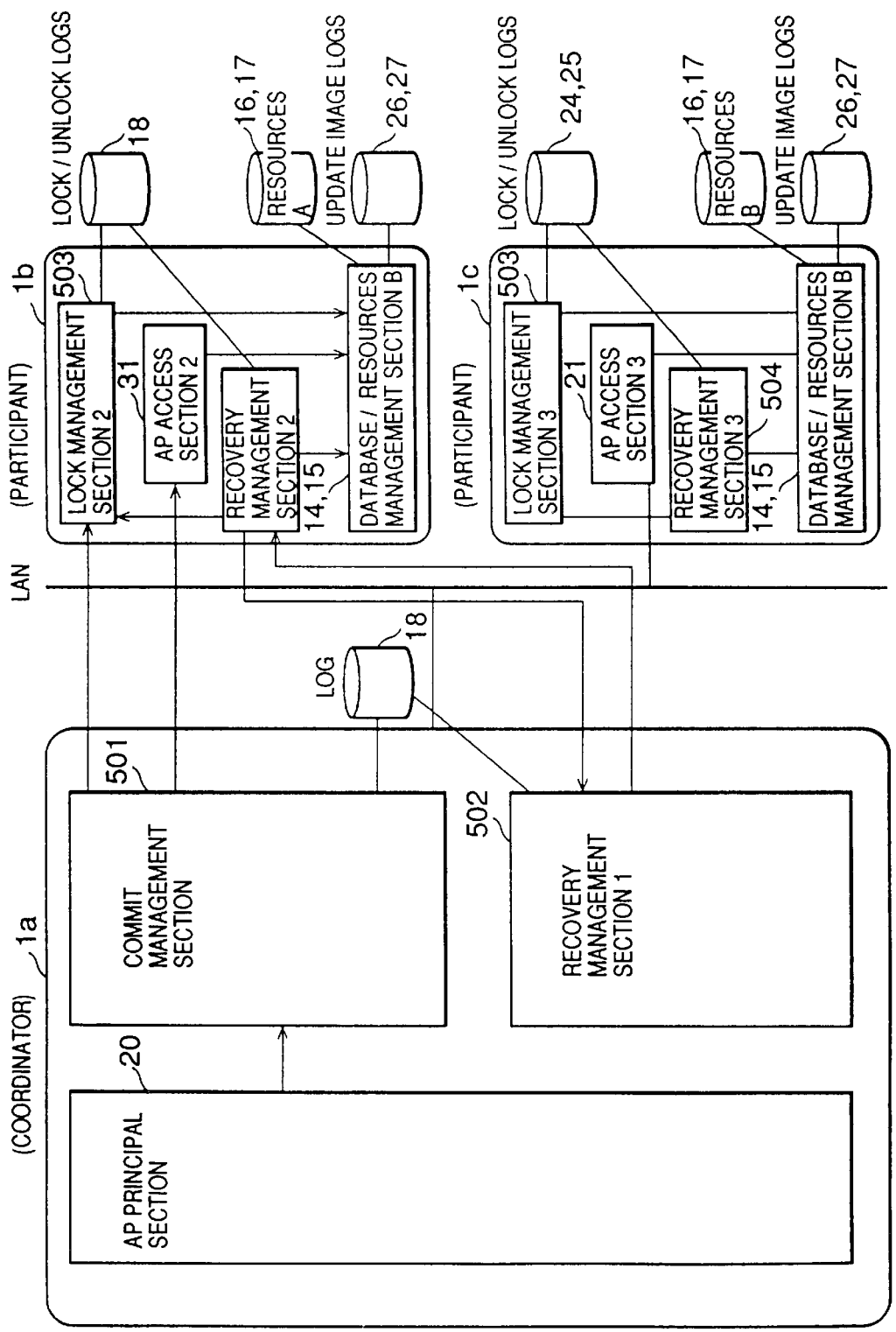
FIG. 5 is a block diagram showing in detail, for the embodiment of FIG. 1, taking as an example the case in which a server 1a is a coordinator, the portions in particular which participate in logging storage and in recovery processing after the occurrence of a breakdown.

FIG. 5 is a figure showing, with the system which is shown in FIG. 1 and FIG. 2, taking as an example the case when the server 1a is the coordinator, in particular in detail a portion which participates in the recovery processing after a failure has occurred during logging storage.

A commit management section 501 and a recovery management section 502 of the coordinator 1a in FIG. 5 are both included in the GTM 22 of the coordinator 1a which was shown in FIG. 2. Further, a lock management section 503 and a recovery management section 504 of each of the participants 1b, 1c, are included in the LTMs 23 of the participants 1b, 1c, . . . which were shown in FIG. 2. Moreover, in FIG. 5, a database 16 and a memory table / file section 17 of each of the servers is shown in summary as a resource, and management sections 14 and 15 and update image logs 26 and 27 thereof are also shown in summary as single blocks.

The commit management section 501 of the coordinator 1a performs the following procedure according to commands from the AP principal section 20.

(1) Upon a transaction start command, a transaction identification code is generated. Here, this transaction identification code is a unique identification code specific to each transaction. This transaction identification code includes a server identification code which shows which server is the coordinator in the processing of this transaction.

(2) Upon a lock command, a lock command is dispatched to the lock management section 503 of each of the servers.

(3) Upon a hypothetical updating command, first the transaction identification code, the lock identification code, and the hypothetical updating command are saved in memory, and next this hypothetical updating command is dispatched to the access management section 21 of each of the servers.

(4) Upon a commit command, the transaction identification code, the lock identification code, and the hypothetical updating command which have been saved in memory are recorded in the log 18, and an unlock command is dispatched to the lock management section 503 of each of the servers.

(5) Upon a rollback command, the entire information relating to the subject transaction is annulled, and a rollback command is dispatched to the lock management section 503 of each of the servers.

The recovery management section 502 of the coordinator 1a has the function, upon request from the recovery management section of this participant during the recovery procedure after any breakdown such as a system shutdown has occurred in any of the participants 1b, 1c, . . . , of looking up and recovering the hypothetical updating command for the subject transaction from the log 18 of the coordinator 1a, and of dispatching it to the recovery management section 502 of this participant.

As has already been described, the transaction identification codes, the lock identification codes, and the hypothetical updating commands related to all of the transactions which this coordinator has received and which have been taken as being committed (in other words have not been rolled back) are recorded in time sequence in the log 18 of the coordinator 1a.

The lock management section 503 of each of the participants 1b, 1c, . . . performs the following procedures.

(1) In response to a lock command from the commit management section 501 of the coordinator 1a, a lock storage procedure which will be described hereinafter is performed, and a transaction start command is emitted to the database/resource management sections 14 and 15, a lock identification code is generated, and moreover lock data are stored into the lock and unlock logs 24 and 25. This lock identification code is an identification code which is unique to each item of lock data.

(2) In response to an unlock command from the commit management section 501, a commit command is emitted to the database/resource management sections 14 and 15, and moreover unlock data are stored into the lock and unlock logs 24 and 25.

(3) In response to a rollback command from the commit management section 501, a rollback command is emitted to the database/resource management sections 14 and 15, and moreover unlock data are stored into the lock and unlock logs 24 and 25.

The AP access section 21 of each of the participants 1b, 1c, . . . has the function of emitting a hypothetical updating command to the database/resources management sections 14 and 15 in response to the hypothetical updating command from the commit management section 501 of the coordinator 1a.

The recovery management section 504 of each of the participants 1b, 1c, . . . performs the following procedures.

(1) In the recovery procedure, lock data to which no unlock data corresponds is searched for in the lock and unlock logs 24 and 25, and recovery procedure is requested from the recovery management section 502 of the coordinator 1a based upon this information.

(2) An updating command is received from the recovery management section 502 of the coordinator 1a, and recovery is executed.

The database/resource management sections 14 and 15 of each of the participants 1b, 1c, . . . have the functions of performing recovery of the corresponding resource, based upon the local update/image logs 26 and 27.

In the lock and unlock logs 24 and 25 of each of the participants 1b, 1c, . . . there are recorded in time sequence lock data and unlock data relating to the corresponding resources 16 and 17. Transaction identification codes, lock marks, and lock identification codes are included in the lock data. Transaction identification codes and unlock marks are included in the unlock data. A mutual correspondence is established between the lock data and the unlock data by the transaction identification codes contained in them. If any item of lock data exists to which no item of unlock data corresponds, that means that a breakdown occurred in the resource relating to this item of lock data, and it is possible to identify the transaction and the coordinator at the time that the breakdown occurred from the transaction identification code for this item of lock data. In the recovery procedure, the transaction and the coordinator at the time that the breakdown occurred are identified by doing this.

In the following, the procedure for transaction processing and the procedure for recovery processing will be explained in detail.

First, the procedure for transaction processing will be explained with reference to FIGS. 6 through 10.

Figure 6:
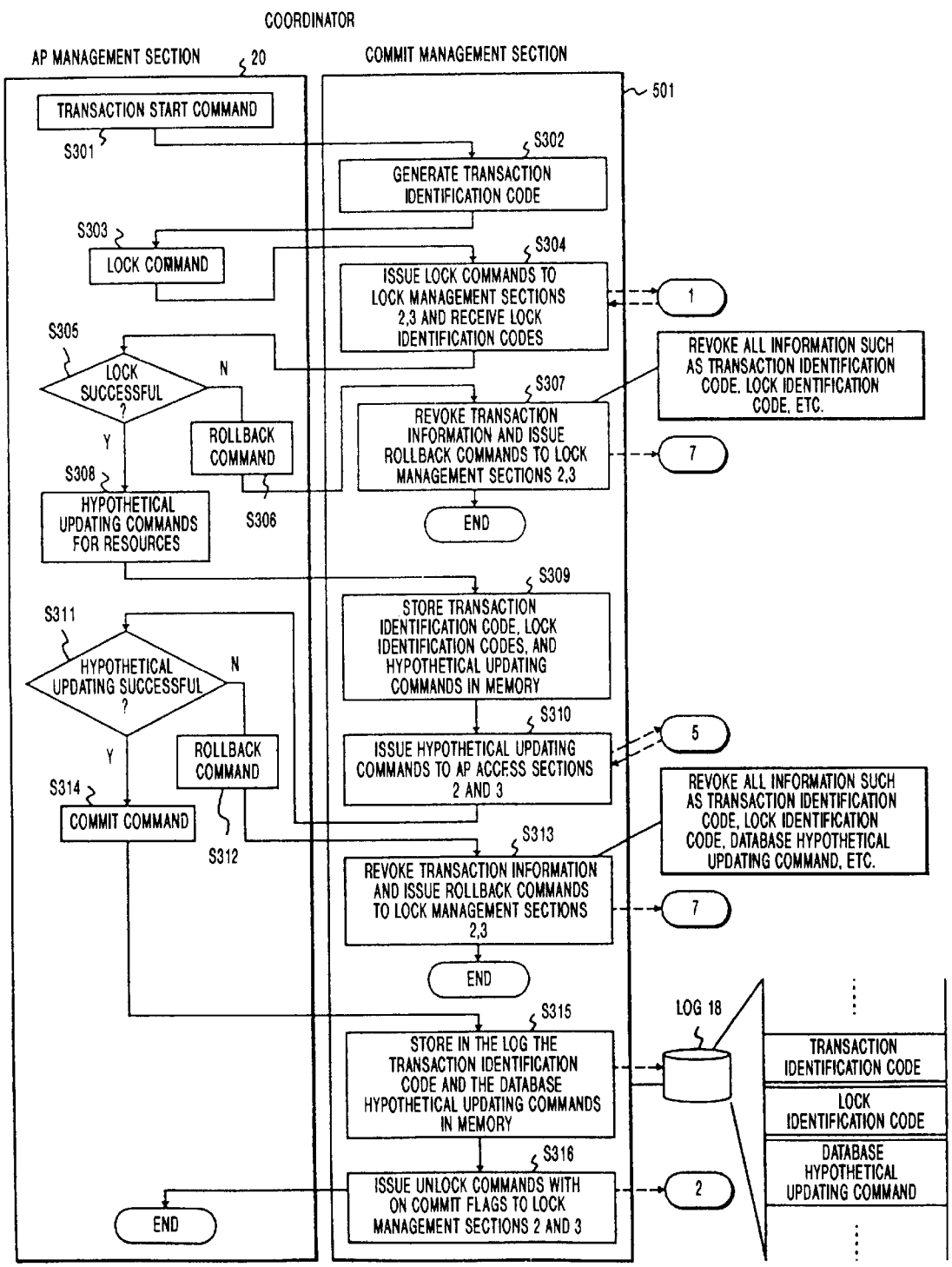
FIG. 6 is a flow chart showing processing procedures for an AP principal section 20 and for a commit management section 501 of the coordinator 1a during transaction processing.
Figure 7:
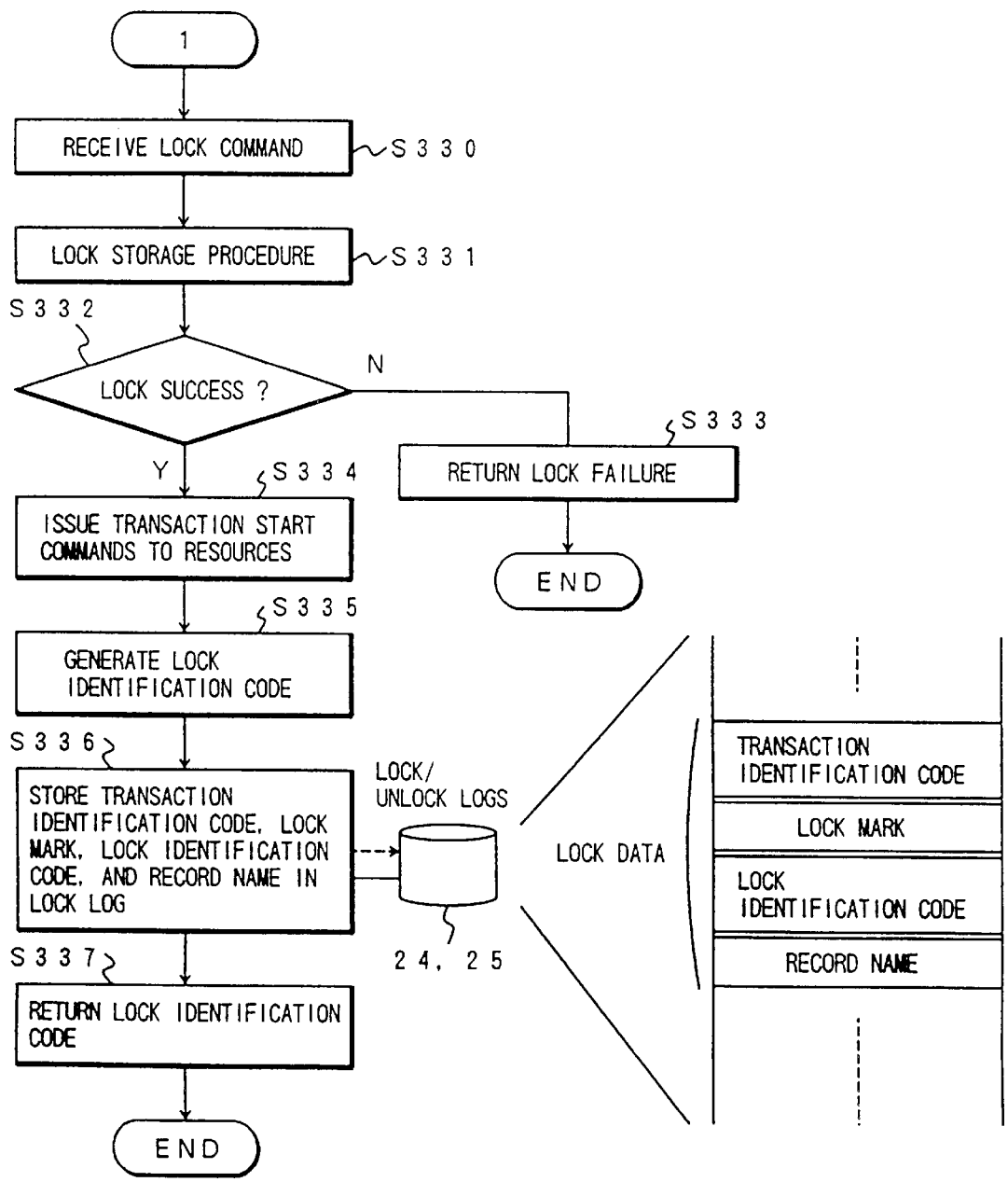
FIG. 7 is a flow chart showing a lock processing procedure for lock management sections 503 of participants 1b, 1c . . . .
Figure 8:
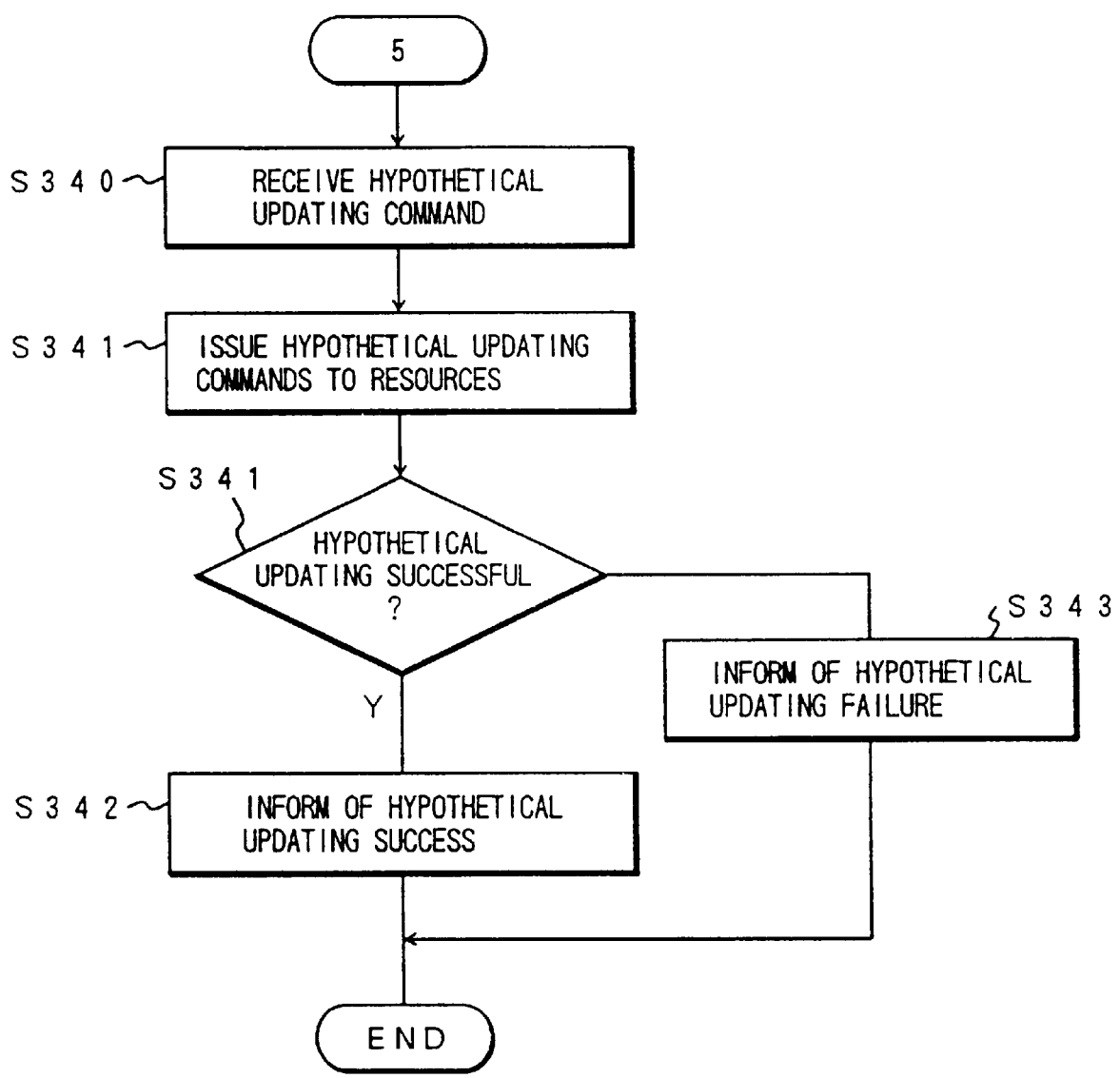
FIG. 8 is a flow chart showing a hypothetical updating command processing procedure for an AP access section 21 of the participants 1b, 1c . . . .
Figure 9:
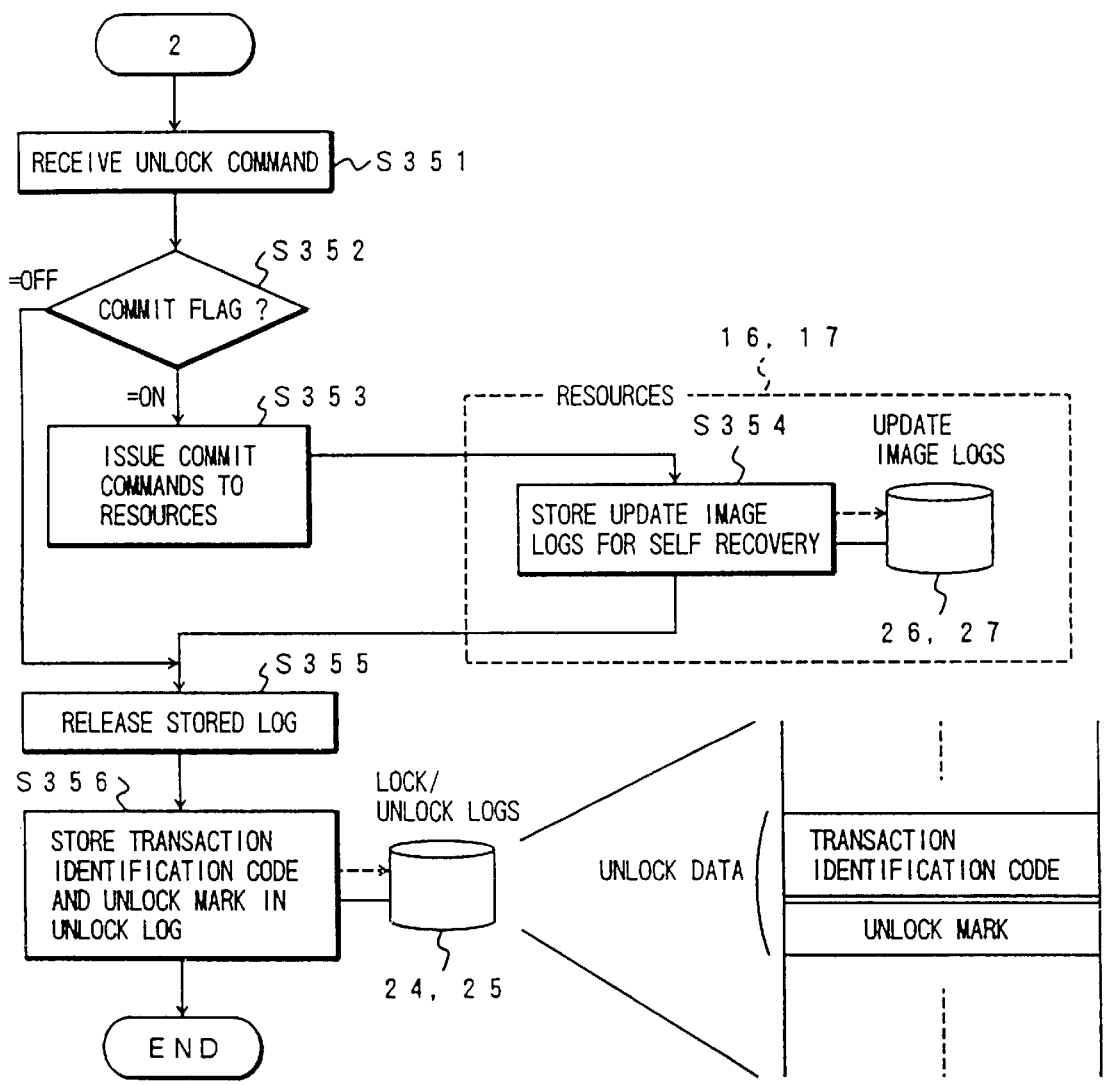
FIG. 9 is a flow chart showing an unlock command processing procedure for the lock management sections 503 of the participants 1b, 1c . . . .
Figure 10:
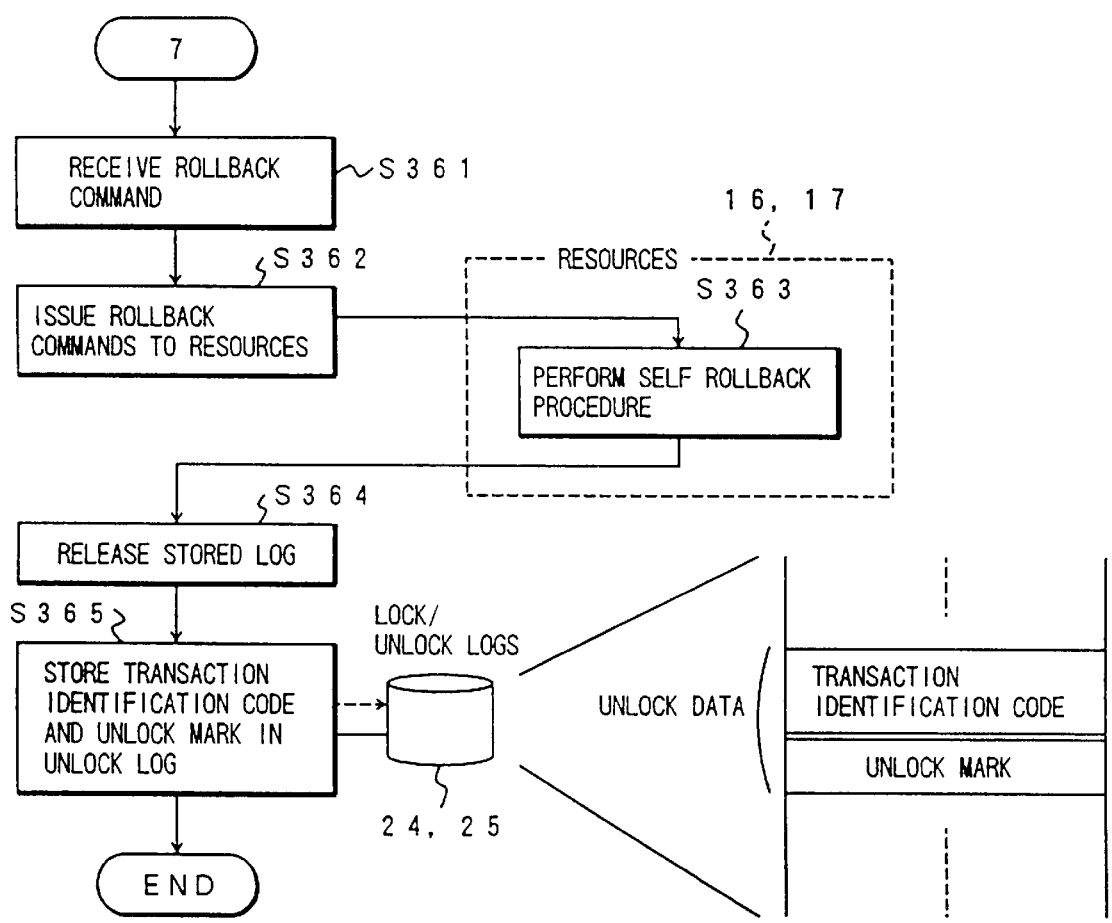
FIG. 10 is a flow chart showing a rollback command processing procedure for the lock management sections 503 of the participants 1b, 1c . . . .

FIG. 6 shows the processing procedure of the AP principal section 20 and the commit management section 501 of the coordinator 1a during transaction processing. FIG. 7 shows the lock processing procedure of the lock management sections 503 of the participants 1b, 1c, FIG. 8 shows the hypothetical updating command processing procedure of the AP access sections of the participants 1b, 1c, FIG. 9 show the unlock command processing procedure of the lock management sections 503 of the participants 1b, 1c. FIG. 10 shows the rollback command processing procedure of the lock management sections 503 of the participants 1b, 1c. . . .

As shown in FIG. 6, first, in the coordinator 1a, the AP principal section 20 issues a transaction start command (the step S301), and in response to this the commit management section 501 generates a transaction identification code (the step S302). Next, the AP principal section 20 issues a lock command (the step 303), and in response to this the commit management section 501 issues a lock command to the lock management section 503 of each of the participants 1b, 1c, . . . (the step S304).

When the lock command is received (the step S330) from the coordinator 1a, the lock management section 503 of each of the participants 1b, 1c, . . . , as shown in FIG. 7, performs the lock storage procedure (the step S331). In the lock storage procedure, the lock command which has been received is stored in the memory, and it is checked whether this record which is to be locked (or table, or file) may not already be locked by another transaction, and if it is not locked then a determination of lock success is made, while if it is already locked then a determination of lock failure is made (the step S332). And in the case of lock failure the lock command which was stored in the memory is revoked, and the coordinator 1a is notified of the lock failure (the step S333).

On the other hand, in the case of lock success, the lock management section next issues transaction start commands to the resources 16 and 17 (the step S334), generates a lock identification code (the step S335), and stores in the lock log 24 the transaction identification code (this is included in the lock command), a lock mark, the lock identification code, and the record name which is the object of locking (the step S336), and thereafter sends the lock identification code to the coordinator 1a (the step S337).

Referring again to FIG. 6, after the commit management section 501 of the coordinator 1a has issued the lock commands in the step S304, when it receives from the participants 1b, 1c, . . . lock identification codes (notifications of lock success) or notifications of lock failure, it notifies the AP principal section 20 thereof. The AP principal section 20 checks whether or not all of the participants 1b, 1c, . . . have been successful in the locking (the step S305), and if all the participants have been successful in the locking then it issues hypothetical updating commands (the step S308) for the resources of all the participants. The commit management section 501 which has received these hypothetical updating commands temporarily stores in the memory the transaction identification code and the lock identification codes and the hypothetical updating commands for the resources (the step S309), and issues to the AP access section 21 of each participant the hypothetical updating command corresponding to the respective resource or resources (the step S310).

In each participant, as shown in FIG. 8, when the AP access section 21 receives the hypothetical updating command (the step S340), it issues hypothetical updating commands to the corresponding resources (the step S341), receives a response from each resource as to whether or not the hypothetical updating was successful (the step S341), and sends a message of success or of failure to the coordinator according to this response (the steps S342 and S343).

Referring again to FIG. 6, when the commit management section 501 of the coordinator receives responses of hypothetical updating success or of failure for the participants (the step S310), it notifies the AP principal section 20 of this. The AP principal section 20 checks that the participants have all been successful in the hypothetical updating (the step S311), and if all of them have been successful then it issues the next commit command (the step S314). The commit management section 501 which has received this commit command stores in the log 18 the transaction identification code and the lock identification code and the hypothetical updating command for each of the resources which were stored in the memory in the step S309 (the step S315), and thereafter (the step S316). A commit flag which shows whether or not to commit is included in this unlock command, and the commit flag of the unlock command which is issued in the step S316 is ON (which means to commit).

In each of the participants, as shown in FIG. 9, when the lock management section 503 receives the unlock command (the step S351), the commit flag is checked (the step S352), and if the commit flag is ON commit commands are issued (the step S353) for the corresponding resources 16 and 17. Each of the resources 16 and 17 for which the commit command has been received, along with performing actual updating of itself, stores the update image logs 26 and 27 for local recovery (the step S354). After this, the lock management section 503 releases the lock which was stored in the previous lock command procedure (the step S355), and stores the transaction identification code and an unlock mark in the unlock log 25 (the step S356).

Referring again to FIG. 6, after the commit management section 501 of the coordinator has issued the commit command in the step S316, it is not concerned with whether or not the commit has actually been successful in each of the participants, and it directly notifies the AP principal section 20 of the conclusion of the transaction, and the AP principal section 20 notifies the terminal that the transaction has been committed, and the processing of this transaction is concluded.

In this connection, if in the step S305 the AP principal section 20 of the coordinator recognizes that even one of the participants has failed in the lock, then it issues a rollback command (the step S306); and further, if in the step S311 it recognizes that even one of the participants has failed in the hypothetical updating, then it issues a rollback command (the step S306). In response to the rollback command, the commit management section 501 revokes the transaction information (the transaction identification code, the lock identification code, and so on), and issues a rollback command to the lock management section 503 of each of the participants (the steps S307 and 313).

In each of the participants which has received the rollback command, as shown in FIG. 10, the lock management section 503 receives the rollback command (the step S361), and issues rollback commands to the corresponding resources 16 and 17 (the step S362). Each of the resources 16 and 17 performs rollback processing of itself (the step S363). And the lock management section 503 releases the lock which it has stored (the step S364), and stores the transaction identification code and the unlock mark in the unlock log 25 (the step S365).

Transaction processing is performed in the above manner. In this process, although the transaction is rolled back when a breakdown has occurred in a participant during the processing of a lock command or during the processing of a hypothetical updating command, by contrast to this, the transaction is not rolled back but is processed as a committed one even when a breakdown has occurred in a participant during the processing of a commit command. After this, the resource can be restored in the correctly committed state by performing the recovery procedure in the participant in which the breakdown has occurred.

In the following, this recovery procedure will be explained with reference to FIG. 11 through FIG. 14.

Figure 11:
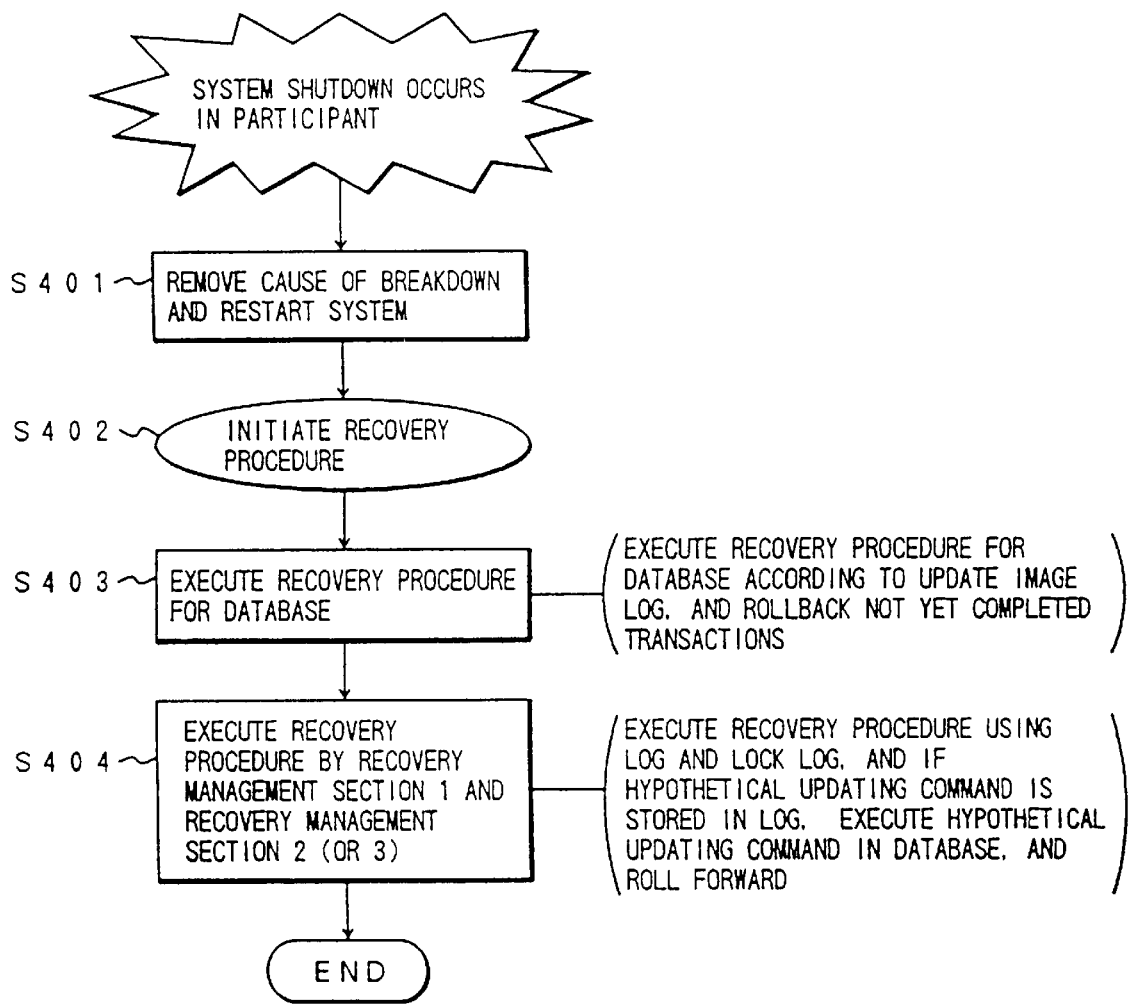
FIG. 11 is a flow chart showing an overall processing procedure for processing recovery from the occurrence of a breakdown.
Figure 12:
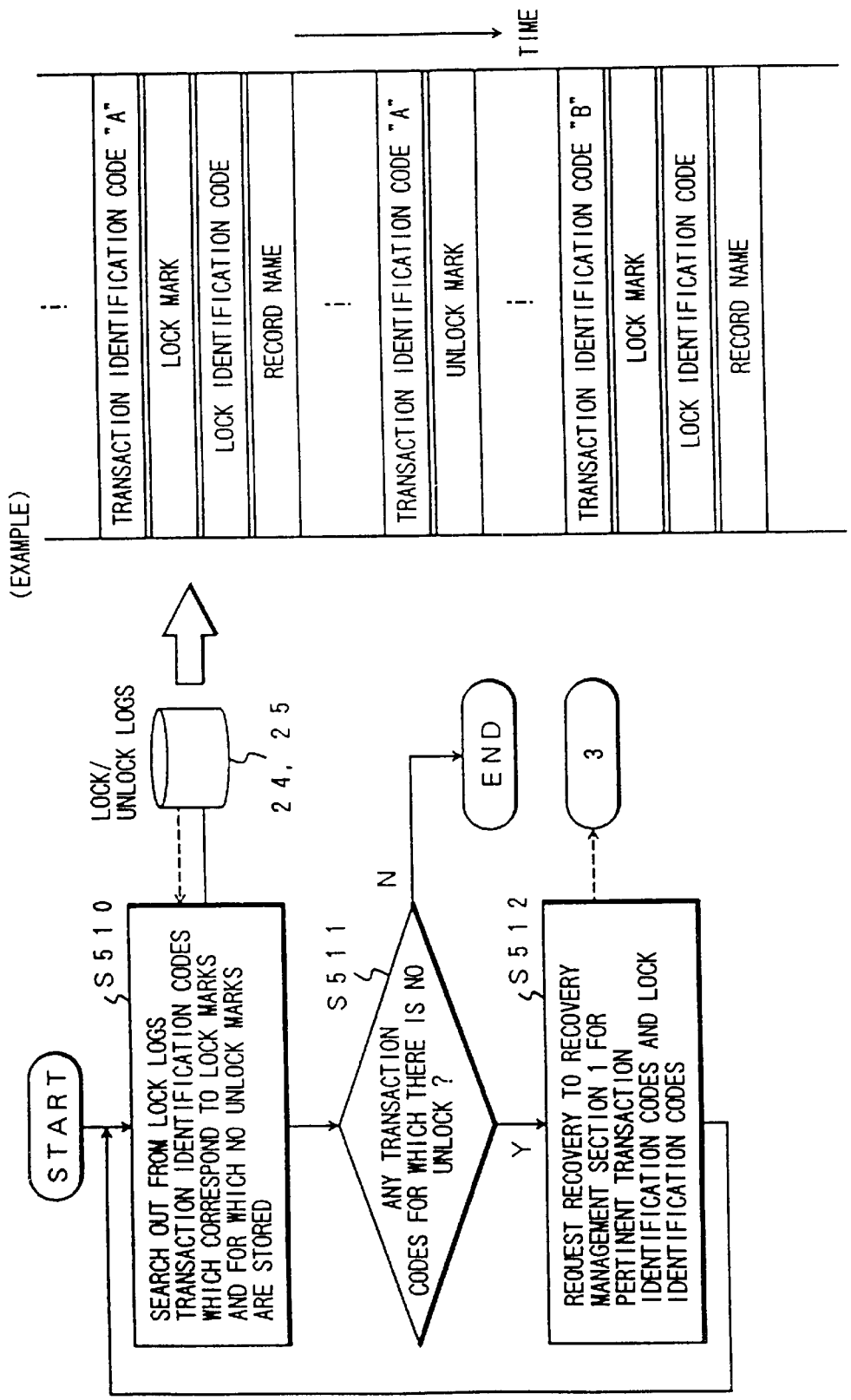
FIG. 12 is a flow chart showing a recovery request processing procedure for a recovery management section 504 of each of the participants.
Figure 13:
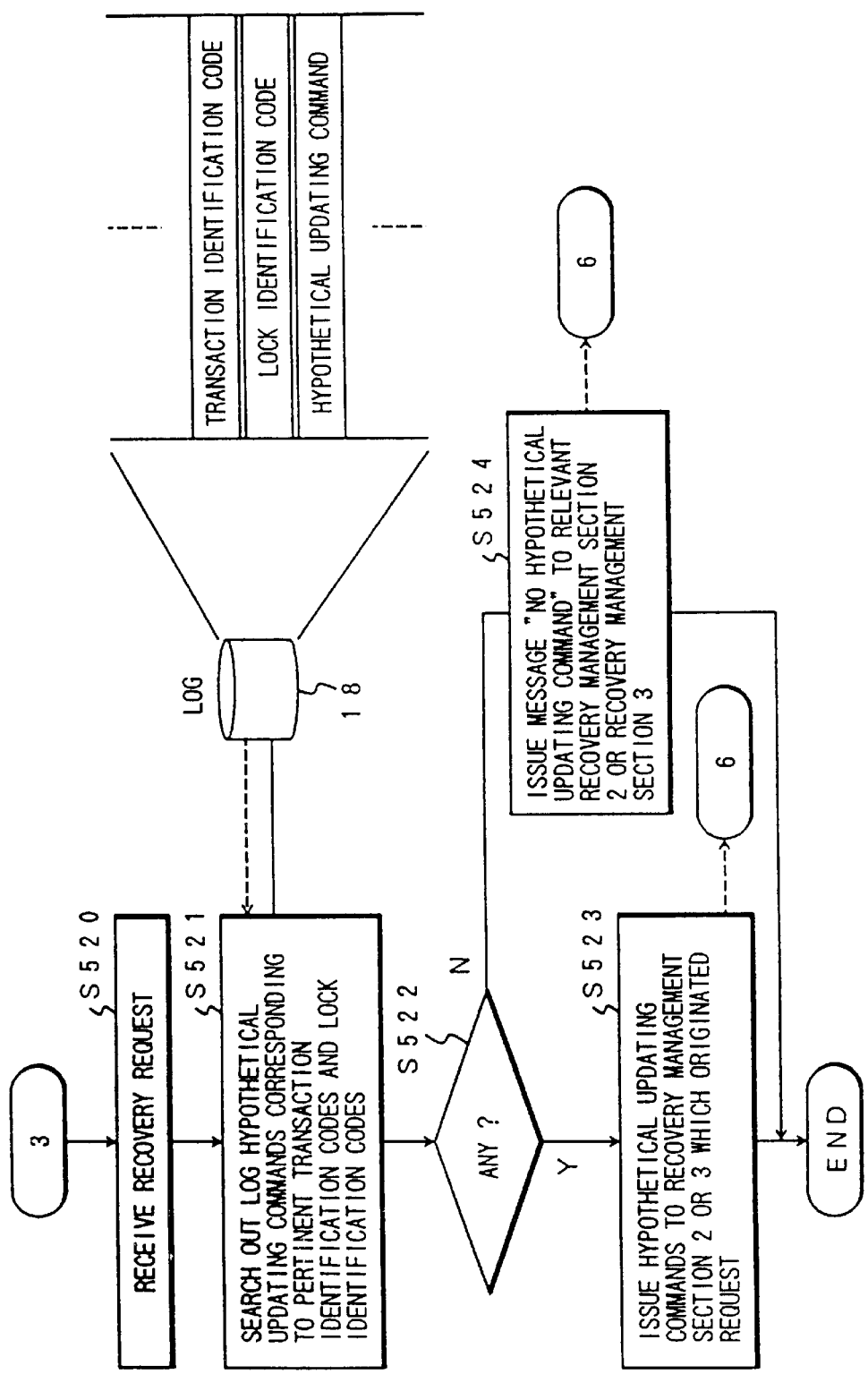
FIG. 13 is a flow chart showing a recovery processing procedure for a recovery management section 502 of the coordinator.
Figure 14:
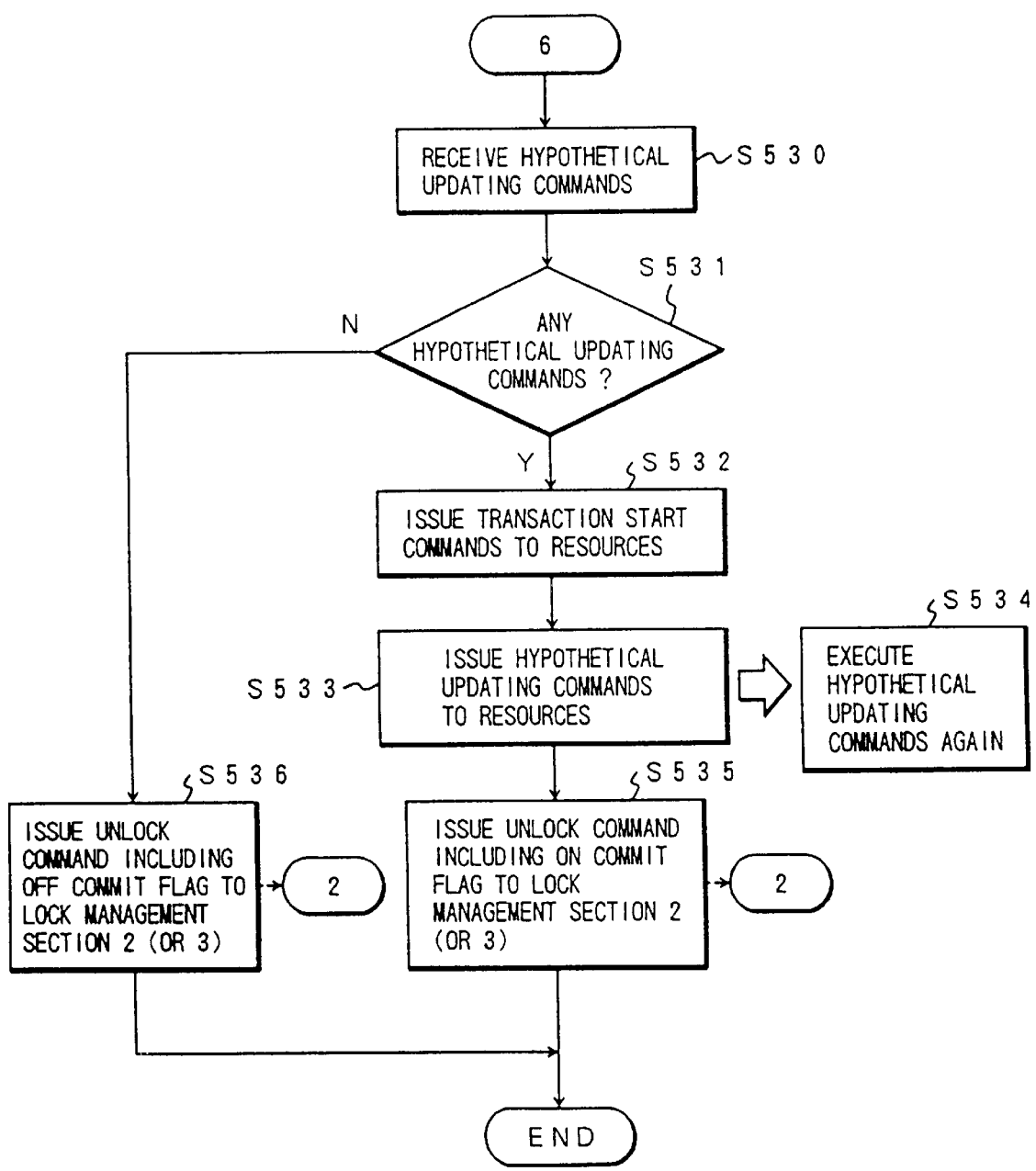
FIG. 14 is a flow chart showing a recovery execution processing procedure for each of the participants.

FIG. 11 shows the overall processing procedure for processing recovery from the occurrence of a breakdown. FIG. 12 shows the recovery request processing procedure for the recovery management section 504 of each of the participants. FIG. 13 shows the recovery processing procedure for the recovery management section 502 of the coordinator. FIG. 14 shows the recovery execution processing procedure for each of the participants.

As shown in FIG. 11, when a breakdown such as a system shutdown occurs in any one of the participants, initially operation is performed by the operator to remove the cause of breakdown in this participant, and after this the system is restarted (the step S401). Directly after this restart the recovery procedure is initiated (the step S402). In the recovery procedure, first, each of the resources 16 and 17 performs local recovery processing by referring to its own update image log 26 or 27 (the step S403). That is to say, it updates its own contents relating to the transactions which have been committed according to the update images which are recorded in the update image log 26 and 27, and moreover it rolls back the transactions which have not yet been committed. The integrity within each of the resources 16 and 17 is restored by this local recovery procedure.

After the local recovery procedure for each of the resources, a global recovery procedure is performed (the step S404) by the recovery management sections 502 and 504 of the coordinator and the participant. This global recovery procedure is for restoring the integrity of the resources over the entire system. This global recovery procedure consists of three stages, to wit: request for recovery to the recovery management section 502 of the coordinator from the recovery management section 504 of the participant (FIG. 12); recovery processing by the recovery management section 502 of the coordinator (FIG. 13); and recovery execution processing by the recovery management section 504 of the participant (FIG. 14).

In the first stage shown in FIG. 12, first the recovery management section 504 of the participant searches out from the lock and unlock logs 24 and 25 the transaction identification codes which only have a lock mark and do not have any unlock mark (the step S510). For example, in the example shown in the figure, since the transaction identification code "A" has both a lock mark and an unlock mark, it is not picked out by the search. On the other hand, because the transaction identification code "B" does not have an unlock mark, it is picked out by the search.

By doing this the transaction identification codes which are not committed are sought out and extracted, and the recovery management section 504 of the participant next transmits the pertinent transaction identification codes and lock identification codes to the recovery management section 502 of the coordinator, and requests recovery (the steps S511 and S512).

Next, in the second stage shown in FIG. 13, the recovery management section 502 of the coordinator receives the recovery request (the step S520), and searches out the hypothetical updating commands corresponding to the pertinent transaction identification codes and lock identification codes from the log 18 (the step S521). And if the pertinent hypothetical updating commands have been found (the step S522), these hypothetical updating commands are issued to the recovery management section 504 of the participant which originated the request (the step S523). On the other hand, if the pertinent hypothetical updating commands have not been found, a message "no hypothetical updating command" is issued to the recovery management section 504 of the participant which originated the request (the step S524).

In the third stage shown in FIG. 14, the recovery management section 504 of the participant receives the pertinent hypothetical updating commands or a message "no hypothetical updating command" from the recovery management section 502 of the coordinator (the step S530). If the hypothetical updating command has been received (the step S531), the recovery management section 504 of the participant issues transaction start commands to the resources 16 and 17 (the step S532), and next issues the hypothetical updating commands (the step S533). By doing this, the hypothetical updating commands for the resources 16 and 17 are executed again (the step S534). Next, the recovery management section 504 for the participant issues an unlock command which includes an ON commit flag to the lock management section 503 (the step S535). Due to this, the lock management section 503 performs the unlock command procedure shown in FIG. 9, and as a result the actual updating of the resources 16 and 17 is performed.

On the other hand, if the "no hypothetical updating command" message has been received from the coordinator, then the recovery management section 504 of the participant issues an unlock command which includes an OFF commit flag to the lock management section 503 (the step S536). By doing this, the lock management section 503 performs the unlock command procedure shown in FIG. 9, and as a result the actual updating of the resources 16 and 17 is performed.

Since according to the above recovery procedure the resources of the server in which the breakdown has occurred are forcibly restored to the state in which all of the transactions were correctly committed, therefore over the system as a whole the consistency of the resources is ensured. Further, it is possible to lighten the load upon the application program, since there is no requirement for the application program to execute the transaction processing for a second time in order to perform the recovery.

Figure 15:
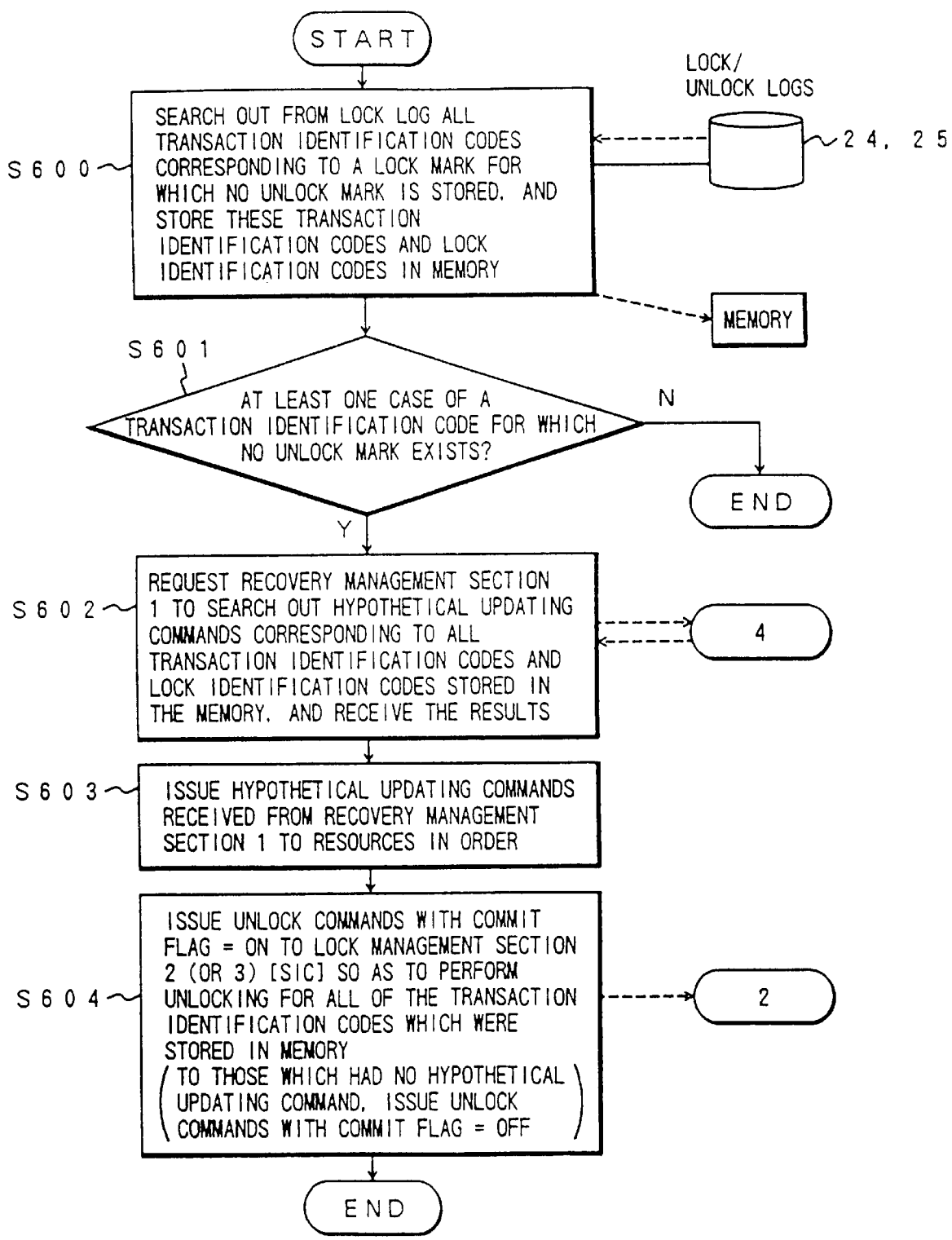
FIG. 15 is a flow chart showing another processing procedure for the recovery management section 504 for recovery processing.
Figure 16:
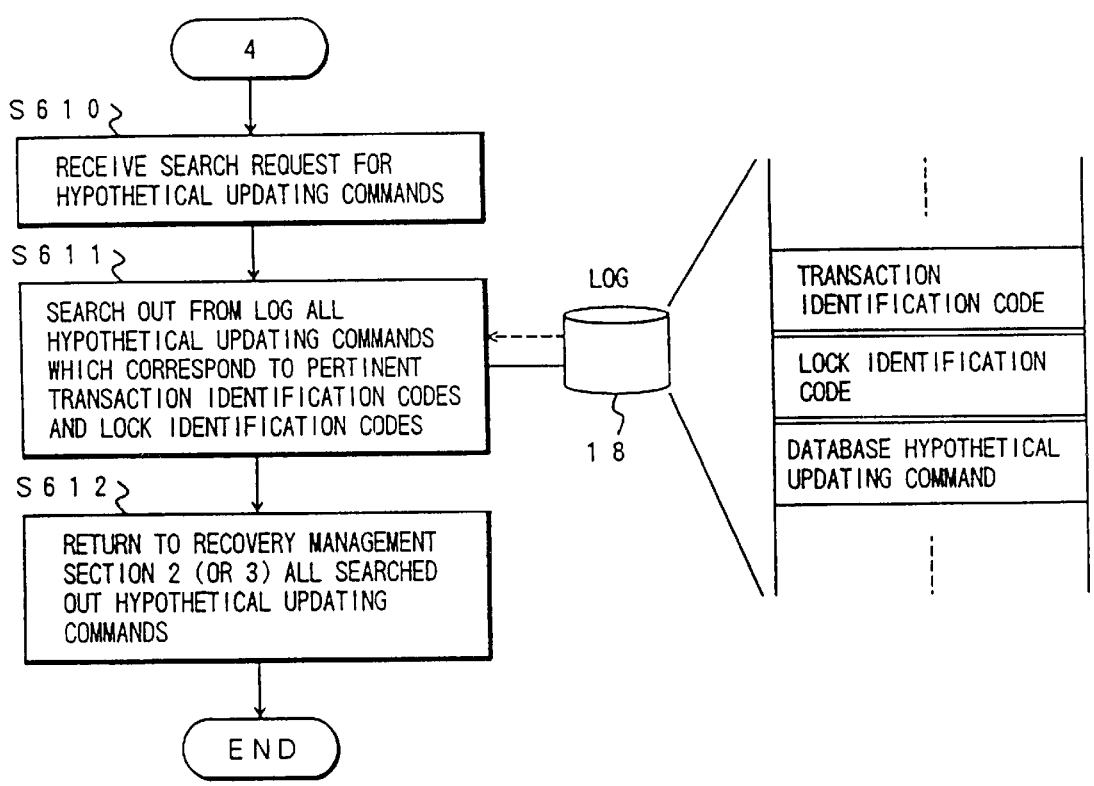
FIG. 16 is a flow chart showing another processing procedure for the recovery management section 502 for recovery processing.

FIG. 15 and FIG. 16 show a variant of the recovery procedure. With this variant, the hypothetical updating commands are not sent from the coordinator to the participant one by one as with the above described recovery procedure, but instead all of the hypothetical updating commands which are required for the recovery are sent from the coordinator to the participant together.

As shown in FIG. 15, the recovery management section 504 of the participant which started the recovery procedure first searches out from the lock and unlock logs 24 and 25 all of the transaction identification codes for which only a lock mark exists but no unlock mark exists, and stores in the memory these transaction identification codes and lock identification codes (the step S600). If as a result of this there is at least one case of a transaction identification code for which no unlock mark exists (the step S601), then next all of the transaction identification codes and lock identification codes which have been stored in the memory are sent to the coordinator, and it is requested to search out the corresponding hypothetical updating commands (the step S602).

Next, the recovery management section 502 of the coordinator receives the above described search request as shown in FIG. 16 (the step S610), searches out from the log 18 (the step S611) the hypothetical updating commands which correspond to all of the transaction identification codes and lock identification codes which have been requested, and returns all the hypothetical updating commands which have been searched out to the recovery management section of the participant which originated the request (the step S612).

Referring again to FIG. 15, the recovery management section 504 of the participant receives (the step S602) from the coordinator all of the hypothetical updating commands which have been requested, and next issues the hypothetical updating commands which have been received to the resources 16 and 17 in order (the step S603). Next, the recovery management section 504 issues unlock commands which have ON commit flags to the lock management section 503, in order to perform unlocking for all of the transaction identification codes which were stored in the memory (the step S604). Moreover, it issues unlock commands which have OFF commit flags with regard to transactions for which hypothetical updating commands were not received from the coordinator. By doing this, updating relating to all the transactions which have not yet been committed is executed, and the resources 16 and 17 are restored in the correct state.

6.2 The Second Embodiment

As has already been explained, there is the problem with log storage procedures in prior art systems that, although they are suitable either for times of high traffic or for times of low traffic, there are none which are suitable for both these cases.

In detail, the log storage techniques of Japanese Patent Laying Open Publication Showa 62-26643 and of Japanese Patent Laying Open Publication Heisei 4-133158 are known as prior art.

In the system of Japanese Patent Laying Open Publication Showa 62-26643, during log entry storage, the queued log write requests are all extracted, and thereafter the log data related to these request are written into storage together. However, with this system, in times such as ones of high traffic, if log write requests continuously arrive and are entered into the queue, the state of affairs occurs that it is never possible to start writing the log no matter how long a time passes, because the extraction of all of the log requests never terminates no matter how many log write requests are extracted from the queue.

With the system of Japanese Patent Laying Open Publication Heisei 4-133158, the log data are first accumulated in the memory, and then if any on of the conditions (1) that a specified number of items of log data have been accumulated in the memory, or (2) that a specified time period has elapsed, or (3) that a specific item of log data has been generated, is satisfied, then the log data in the memory is transferred to storage all together. With this system, the log data is left just as it is in the memory until any one of the above described conditions (1), (2), or (3) is satisfied. As a result, if the time interval until the above described condition is satisfied is long, as in times of low traffic, the log data stands by uselessly for a long time in memory, and is not stored in storage for an indefinite time period.

Figure 17:
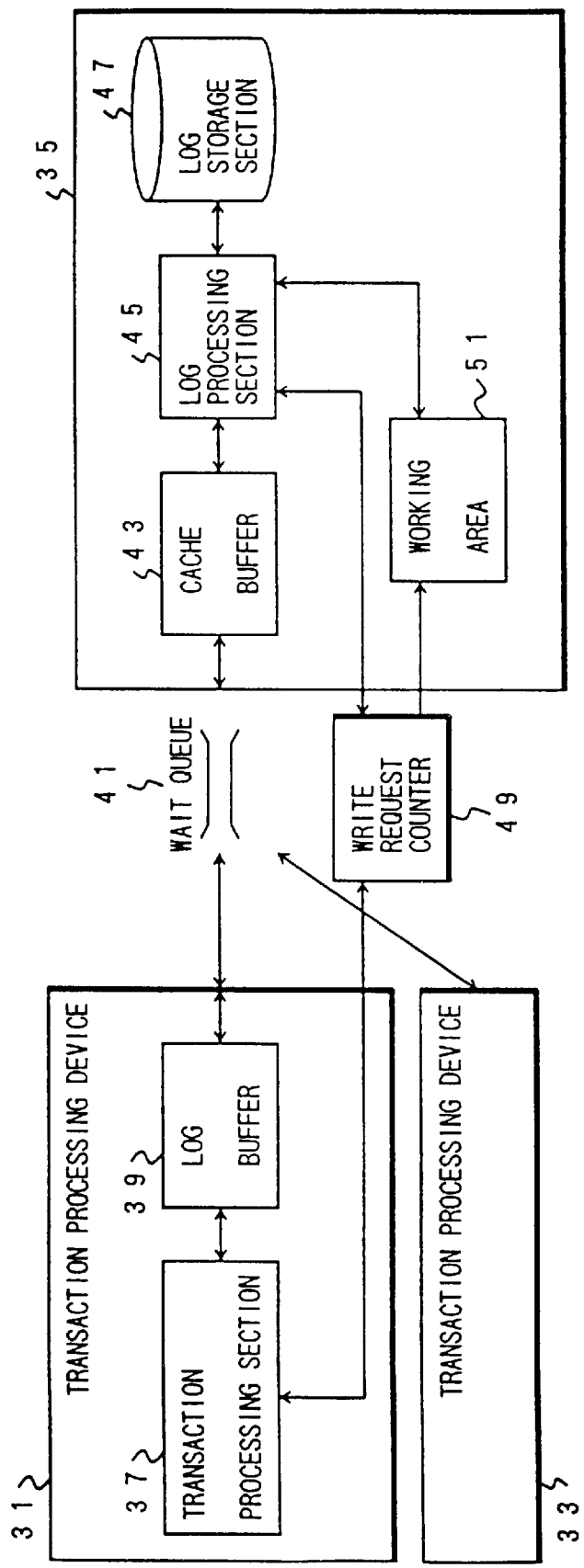
FIG. 17 is a block diagram showing a second embodiment of the transaction processing system according to the present invention, which incorporates improvements for storing a plurality of logs all together.

With the embodiment of the present invention shown in FIG. 17, it is possible to process the log write requests steadily even in the case when in times of high traffic these log write requests arrive continuously in large volume; and on the other hand it is possible to process log write requests directly without uselessly making them wait for long periods in the case when in times of low traffic the arrival of these requests has diminished.

As shown in FIG. 17, one or more transaction processing devices 31 and 33 and a log processing device 35 are linked so that signals can be transmitted between them. These processing devices 31, 33, and 35 may be separate processing devices, like the plurality of servers shown in FIG. 1, which are connected by a transmission network or the like; or they may be separate programs which are being executed by a single processing device, like the application programs and the resource synchronization management sections shown in FIG. 1.

Each of the transaction processing devices 31 and 33 comprises a transaction processing section 37 and a log buffer 39. The log processing device 35 comprises a log write request wait queue 41, a cache buffer 43, a log processing section 45, a log storage section 47, a write request counter 49, and a working area 51. This log processing device 35 is jointly owned by the plurality of transaction processing devices 31 and 33.

The functions of the various parts may be summarized as follows.

The transaction processing section 37 has the function of processing transactions. This transaction processing section 37, for processing each transaction, writes in the log buffer 39 the log data (the contents of the various changes made to the resources) which have been generated by this transaction, enters a write request for this log data in the wait queue 41, and also increases the write request counter 49 by 1. The log buffer 39 is some area in the memory (a volatile storage medium such as RAM or the like).

The wait queue 41 is a memory region into which log write requests from the transaction processing devices 31 and 33 are input and in which they wait. The write request counter 49 is a region in memory in which the number of log write requests present in the wait queue 41 is recorded. Other than log write requests, write requests for various forms of log and messages and various read out requests and the like are also input into the wait queue 41. In order to do this, separate information for the different types of request is also recorded in the write request counter 49 along with the number of requests which are waiting in the wait queue 41. In the following description, the explanation will be made from the viewpoint of the log write requests only.

The cache buffer 43 is a region in memory into which log data in the log buffer 39 is copied. The work area 51 is a region in memory into which the value of the write request counter 49 is copied. The log storage section 47 is a non volatile storage medium such as a magnetic disk or the like in which the log data is finally written and kept.

The log processing section 45 has the function of performing write processing for a plurality of items of log data together. In this processing, the log processing section 45 first copies the value of the write request counter 49 into the work area 51, next copies a number of items of log data equal to the value which was copied into this work area 51 in order (while repeatedly reducing the counter 39 and the value in the work area by one) into the cache buffer 43 from the log buffer 39, and writes the log data which has been copied all together into the log storage section 47. This series of procedures is repeated continuously without respite until the value of the counter 49 becomes zero.

Figure 18:
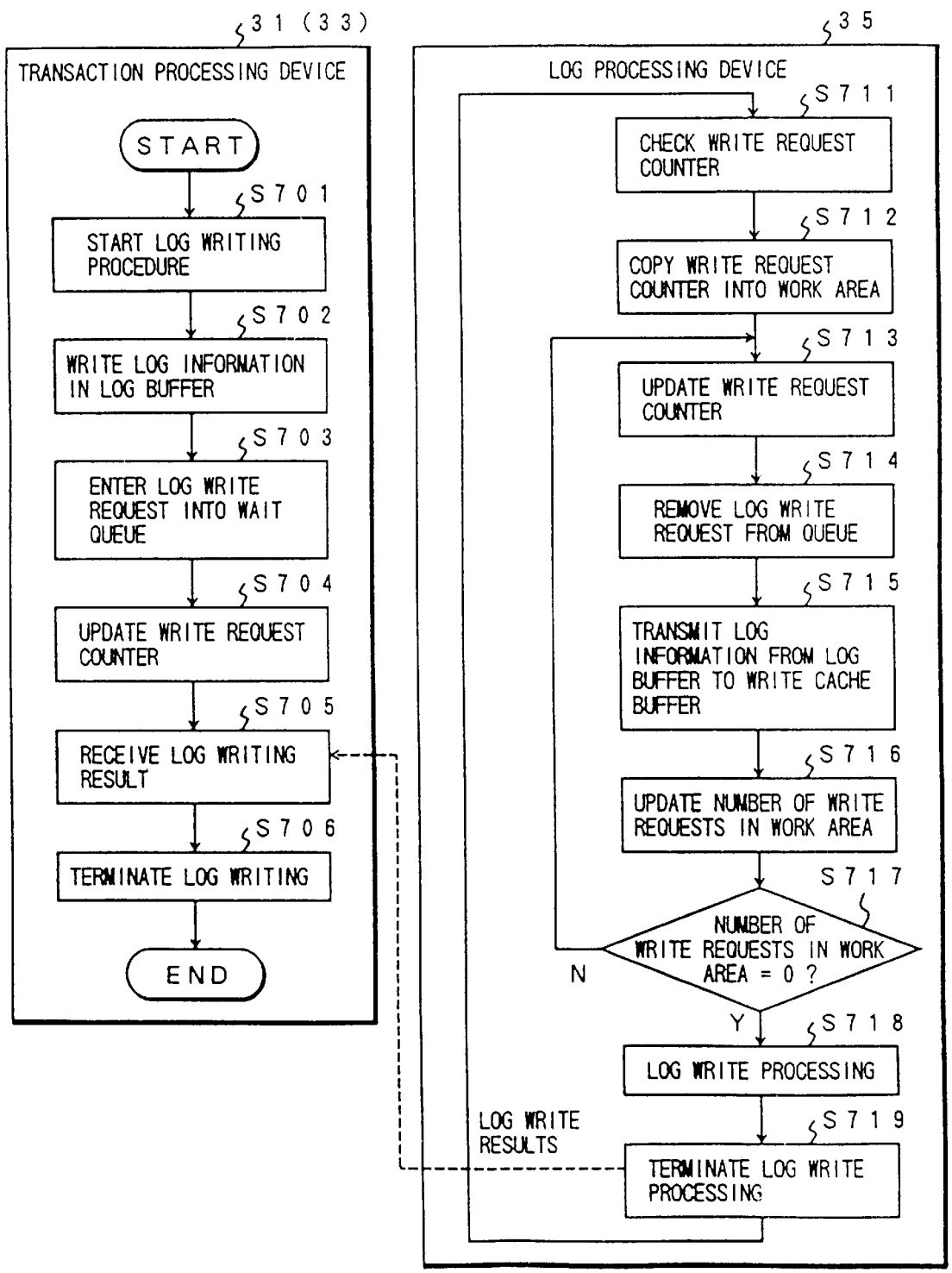
FIG. 18 is a flow chart showing the operation of this second embodiment.

FIG. 18 shows the operational flow of this embodiment.

As shown in FIG. 18, the transaction processing section 37 in each of the transaction processing devices 31 and 33 starts the log writing procedure (S701) at a certain stage in processing each transaction. In this procedure, the transaction processing section 37 writes the log data in the log buffer 39 (S702), enters the log write request into the wait queue 41 (S703), and increases the write request counter 49 by 1 (S704). After this the system waits until the result of writing the log is output from the log processing device 35, and when the log writing result is output this is received (S705), and the pertinent log writing procedure is terminated (S706).

By performing the above procedure in each of the transaction processing devices 31 and 33, the log write requests which are issued by the transaction processing devices 31 and 33 are placed in order into the wait queue 41, and also the number of the log write requests which are present in this wait queue 41 is recorded in the write request counter 49.

In the log processing device 35, the log processing section 45 checks the number of write requests in the write request counter 49 (S711), and 51 if this value is greater than or equal to 1 (S712).

Next, the log processing section 45 reduces the number of write requests in the write request counter 49 by just 1 (S713), removes the leading log write request from the wait queue 41 (S714), specifies from this dequeued write request the transaction processing device 31 (or 33) which issued this request, extracts the log data relating to the pertinent request from the log buffer 39 of this transaction processing device which was specified and transmits it to the cache buffer 43 (S715), and reduces the number of write requests in the work area 51 by one (S716). The above procedure from the step S713 to the step S716 is repeated until the number of write requests in the work area 51 becomes zero (S717). By doing this, a number of items of log data which corresponds to the number of write requests in the work area 51 is transmitted to the cache buffer 43 of the log processing device 35 from the log buffers of the transaction processing devices 31 and/or 33.

After this, the log processing section 45 of the log processing device 35 writes all of the log data which have been accumulated in the cache buffer 43 all together into the log storage section 47 (S718), and, if this writing as a group is successful, returns the result of log writing to the transaction processing devices 31 and/or 33, and completes the log writing procedure (S719).

When by doing this the log writing procedure is completed, the log processing section 45 returns directly to the step S711, and, only if the value of the write request counter 49 is greater than or equal to 1 (in other words, only if a write request is still present in the wait queue 41), again repeats the procedure of the steps S711 through S719. By doing this, the log processing device 35 repeatedly continues the processing of the log write requests in the wait queue 41. Accordingly, in the case that the arrival of log write requests has become sparse as during times of low traffic or the like, these requests are hardly caused to wait at all, and it is possible to execute their log write procedures promptly.

Further, it is possible for the log processing device 35 to execute the log writing procedure steadily and absolutely without any problem, even in the case that a large volume of log write requests arrives continuously without interruption as during times of high traffic or the like, since it is so arranged that only a number of items of log data which corresponds to the value in the write request counter 49 at the time point of the step S711 are processed together.

Further, the log processing device 35 extracts the write requests from the wait queue 41 one at a time, transmits the log data relating to each request from the log buffer 39 to the cache buffer 43, and transmits all the log data in the cache buffer 43 all together to the log storage section 47 after a plurality of log data items have been accumulated in the cache buffer 43, so that by doing this the number of input and output operations to and from the log storage section 47 is very much reduced. Generally the time period for transmitting data to storage, such as for writing data to the log storage section 47, is long in comparison with the time period for transmitting data from memory to memory, such as for transmitting data from the log buffer 39 to the cache buffer 43, which is extremely short. Thus the throughput for a plurality of log writes is elevated, by reducing in the manner described above the number of data transmissions to the log storage section 47, which take considerable time.

6.3 The Third Embodiment

As has been described above, there is the problem with prior art transaction processing systems that the timer period for storing the log entry for one transaction is long. In more detail, with prior art systems, in order to securely record log data, the storage procedure for log data is performed one by one each time when each transaction is committed. For this reason, the log storage procedure is repeated a number of times exactly equal to the number of transactions which are committed. As a result, the number of times data is output to storage becomes great, and accordingly the actual time period for log storage for one transaction becomes long. In many cases the throughput of prior art systems is low because the throughput for transaction processing is determined by the time period for log storage.

With the third embodiment of the present invention explained in the following, the actual time period for log storage for one transaction is shorter than in the prior art, and the throughput for transaction processing is higher.

Figure 19:
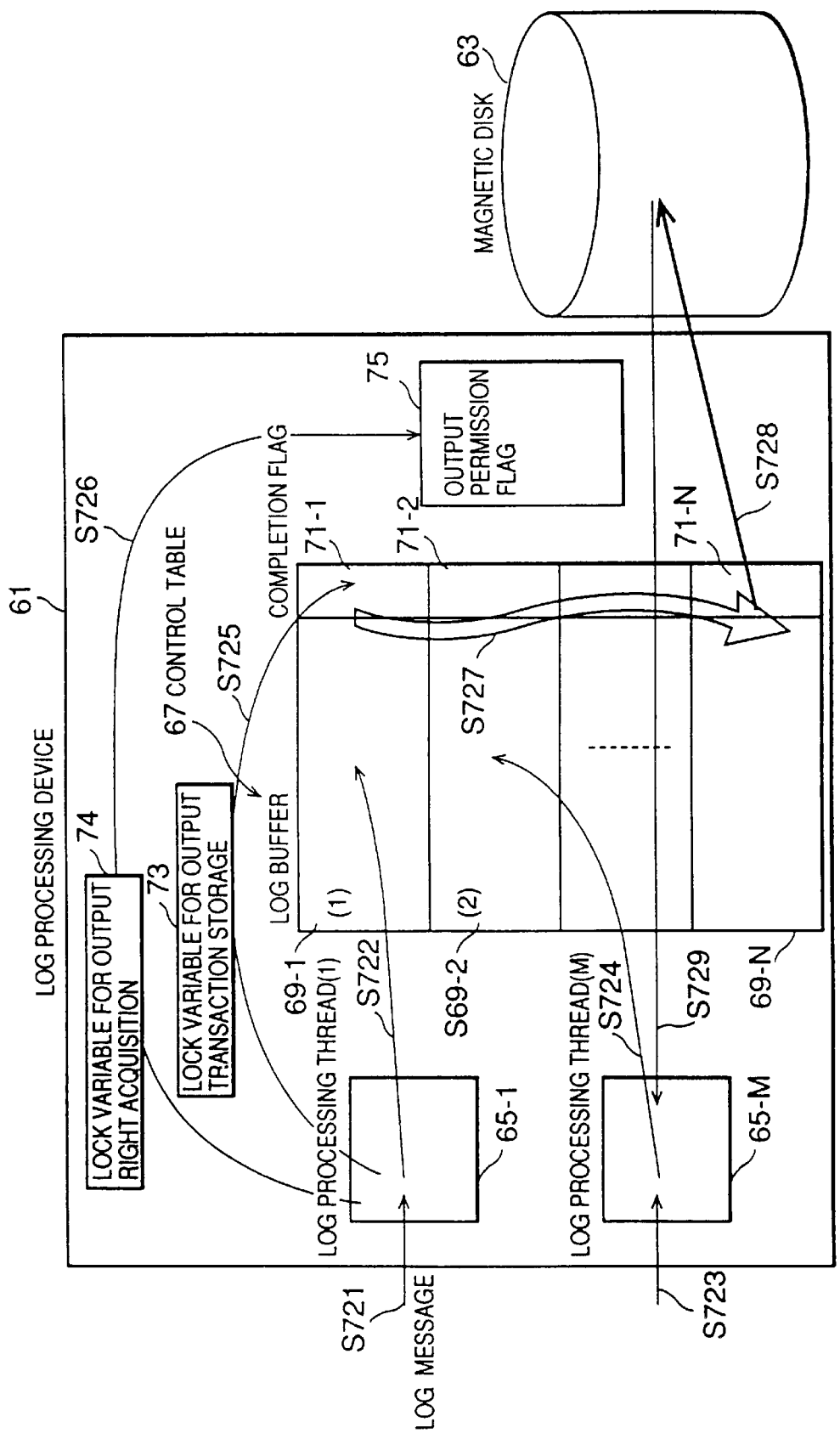
FIG. 19 is a block diagram showing the construction of a third embodiment of the present invention.

FIG. 19 shows the structure of this third embodiment. A log processing device 61 comprises a magnetic disk 63 which stores the log files, and receives log messages for individual transactions from external transaction processing devices not shown in the figure and stores log data including these received messages in a log file on the magnetic disk 63.

With this log processing device 61, a multithread system is employed as the control structure for log processing. If a plurality of log messages arrive successively, a log processing thread 65-1 (. . . , 65-M) which handles the processing of each log message is started successively as this message arrives, and the processing of each of the log entries proceeds in parallel.

A control table 67 is provided in the memory of the log processing device 61. This control table 67 has an allocated area for each of the log processing threads 65-1 (. . . , 65-M) which have been started, and each area consists of a log buffer 69-1 (69-2, ... 69-N) and a completed flag 71-1 (71-2, 71-N). In the exemplary case shown in FIG. 19, two log processing threads 65-1 and 65-M have been started, and the initial area of the control table 67 (the log buffer 69-1 and the completed flag 71-1) are allocated to one of the log processing threads 65-1, while the second area (the log buffer 69-2 and the completed flag 71-2) is allocated to the other log processing thread 65-M.

The log buffer 69-1 (69-2, ..., 69-N) is a memory region for temporarily keeping log data including the log message which has been received. The completion flag 71-1 (71-2, ..., 71-N) is a flag for indicating the stages of progress of the log storage procedure based upon the log messages which have been received, and is able to indicate the following four types of stage. In detail, the four stages are: "writing", which means that the log data is being written into the log buffer 69; "writing completed" which means that writing in the log buffer 69 has been completed; "outputting" which means that output from the log buffer 69 to the magnetic disk 63 is in progress; and "outputting completed" which means that output to the magnetic disk 63 has been completed.

Further, a lock variable 73 for output transaction storage, a lock variable 74 for output right acquisition, and a permission flag 75 for output right acquisition are provided in the memory of the log processing device 61. Here, the lock variable 73 for output transaction storage is a control variable for, when some log processing thread 5 checks the completion flag 11, preventing (locking) rewriting of the completion flag 11 by other log processing threads. Further, the lock variable 74 for output right acquisition is a control variable for, when some log processing thread 5 checks the permission flag 75 for output right acquisition, preventing (locking) rewriting of the permission flag 75 for output right acquisition by other log processing threads. Further, the permission flag 75 for output right acquisition is a flag which shows whether or not any log processing thread 5 can acquire the right to output the log in the log buffer 9 to the magnetic disk 63 (the output right), and if its value is "permitted" this means that the output right can be acquired, while if its value is "not permitted" this means that the output right cannot be acquired.

In the following, taking as an example the two log processing threads 65-1 and 65-M, an outline of their operation will be explained.

When a commit command for some transaction is issued from any of the transaction processing devices, a log message arrives at the log processing device 61 (S721), and in response to this a first log processing thread 65-1 is started. In the log processing thread 65-1, first, after the corresponding completion flag 7-11 has been set to "writing", the log data is written into the corresponding log buffer 69-1 (S722), and when this writing has been completed, after the lock variable 73 for output transaction storage is set to "locked", the completion flag 71-1 is set to "writing completed", and the lock variable 73 is again returned to "unlocked".

Next, when a commit command for a different transaction is issued, a different log message arrives (S722), and in response to this a second log processing thread 65-M is started, and the log data is written into the corresponding log buffer 69-2 (S724). The operation of this second log processing thread 65-M is performed in parallel with the operation of the first log processing thread 65-1.

In the first log processing thread 65-1, when the writing of the log data has been completed and the lock variable 73 has been set to "locked", the completion flag 7-11 is checked (S725), and if it is verified that it is "writing completed" then an attempt is made to acquire the output right. In detail, first, after the lock variable for output right acquisition has been set to "locked", the permission flag 75 for output right acquisition is checked (S726), and if this is equal to "permitted" then the log processing thread 65-1 acquires the output right. When the output right is acquired, the log processing thread 65-1 sets the permission flag 75 to "not permitted", and moreover temporarily returns the lock variables 73 and 74 to "unlocked".

When the lock variable 73 is returned to "unlocked", the second log processing thread 65-M also attempts to acquire the output right in the same manner. However, since the permit flag 75 is already set to "not permitted", the log processing thread 65-M cannot acquire the output right, and waits for output completed notification from the first log processing thread 65-1.

On the other hand, the first log processing thread 65-1 which has acquired the output right checks all of the completion flags 71-1, 71-2, ... 71-N in the control table 67, and selects all of the log buffers 71-1 and 72-2 which are "writing completed" and changes them to "outputting" (S727). Next the first log processing thread 65-1 returns the permission flag 75 to "permitted", and outputs the log data of the log buffers 71-1 and 71-2 which have been selected all together to the magnetic disk 63 (S728). When this all together outputting to the magnetic disk 63 is completed, the log processing thread 65-1 sets the completion flags 71-1 and 71-2 to "output completed", and sends a notification of output completion to the second log processing thread 65-M.

In the above manner, when a plurality of log messages arrive, along with starting a plurality of log processing threads and writing a plurality of items of log data in parallel into the buffer, one from among these plurality of log threads acquires the output right, and outputs to the magnetic disk 63 all together the plurality of items of log data which were written in parallel into the buffer. As a result, the log storage procedure for one transaction is completed in an extremely short period of time.

Figure 20:
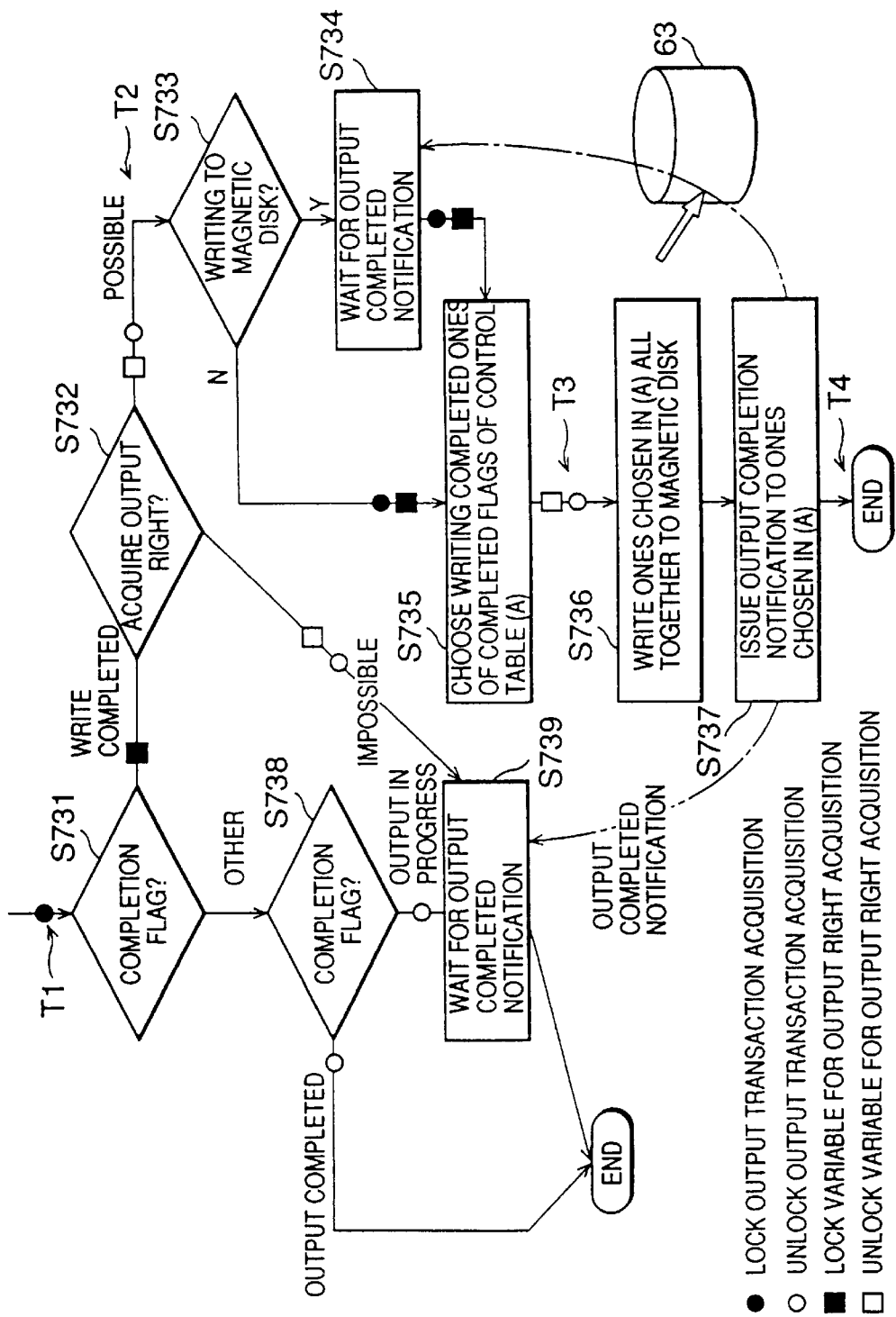
FIG. 20 is a flow chart showing the operation of logging processing threads in this third embodiment.

FIG. 20 shows the details of the flow of processing which each log processing thread 65-1 (..., 65-M) performs after the writing of the log data has been completed.

In the following this operation will be explained in detail with reference to FIG. 20, taking by way of example the log processing threads 65-1 and 65-M which have already been explained.

As has already been explained, when the writing of the log data into the log buffer 69-1 has been completed, the first log processing thread 65-1 sets the completion flag 71-1 to "writing completed". From this state, as shown in FIG. 20, the log processing thread 65-1 first, after it has locked the lock variable 73 for output transaction storage (at the time point T1), checks the completion flag 71-1 (S731). Since the result of this is "write completed", the log processing thread 65-1 next, after it has locked the lock variable 74 for output right acquisition, refers to the permission flag 75 for output right acquisition and makes a decision as to whether or not it can acquire the output right (S732).

In the step S732, if no other thread has acquired the output right beforehand, the log processing thread 65-1 is able to acquire the output right, since the permission flag 75 is "permitted". Here, the log processing thread 65-1 acquires the output right by setting the permission flag 75 to "not permitted", and temporarily returns the lock variables 73 and 74 to "unlocked" (at the time point T2).

Next, the log processing thread 65-1 checks whether or not any other log processing thread is outputting log data to the magnetic disk 63 (S733), and if such output is taking place then it waits until the output is completed (S734), and then—or, if no such output is taking place, then directly—after again locking the lock variables 73 and 74, all of the completion flags 71-1, 71-2, . . . 71-N in the control table 67 are checked, and all those which are "writing completed" are selected and are changed to "outputting" (S735), and next the permission flag 75 is returned to "permitted", and moreover the lock variables 73 and 74 are again unlocked (at the time point T3).

After this, the log processing thread 65-1 outputs the log data in the log buffers which correspond to the completed flags which have just been changed to "outputting" all together to the magnetic disk 63 (S736). And the log processing thread 65-1, when this outputting has been completed, after the lock variable 73 for output transaction storage has been locked, sets the completed flags for the log data which have been outputted all together to "outputting completed", and again returns the lock variable 73 for output transaction storage to "unlocked", and moreover issues notifications of output completion to the other log processing threads which have been waiting for output completion notification, and then terminates its own processing.

On the other hand, the second log processing thread 65-M, when the writing of its own log data is completed, first in a manner identical to the above tries to lock the lock variable 73 for output transaction storage. In this case, after waiting until the first log processing thread 65-1 unlocks the lock variables 73 and 74 after the step S732, the second log processing thread 65-M locks the lock variable 73, and next checks the completion flag 72-2 (S731). If the result of this is "writing completed", the second log processing thread 65-M, after it has locked the lock variable 74 for output right acquisition, tries to acquire the output right. (S732). However, in this case, since the log processing thread 65-1 has already acquired the output right and the permission flag 75 is "not permitted", therefore the second log processing thread 65-M cannot acquire the output right, and, after it has returned the lock variables 73 and 74 to "unlock", it waits for the output completed notification (S739).

When by doing this the second log processing thread 65-M goes into the waiting state, the first log processing thread 65-1 outputs all the log data together including that for the second log processing thread 65-M, and returns the output completion notification. When this notification is received, the second log processing thread 65-M terminates its own processing.

Suppose that, after the second log processing thread 65-M has been started, a third log processing thread is started. And, if it is supposed that, at the time point that this third log processing thread has completed writing its own log data, the first log processing thread 65-1 has already reached the step S735; then the log data which this third log processing thread has received will also be output all together to the magnetic disk 63 by the first log processing thread 65-1. In this case, since at the stage that the completion flag has been checked in the step S731 the completion flag is equal to "outputting", this third thread progresses from the step S738 to the step S739 and waits for an output completed notification from the first log processing thread 65-1, and terminates its own processing when notification is received. Further, with regard to the timing, there is also the case when at the stage of the step S738 the completion flag is equal to "outputting completed", and in this case the third thread directly terminates processing.

FIGS. 21 through 24 show in detail by stages a concrete example of the log storage procedure executed by the log processing device 61 which is constructed as above. In the following this will be explained in order.

Figure 21:
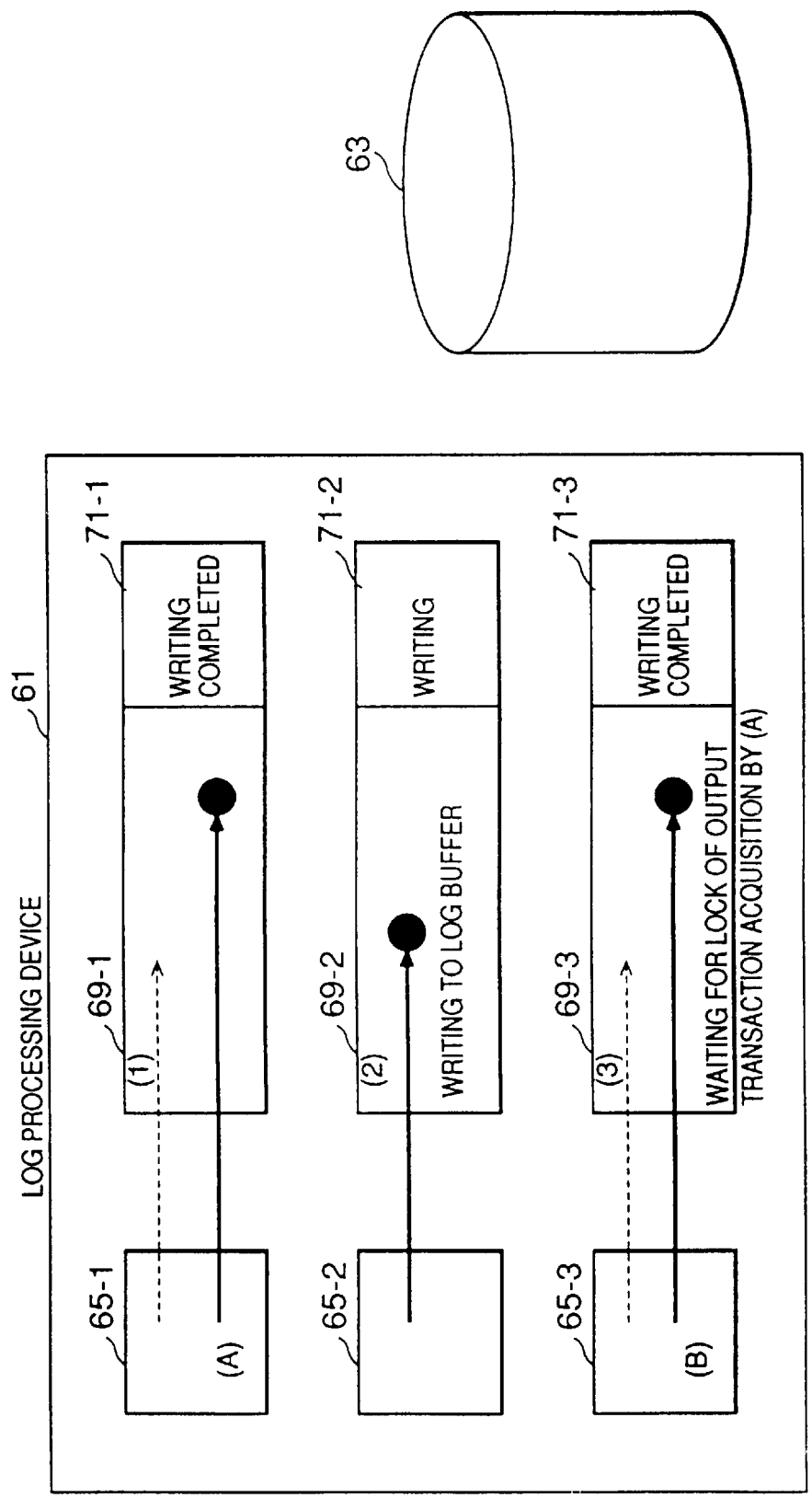
FIG. 21 is an explanatory figure showing in stages the concrete operation of the third embodiment.

It is supposed that, for example, as shown in FIG. 21, the commit commands for three transactions have been issued in succession, and in response thereto three threads 65-1, 65-2, and 65-3 have been started in the order: firstly thread 65-1, secondly thread 65-3 and thirdly thread 65-2. And it is supposed that, at the present time, the thread 65-1, which started first, has completed log writing, and that the system is at the stage at the time point T1 of FIG. 20.

In this case, the first thread 65-1, since it has locked the lock variable 73 for output transaction storage, next tries to acquire the right to output to the magnetic disk 63 (S731, S732). The thread 65-3, which started secondly, also waits until the first thread 65-1 unlocks this variable 73, since the thread 65-3 cannot lock the lock variable 73 for output transaction storage although the writing of the log data has already been completed.

At the present time the thread 65-2, which started thirdly, is receiving log data (is writing). This writing process is being performed in parallel in the operation of the first and the second threads 65-1 and 65-3.

FIG. 22 shows the state at the time point T2 of FIG. 20, at which the first thread 65-1 has acquired the output right and has unlocked the lock variable 73 for output transaction storage and the lock variable 74 for output right acquisition.

In this state, the first thread 65-1 which has acquired the output right, after it has unlocked the two variables 73 and 74, checks whether or not output to the magnetic disk 63 is possible (S733, S734). Since the second thread 65-3 cannot acquire the right to output to the magnetic disk 63 although it has been able to lock the lock variable 73 for output transaction storage, it waits for an output completed notification from the first thread 65-1 (S739).

The third thread 65-2 is still receiving log data, and this processing is performed in parallel with the processing of the other threads.

Further, since the commit command for a new transaction has been issued, a fourth thread 65-4 is started and is receiving log data. This processing as well is performed in parallel with the processing of the other threads.

Figure 23:
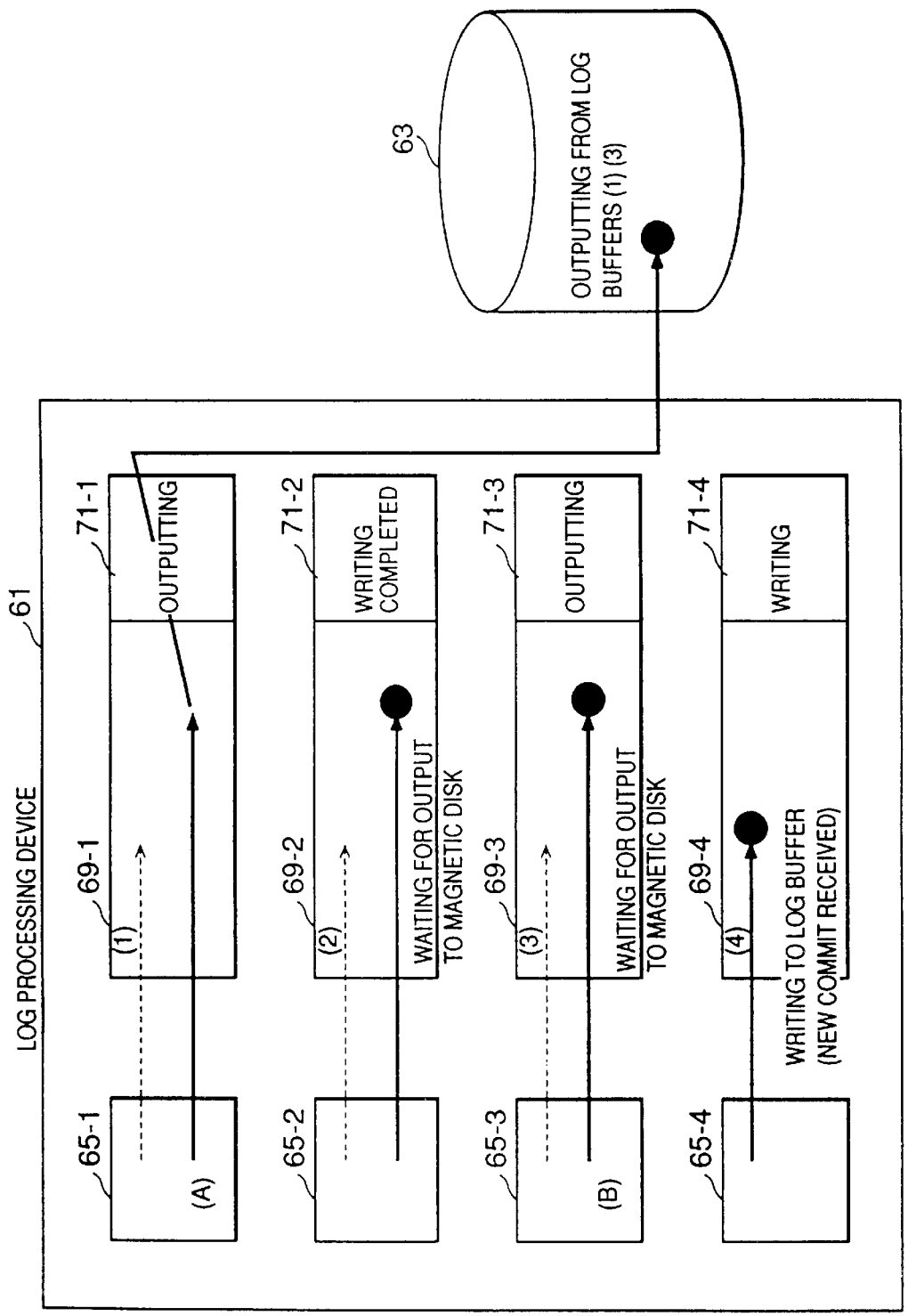
FIG. 23 is an explanatory figure showing in stages the concrete operation of the third embodiment.

FIG. 23 shows the state at the time point T3 of FIG. 20, when the first thread 65-1 has completed the searching of the completion flags 71-1, 71-2, . . ., and output to the magnetic disk 63 has become possible.

In this state, the first thread 65-1 outputs (S736) all together to the magnetic disk 63 the log data from the log buffers 69-1 and 69-3 which correspond to the completion flags 71-1 and 71-3 which were changed to "outputting" in the search stage. And the second thread 65-3 waits for an output completed notification to arrive from the first thread 65-1 (S739).

The third thread 65-2 locks the lock variable 73 for output transaction storage since the receipt of the log data has been completed, and acquires the right to output to the magnetic disk 63 (S732), and next waits for an output completed notification from the first thread 65-1 (S734).

The fourth thread 65-4 is still receiving log data.

Figure 24:
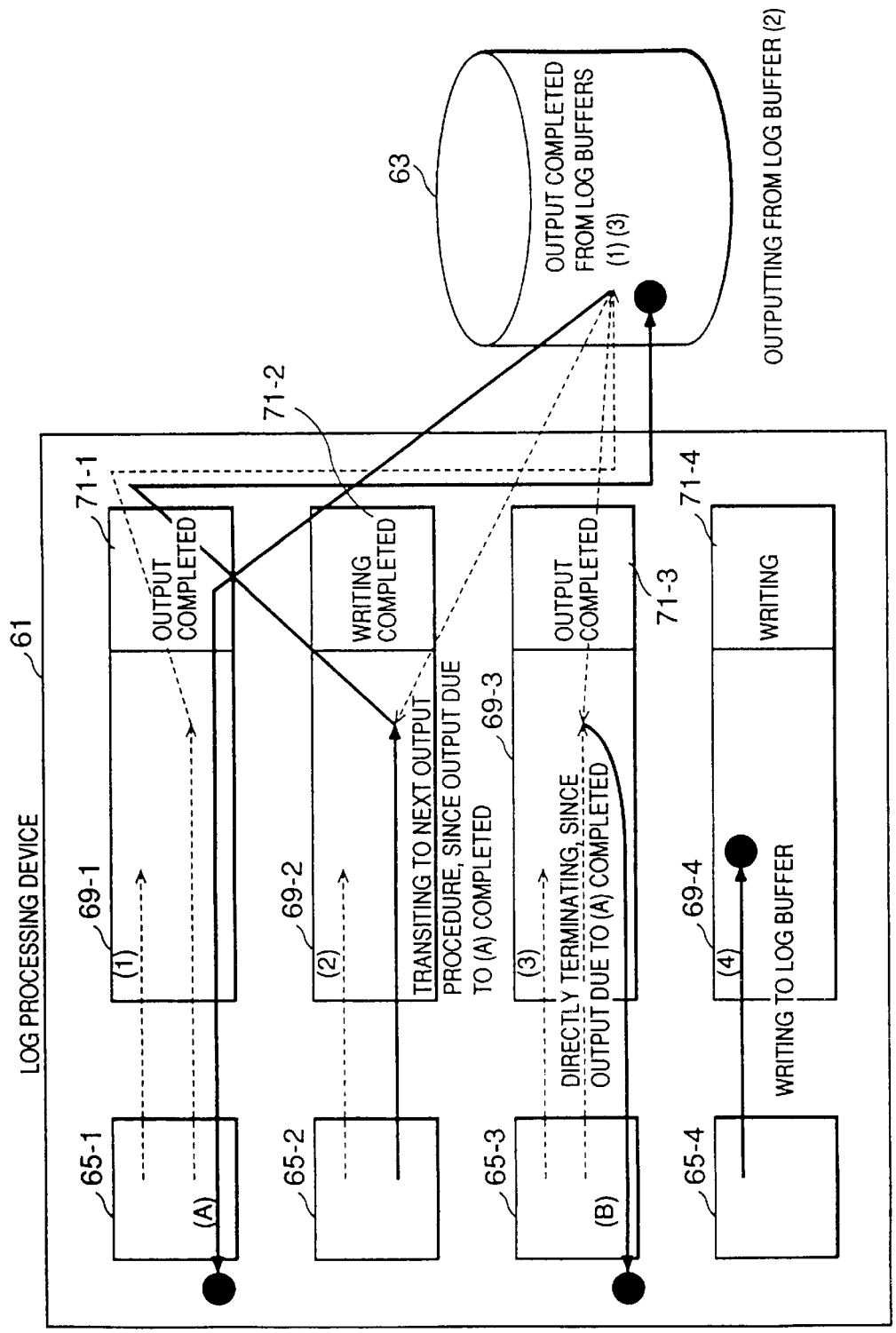
FIG. 24 is an explanatory figure showing in stages the concrete operation of the third embodiment.

FIG. 24 shows the state at the time point T4 of FIG. 20, at which the first thread 65-1 has completed its output.

Here, the first thread 65-1 completes output to the magnetic disk 63, and issues output completed notifications to the third and the second threads 65-2 and 65-3. The second thread 65-3 receives this notification and terminates processing.

The third thread 65-2 receives this notification, and executes the processing from the step S735 of FIG. 20. The fourth thread 65-4 is receiving log data, and performs writing in the buffer 69-4 in parallel with the processing of the other threads.

In the above manner, after a plurality of items of log data which have arrived in succession are received in parallel in the high speed buffer, these are output all together to the magnetic disk, and log data which arrive subsequently during the time period for outputting to this magnetic disk are received and stored in the buffer in parallel, and simultaneously with the termination of output these subsequently arrived items of log data are all again outputted together to the magnetic disk; and these operations are repeated. By doing this, along with reducing the number of outputs to the magnetic disk, the outputting to the magnetic disk and the receipt into the buffer are performed simultaneously in parallel, and there are no useless intervals in the output to the magnetic disk, which is repeated continuously. As a result, the actual time period for log storage for one transaction is shortened, and the throughput of transaction processing is enhanced.

6.4 The Fourth Embodiment

As has been stated previously, a prior art cooperative type distributed system has the problem that a long time period is required for recovery processing for a resource. One cause of this is that the load of recovery processing is concentrated upon the single processing device which manages the resource which is to be recovered.

Figure 25:
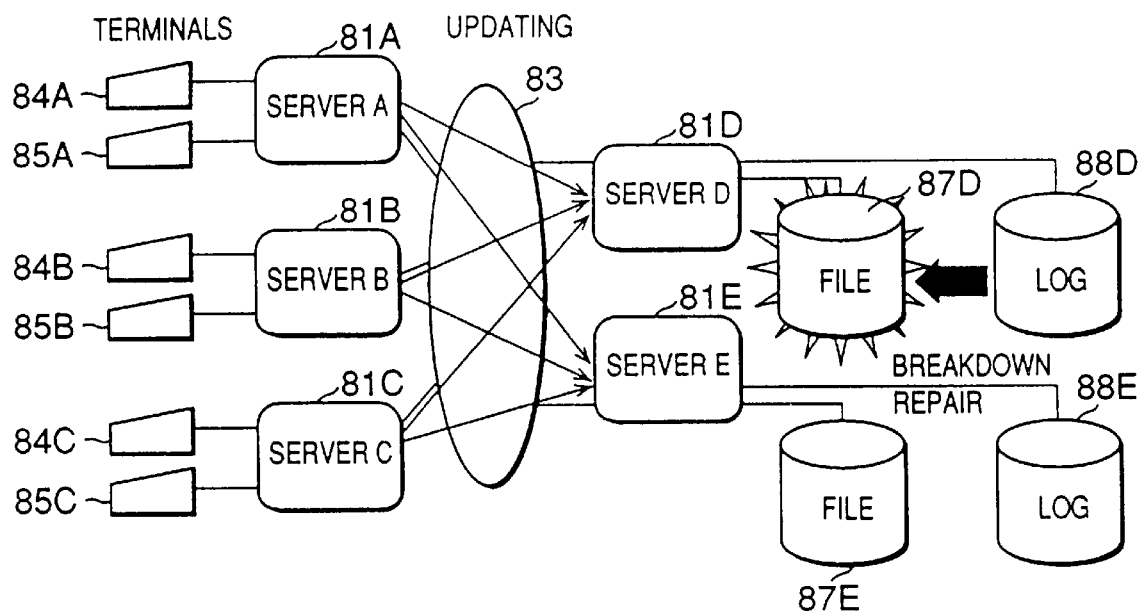
FIG. 25 is a block diagram showing the breakdown recovery procedure for a prior art system.

FIG. 25 is a schematic illustration of a recovery processing method for an exemplary prior art distributed type transaction processing system. As shown in FIG. 25, to each of a server 81A, a server 81B, and a server 81C there are connected a plurality of terminals 84A, 85A, 84B, 85B, . . . . Each of the terminals 84A, 85A, 84B, 85B, . . . may for example be a workstation or a personal computer, and performs dispatch and receipt of messages related to transactions between itself and the corresponding server 81A, 81B, or 81C. A server 81D and a server 81E respectively manage resources (in this example, files) 87D and 87E and logs 88D and 88E.

The servers 81A, 81B, and 81C receive transaction request messages from the corresponding terminals, and send updating commands for the files 87D and/or 87E to the servers 81D and/or 81E corresponding to the contents of the corresponding transactions. When this is done, the servers 81D and 81E, along with performing updating of the respective files 87D and 87E, also record log data which indicate the contents of the respective updates in the logs 88D and 88E.

In this connection, if a breakdown has occurred in the file 87D of the server 81D, after the breakdown has been repaired, the server 81D performs recovery sequentially while referring to the log data which is recorded in the log 88D within the same device. Normally, since within the server 81D a backup of the file 87D is performed periodically, the recovery procedure is performed by, after copying the last backup data before the breakdown occurred to the file 87D, executing the updates specified by all of the log data after the time point at which this backup was stored sequentially according to their order in time.

In this manner, with a prior art system, each server which manages a resource performs the recovery procedure by sequentially executing the updates which are specified by the log data in the log. Due to this, the load is concentrated upon the server which executes the recovery, and it takes a long time period for the recovery.

The fourth embodiment of the present invention explained below is able to perform high speed recovery of a resource by not concentrating the load upon the server which manages the resource.

Figure 26:
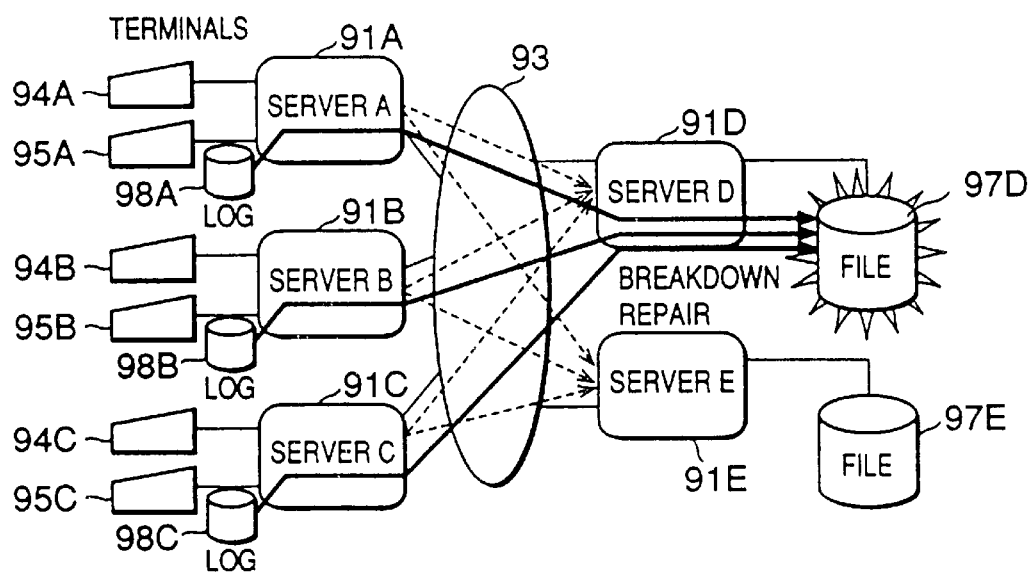
FIG. 26 is a block diagram showing the overall construction of a fourth embodiment of the present invention.

FIG. 26 is a block diagram showing the breakdown recovery procedure for a distributed type transaction processing system according to the fourth embodiment.

A plurality of servers 91A, 91B, . . . 91E are connected together via a network 93 so as to be able to transmit signals between one another. To each of the servers 91A, 91B, and 91C there is connected a plurality of terminals 94A, 95A, 94B, 95B, . . . . Each terminal 94A, 95A, 94B, 95B, . . . may for example be a workstation or a personal computer, and performs dispatch and receipt of messages related to transactions between itself and the corresponding server 91A, 91B, or 91C. A server 91D and a server 91E respectively manage resources (in this example, files) 97D and 97E. The servers 91A, 91B, and 91C have logs 98A, 98B, and 98C which accumulate in time series log data (updating history) based upon the updating commands which they respectively have issued. Moreover, the items of log data in the logs 98A, 98B, and 98C are in a format which specifies an image of the resource after updating.

The servers 91A, 91B, and 91C receive transaction request messages from the respective terminals, and send (the dashed arrows in the figure) updating commands for the files 97D and 97E on the servers 91D and 91E corresponding to the contents of the respective transactions. When this is done, the servers 91D and 91E update the respective files 97D and 97E. Further, when any one of the servers 91A, 91B, or 91C issues an updating command, it records this updating command in the corresponding log 98A, 98B, or 98C.

Here, suppose that a breakdown has occurred in the file 97D of the server 91D. When this occurs, after the breakdown has been repaired, the server 91D requests the servers 91A, 91B, and 91C and obtains the log data for the file 97D from their logs 98A, 98B, and 98C (the solid arrows in the figure), and based thereupon performs recovery of the file 97D.

Figure 27:
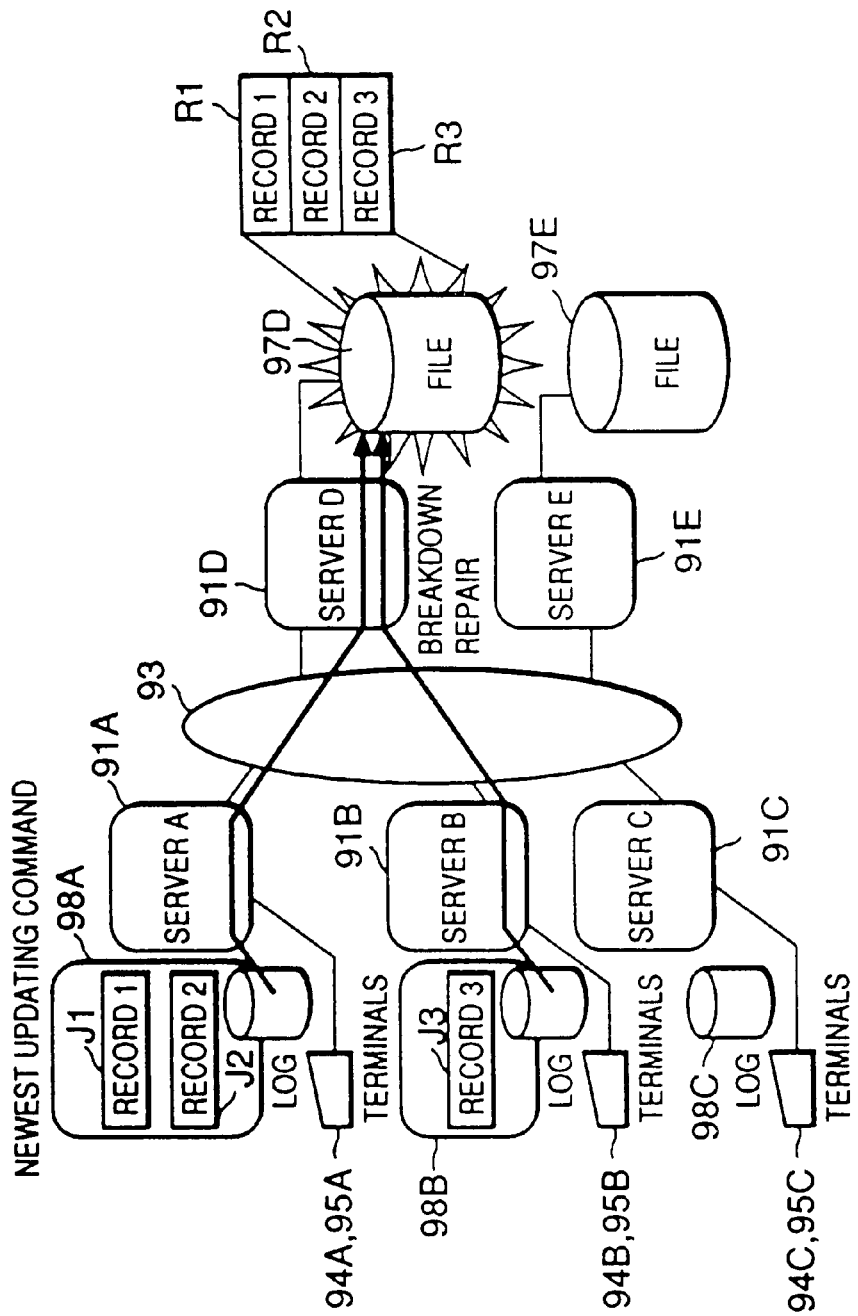
FIG. 27 is an explanatory figure for explaining in more concrete terms the breakdown recovery procedure of the fourth embodiment.

FIG. 27 is an explanatory figure showing in concrete terms the recovery procedure for the file 97D.

For example suppose that, at the time point at which the breakdown has occurred in the server 91D, updating commands are issued by the server 91A for records R1 and R2 in the file 97D of the server 91D, and further that an updating command has been issued by the server 91B for a record R3. In this case, in the recovery procedure, the server 91D obtains from the server 91A the items of log data J1 and J2 for the records R1 and R2 at the time point that the breakdown occurred (in other words, the most recent), and moreover obtains from the server 91B the item of log data J3 for the record R3 at the time point that the breakdown occurred (in other words, the most recent), and updates the records in the file 97D based upon these most recent items of log data J1, J2, and J3.

In this manner, in the recovery procedure for this embodiment, the updating according to the log data is not executed sequentially as in the prior art, but rather only the log data which was performed last for each resource (the most recent) at the time point at which the breakdown occurred is extracted, and updating is performed. By doing this the load of the recovery procedure is reduced, and the time period for recovery is shortened.

Figure 28:
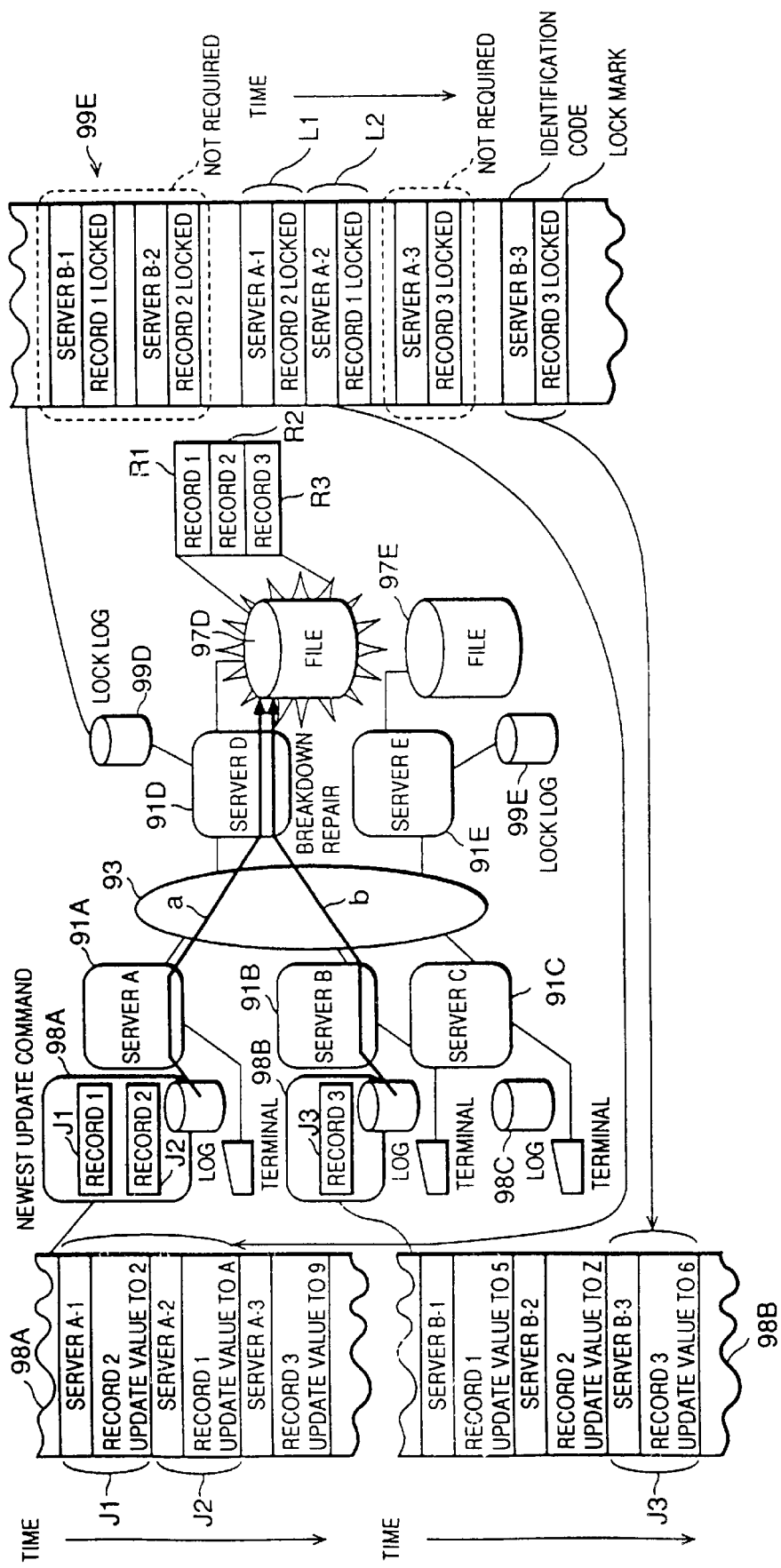
FIG. 28 is an explanatory figure for explaining in still greater detail the breakdown recovery procedure shown in FIG. 27.

FIG. 28 is an explanatory figure which shows in further detail the concrete example of the recovery procedure which was shown in FIG. 27.

As shown in FIG. 28, each of the servers 91D and 91E comprises a lock log 99D, 99E in which it accumulates in time series the history of lock processing (exclusion control for access) for each of the records in the respective file 97D, 97E. Each of the items of lock log data which has been accumulated in the lock logs 99D and 99E consists of the identification code for the transaction which requested the lock procedure and lock data which shows which of the records in the file was locked. For example, the item L3 of lock log data which is shown at the bottom right side of the figure consists of the identification code "server B-3" (which means the third transaction of the server 91B) and the lock data "record 3 locked" (which means that the record R3 was locked).

Further, each of the items of log data in the logs 98A, 98B, and 98C of the servers 91A, 91B, and 91C (in other words, each of the items of log data) consists of the identification code of the transaction which issued its updating command and the details of the updating by its updating command. For example, the item J3 of log data which is shown at the bottom left side of the figure consists of the identification code "server B-3" (which means the third transaction of the server 91B) and the updating details "value of record 3 updated to 6" (which means that the value of the record R3 was updated to "6"). Here, the important point is that the updating details in the log data provide an image of the resource after updating (in the above described example, that the value after updating is "6"), and do not provide the amount of change due to updating (for example, some value to be added or subtracted or the like).

A mutual correspondence between each item of lock log data and each item of log data is established via the transaction identification code. For example, the exemplary lock log data item L3 shown above corresponds to the exemplary log data item J3 shown above.

Taking as an example the case in which a breakdown has occurred in the server 91D, the procedure for recovery processing for the file 97D in the server 91D after the breakdown has been repaired will be shown in the following.

(1) The server 91D first copies the backup data (omitted from the figure) of the file 97D which is periodically stored in the same device to the file 97D, and next requests from the lock log 99D the last items of lock log data for all the records R1, R2, R3 in the file 97D. In the example shown in the figure, the item of lock log data which has the transaction identification code for the record R1 "server A-2", the item of lock log data which has the transaction identification code for the record R2 "server A-1", and the item of lock log data which has the transaction identification code for the record R3 "server B-3" are extracted as the latest corresponding items of lock log data.

(2) Next, the server 91D determines from the transaction identification codes of the latest lock log data items the servers which were in charge of processing these transactions, and requests from these servers the items of log data for these transactions. For example, since in relation to the records R1 and R2 the transaction identification codes of the latest items of log lock data are "server A-2" and "server A-1", it requests from the server 91A the items of log data which have the same transaction identification codes; and also, since in relation to the record R3 the transaction identification code of the latest item of log lock data is "server B-3", it requests from the server 91B the item of log data which has the same transaction identification code.

(3) The server 91A searches out from the log 98A the items of log data which have the transaction identification codes "server A-2" and "server A-1" which were requested from the server 91D. As a result of this, the most recent items J1 and J2 of log data for the record R1 and the record R2 are extracted.

(4) In the same manner, the server 91B searches out from the log 98B the item of log data which has the transaction identification code "server B-3" which was requested from the server 91D. As a result of this, the most recent item J3 of log data for the record R3 is extracted. (5) The server 91A sends to the server 91D the most recent items J1 and J2 of log data which it has extracted (the solid arrow a). In the same manner, the server 91B sends to the server 91D the most recent item J3 of log data which it has extracted (the solid arrow b).

(6) The server 91D executes updating for each of the records R1, R2, and R3 concurrently by multiprocessing, based upon the most recent items of log data J1, J2, and J3 which it has received from the servers 91A and 91B. Since as has been already explained the log data provides an image of the resource after updating, the file 97B is restored to the state in which the updating had been performed normally without the occurrence of any breakdown, just by performing updating based upon the most recent items J1, J2, and J3 of log data.

Figure 29:
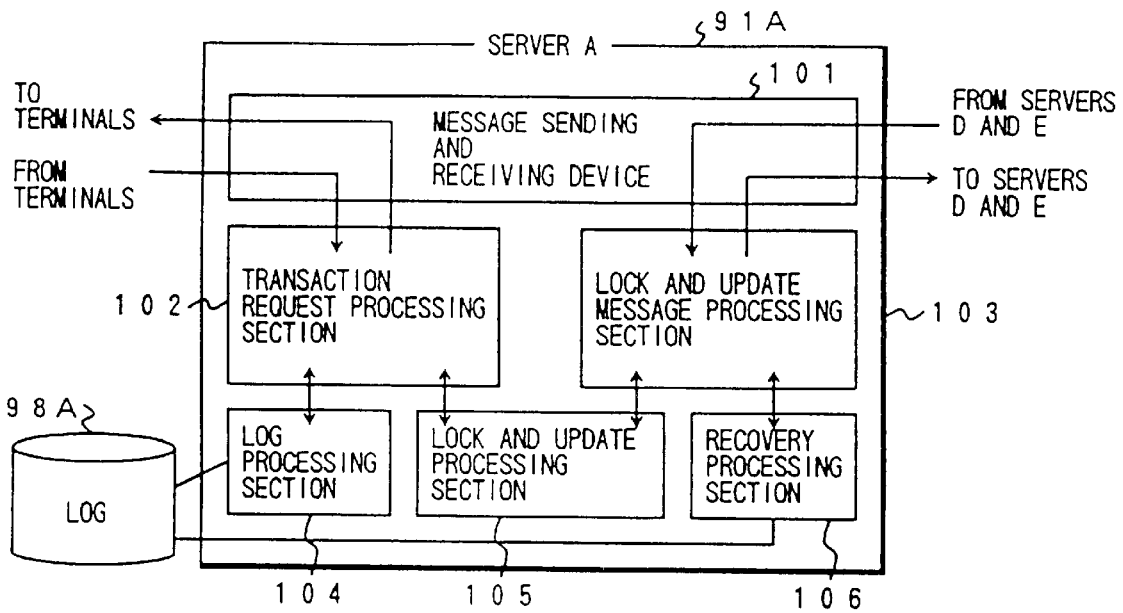
FIG. 29 is a block diagram showing the structure of a coordinator.

FIG. 29 is a structural block diagram of the server 91a (in the following, termed the coordinator) which processes transactions (the other coordinators 91B and 91C are constructed identically).

The role of the coordinator 91A, as has already been explained, is: to receive transaction request messages from the terminals 94A and 95A; to manufacture updating commands according to the details of the transactions; along with storing in the log 98A items of log data corresponding to these updating commands, to send these updating commands to the servers 91D and 91E (in the following, termed the participants) which manage the resources; and to return the results of this updating to the terminals 94A and 95A.

In order to fulfill this role, the coordinator 91A comprises a message sending and receiving device 101, a transaction request processing section 102, a lock and update message processing section 103, a log processing section 104, a lock and update processing section 105, and a recovery processing section 106.

The message sending and receiving device 101 performs sending and receipt of messages to and from the terminals 94A and 95A, and sending and receipt of messages to and from the participants 91D and 91E.

The transaction request processing section 102 receives transaction request messages from the terminals 94A and 95A and analyzes them, and returns the results of transaction processing to the terminals 94A and 95A.

The lock and update message processing section 103 sends messages for lock processing requests and updating commands to the participants 91D and 91E, and receives messages for lock processing and the results of updating and recovery requests from the participants 91D and 91E.

The log processing section 104 receives update details corresponding to transaction requests from the transaction request processing section 102, and records these in the log 98A as items of log data (log data).

The lock and update processing section 105 receives update details corresponding to transaction requests from the transaction request processing section 102, and transmits the lock requests corresponding to the records which are the subjects of updating to the participants 91D and/or 91E which manage these records via the lock and update message processing section 103; and, after the records which are the subjects of updating have been locked, sends updating commands for these records to the participants 91D and 91E.

The recovery processing section 106 receives from the lock and update message processing section 103 requests for recovery from the participants 91D and 91E, searches out from the log 98A the items of log data which have been requested in these recovery requests, and returns them to the participants 91D and 91E via the lock and update message processing section 103.

Figure 30:
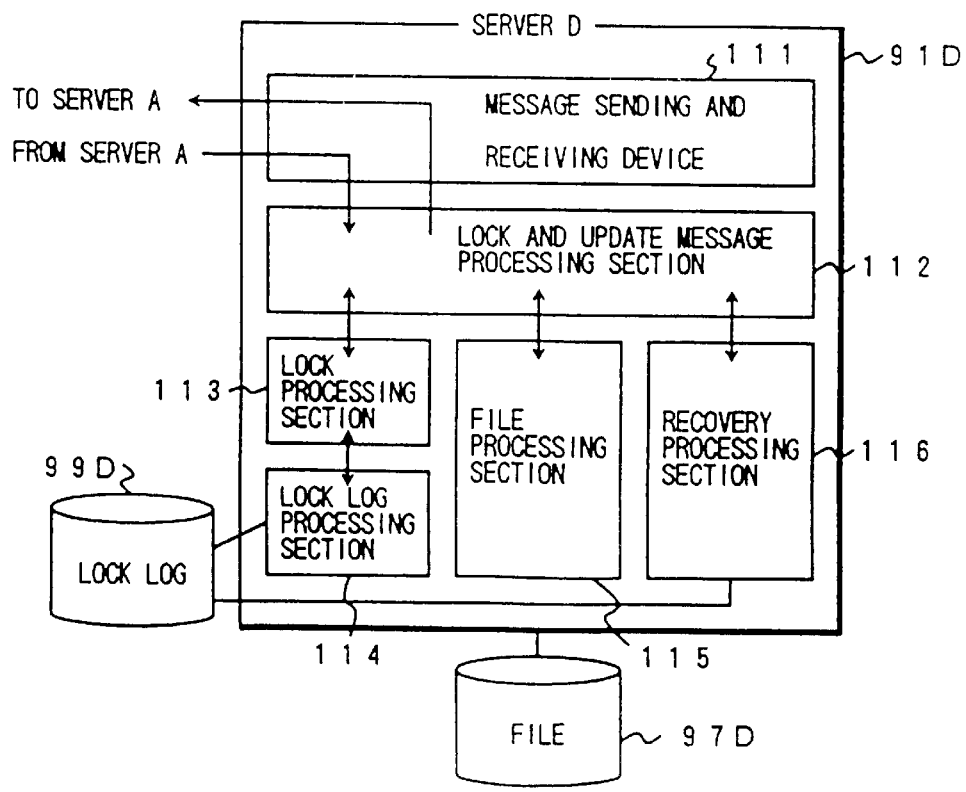
FIG. 30 is a block diagram showing the structure of a participant.

FIG. 30 is a structural block diagram of the participant 91D (the construction of the participant 91E is identical).

The role of the server 91D, as has already been explained, is: to receive lock processing requests and updating commands from the coordinators 91A, 91B, and 91C; to perform lock processing and updating of the records which are the subjects of updating; to return the results thereof to the coordinators 91A, 91B, and 91C; and, if a breakdown has occurred, to perform the recovery procedure for its own devices after the recovery has been repaired.

In order to fulfill this role, the participant 91D comprises a message sending and receiving device 111, a lock and update message processing section 112, a lock processing section 113, a lock log processing section 114, a file processing section 115, and a recovery processing section 116.

The message sending and receiving device 111 performs sending and receipt of messages to and from the coordinators 91A, 91B, and 91C.

The lock and update message processing section 112 receives messages for lock processing requests and updating commands from the coordinators 91A, 91B, and 91C and analyses them, and returns the results of lock processing and updating to the coordinators 91A, 91B, and 91C.

The lock processing section 113 executes lock processing according to the lock processing requests from the coordinators 91A, 91B, and 91C.

The lock log processing section 114 writes the history (the items of lock log data) of lock processing executed by the lock processing section 113 in the lock log 99D.

The file processing section 115 is for performing updating of the subject records in the file 97D according to the updating commands from the coordinators 91A, 91B, and 91C.

In order to perform the recovery procedure after the breakdown has been repaired, the recovery processing section 116 searches out from the lock log 99D the latest items of lock log data, sends recovery requests for requesting the items of log data which correspond to these searched out items of log lock data to the coordinators 91A, 91B, and 91C, and moreover performs recovery procedures for the file 97D based upon the items of log data which are received from the coordinators 91A, 91B, and 91C.

Figure 31:
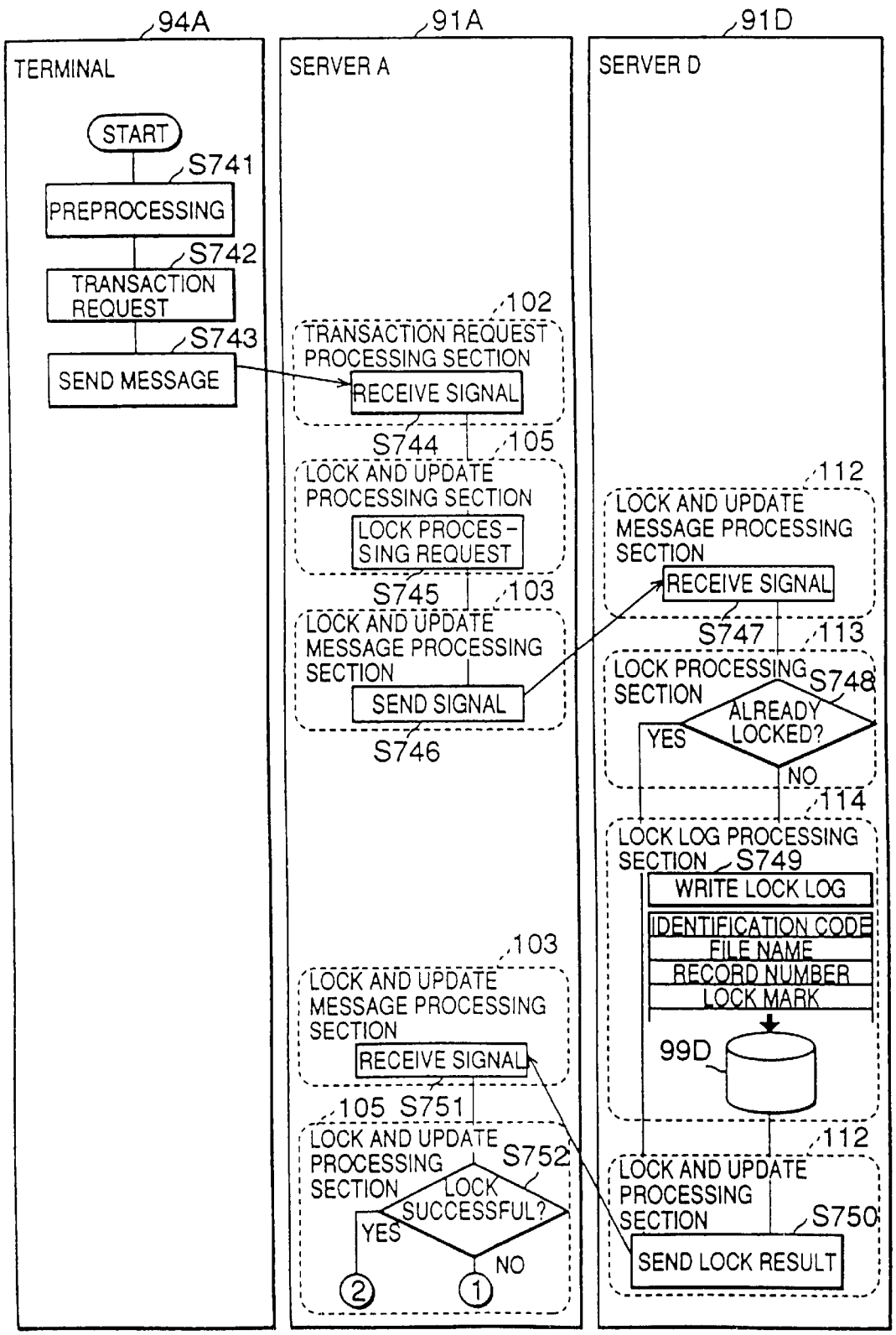
FIG. 31 is a flow chart showing a former stage portion of a procedure for normal transaction processing.
Figure 32:
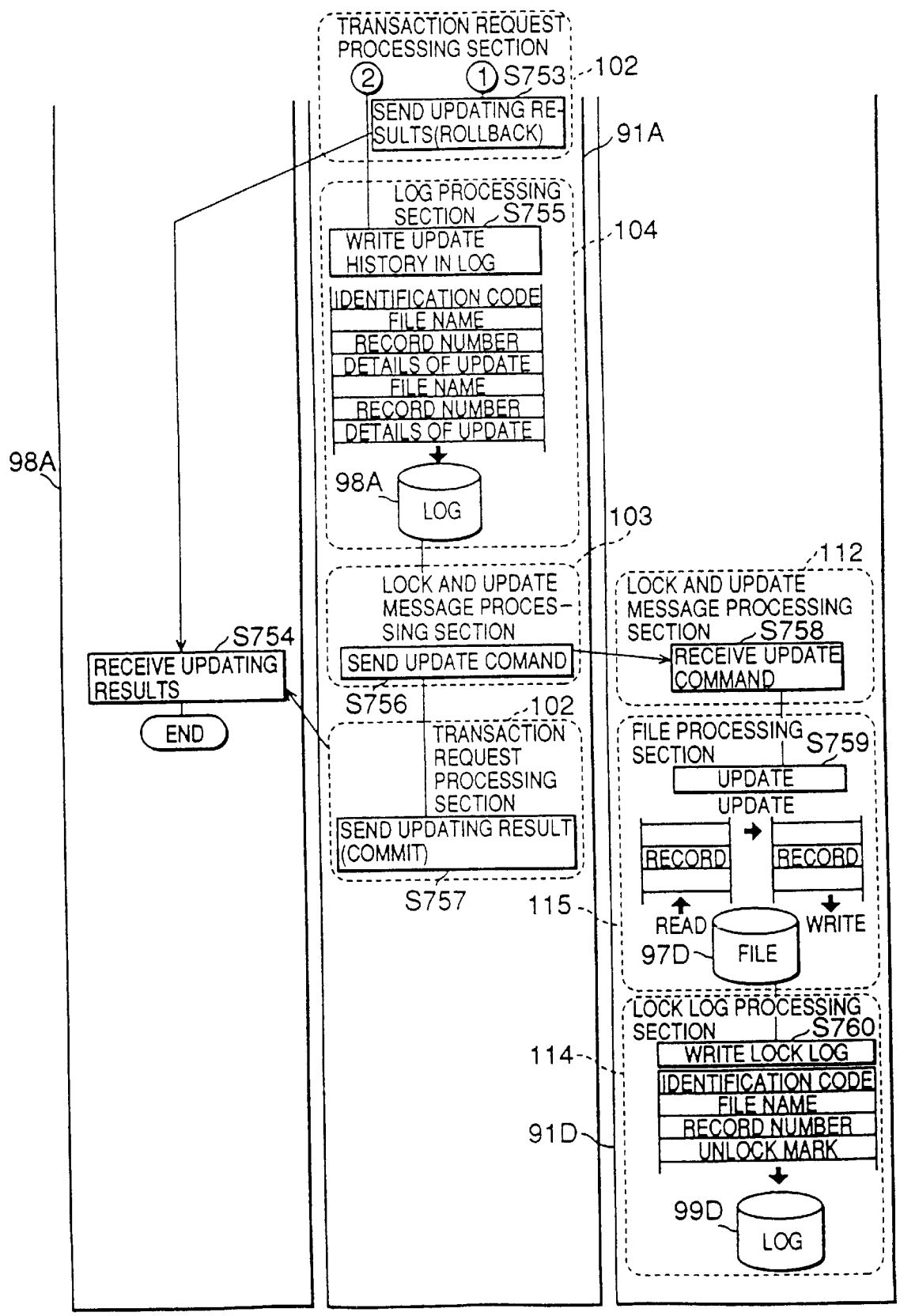
FIG. 32 is a flow chart showing a latter stage portion of a procedure for normal transaction processing.

FIGS. 31 and 32 are flow charts showing the detailed procedure for normal transaction processing in this embodiment.

Here, the explanation will be made by taking as an example the case in which the coordinator 91A updates a file on the participant 91D.

First, via a specified prior procedure (S741) a transaction request (a request to update a designated record) is made (S742) upon some terminal 94A from input information from a user, and this is sent (S743) to the coordinator 91A.

In the coordinator 91A, the transaction request processing section 102 receives (S744) the transaction request from the terminal 94A, and next the lock and update processing section 105 generates (S745) a lock processing request for the record which is the subject of updating according to the transaction request, and the lock and update message processing section 103 sends (S746) this lock processing request towards the participant 91D.

In the participant 91D, the lock and update message processing section 112 receives (S747) the lock processing request from the coordinator 91A, and next the lock processing section 113 checks (S748) whether or not the record which is the subject of updating has already been locked. If it is not locked, then the lock processing section 113 performs the locking procedure, and the lock log processing section 114 constructs an item of log data for this locking procedure and writes (S749) it in the lock log 99D. The transaction identification code, the name of the file in which the record which is the subject of locking is to be found, the record number of this record, and a lock mark are included in this item of lock log data.

When the locking procedure is completed, the lock and update message processing section 112 sends (S750) a message towards the coordinator 91A indicating that the locking procedure had a successful result.

Moreover, when a locking processing request has been generated, if in the step S748 the record which is the subject of updating has already been locked, then the locking procedure is not executed, and a message is sent (S750) from the lock and update message processing section 112 towards the coordinator 91A indicating that the locking procedure had an unsuccessful result.

In the coordinator 91A, the lock and update message processing section 103 receives (S751) the message as to the result of the locking procedure, and the lock and update processing section 105 determines (S752) whether or not the locking procedure has succeeded.

If the locking procedure has not been successful (N in S752), in other words, in the case that the subject record was already locked, then this transaction is rolled back. As shown in FIG. 32, the transaction request processing section 102 sends (S753) a result message indicating that the updating procedure has been rolled back to the terminal 94A.

On the other hand, if the locking procedure has been successful (Y in S752), then the log processing section 104 writes (S755) an item of log data in the log 98A based upon the updating command. The item of log data includes the transaction identification code, the name of the file in which the subject record is to be found, the record number of the subject record, and the details of the updating. As has already been described, the details of the updating provide an image of this record after updating.

Next, the lock and update message processing section 103 sends (S756) an update command towards the participant 91D, and the transaction request processing section 102 sends (S757) a result message indicating that the update has been committed towards the terminal 94A. The terminal 94A receives (S754) the result message indicating rollback or committal and exhibits it to the user, and then the processing terminates. In the participant 91D, the lock and update message processing section 112 receives (S758) the update command, and the file processing section 115 updates (S759) the details of the subject record in the file 97D based upon this update command. When the updating has been completed, the lock log processing section 114 writes (S760) in the lock log 99D an item of lock log data indicating that the subject record has been unlocked.

By doing as above, normal transaction processing is completed. At the stage when transaction processing has been completed, the situation has been arrived at that an item of log data which provides the details of the record updating that has been executed in the processing of this transaction is stored in the log 98A of the coordinator 91A, while a pair of items of lock log data which respectively show that the record which was subject to updating in this transaction processing which has been executed was locked and was unlocked are stored in the lock log 99D of the participant 91D.

Figure 33:
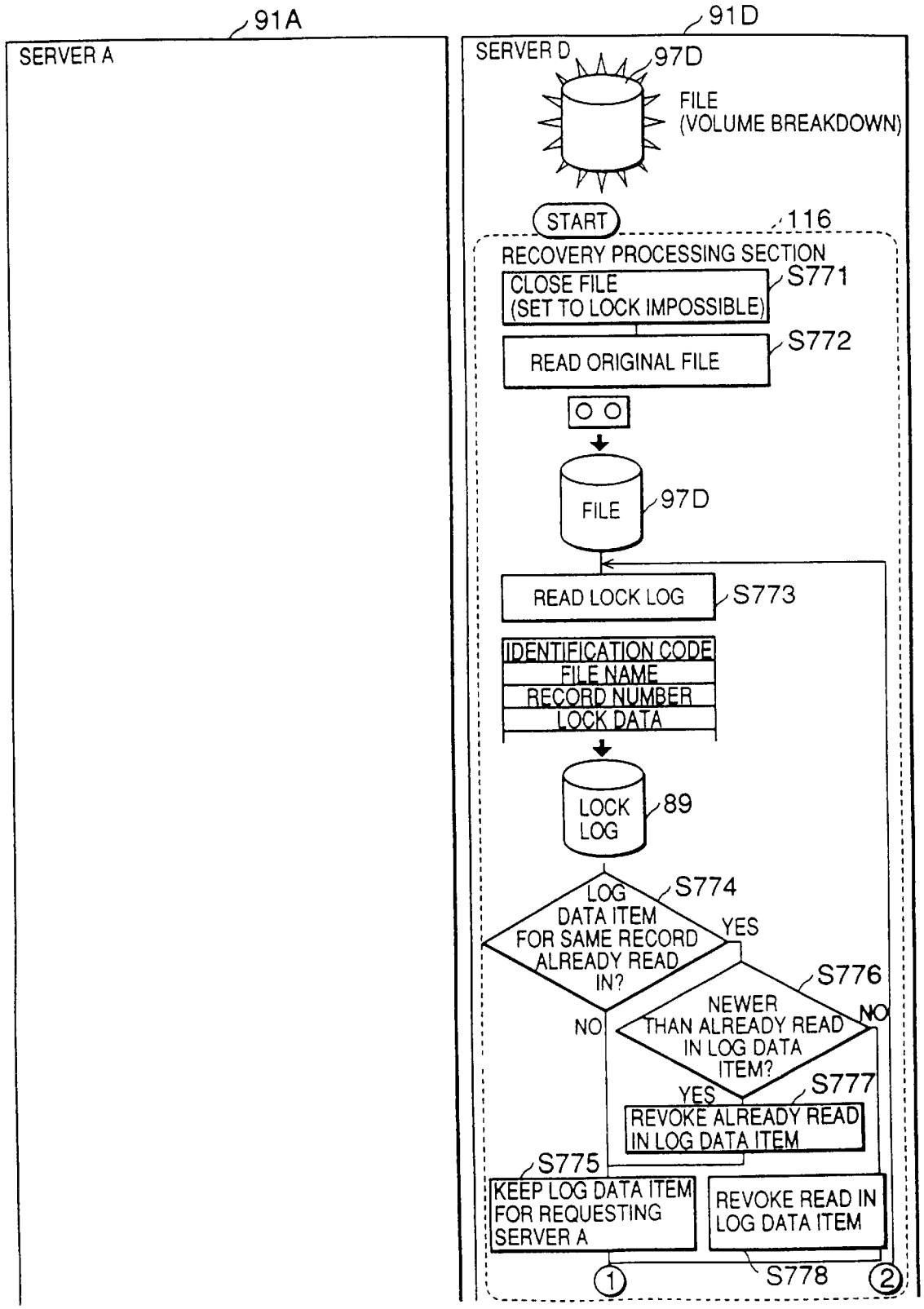
FIG. 33 is a flow chart showing a former stage portion of a procedure for recovery processing.
Figure 34:
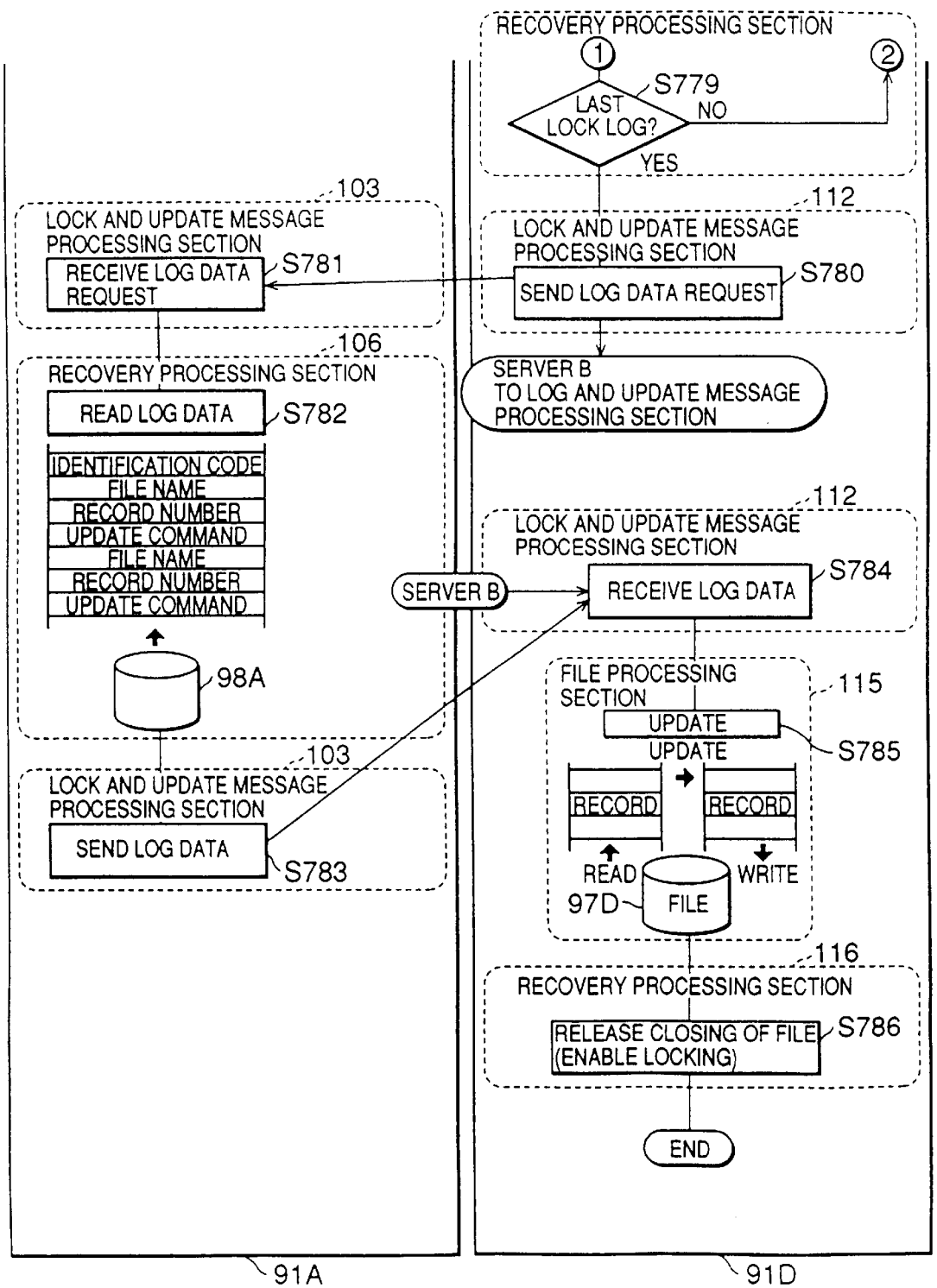
FIG. 34 is a flow chart showing a latter stage portion of a procedure for recovery processing.

FIGS. 33 and 34 are flow charts showing in detail, in the event that a breakdown has occurred in the participant 91D, the recovery processing procedure after the breakdown has been repaired.

Suppose that in the participant 91D, for example, a volume breakdown has occurred in the file 97D. When this happens, recovery processing is executed according to the following procedure, after the storage device for the file 97D has been changed for a normal one.

First, the recovery processing section 116 of the participant 91D, after (S771) setting the file 97D to the closed state and prohibiting the entire operation from outside for starting lock processing, reads (S772) into the file 97D the backup data (an original copy) which was stored periodically.

Next, the lock log 99D is searched according to a predetermined method (for example, the search may be sequentially from the most recent end), and each item of lock log data is read in (S773) in order. And, each time an individual item of lock log data is read in, first, a check is made (S774) as to whether or not any item of lock log data for the same record has already been read in. If the result of this is that as yet no item of lock log data for the same record has been read in (N in S774), then, since there is a possibility that this is the latest item of lock log data related to the said record, this item of lock log data is kept (S775) in the memory. On the other hand, in the case (Y in S774) that an item of lock log data for the same record has already been read in, then a decision is made (S776) as to whether or not the currently read in lock log data is newer than the one which was already read in, and if it is newer (Y in S776) the item of log lock data which was already read in is revoked (S777), and the currently read in item of log lock data is stored (S775) in the memory. On the other hand, if the currently read in item of log lock data is older than the one which was already read in (N in S776), then the currently read in item of log lock data is revoked (S778).

The above procedure from the step S773 through the step S778, as shown in FIG. 34, is repeated (S779) until all of the items of log data in the lock log 99D have finished being read in. As a result of this, the most recent items of lock log data related to all of the records in the file 97D are extracted into the memory.

When by doing this the most recent items of lock log data for all the records have been extracted, next the lock and update message processing section 112 sends (S780) messages requesting the items of log data corresponding to the transaction identification codes of these most recent items of lock log data to the coordinators which are specified by these transaction identification codes. For example, in the concrete example shown in FIG. 28, since the transaction identification codes of the most recent items of lock log data are "server A-1", "server A-2", and "server B3", requests for the items of log data which correspond to the transaction identification codes "server A-1" and "server A-2" are sent to the coordinator 91A, while a request for the item of log data which corresponds to the transaction identification code "server B-3" is sent to the coordinator 91B.

In the coordinator 91A, when the lock and update message processing section 103 receives (S781) the log data requests, the recovery processing section 106 searches out from the log 98A and reads in the items of log data (the newest items of log data) which have been requested, using as search keys the transaction identification codes in the said requests, (S782), and the lock and update message processing section 103 returns (S783) these items of log data to the participant 91D.

Also, in the other coordinator 91B, in the same manner as and in parallel with the above described procedure of the server 91A; the newest items of log data which have been requested are read in and are returned to the participant 91D.

In the participant 91D, when the lock and update message processing section 112 receives (S784) the newest items of log data from the coordinators 91A and 91B, the file processing section 115 updates (S785) the details of each record in the file 97D based upon these items of log data. The record updating procedure in these steps S784 and S785 is executed in parallel for a plurality of records by a plurality of processes. By this updating based upon the most recent items of log data, the contents of the file 97D is rectified to the correct contents identical to the case in which no breakdown had occurred.

After this, the recovery processing section 116 releases (S786) the closing of the file 97D, and the recovery procedure terminates.

By the way, although in the above described embodiment the lock log was taken advantage of in order to specify the newest items of log data which are necessary for recovery in the participant, it is not absolutely necessary to take advantage of the lock log, and some other means could be employed in order to specify the newest items of log data. For example, it would be possible to record the transaction identification codes which are contained in the lock processing requests or in the updating commands in log format or in overwriting format for each record, and to specify the newest items of log data from their final transaction identification codes. Or, it would also be possible to record in log format or in overwriting format the identification codes of the coordinators which issued the lock processing requests or the updating commands, to specify the final coordinator from these coordinator identification codes, to send log data requests to the final coordinator, and for the coordinator to select the newest items of log data and to return them to the participant. Or it would also be possible, if the number of servers is not all that great, for the participant to request the newest items of log data for each record in the logs for all of the coordinators, to collect them together, and to select the newest item of log data for each record.

6.5 The Fifth Embodiment

Figure 35:
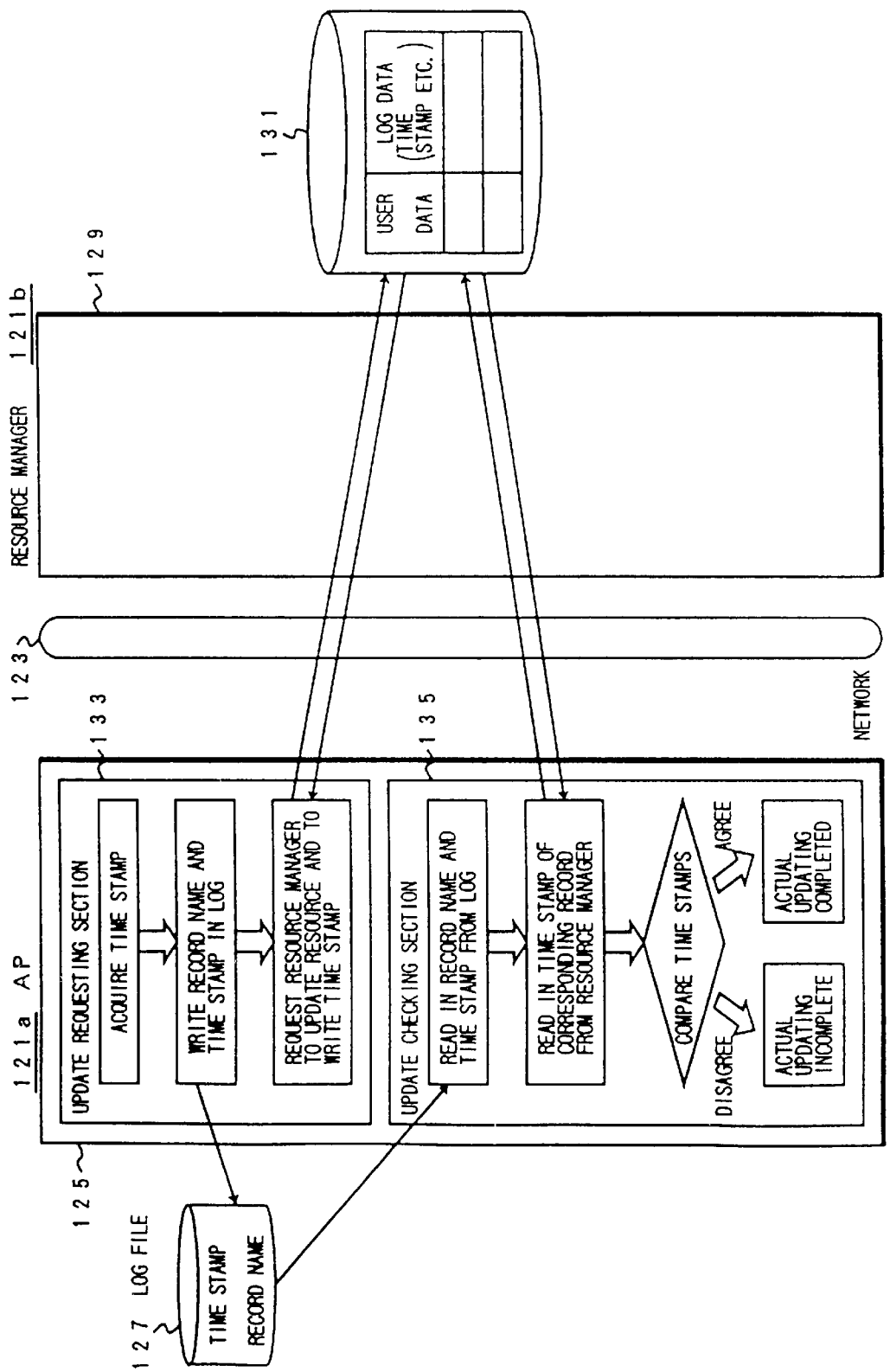
FIG. 35 is a block diagram showing a prior art procedure for resource updating determination.

As has been stated already, there is the problem in prior art systems that the recovery procedure is slow, since the processing program for determining whether or not the resource to be recovery processed has actually been updated is complicated FIG. 35 shows an exemplary prior art procedure for determining whether or not actual updating of the resource has been executed. Moreover, although FIG. 35 shows a case in which a certain one 121b of two servers 121a and 121b which are connected by a network 123 manages a resource, while the other one 121a controls updating of that resource, this is as an example; the essence of the prior art does not differ even for some other case (for example, the case in which both the management of a resource and the control of its updating are both managed in a single server).

As shown in FIG. 35, in the one server 121a, an application program (hereinafter termed AP) 125, which mainly performs transaction processing, comprises a update requesting section 133 which requests resource updating to the other server 121b during transaction processing, and a update checking section 135 which, when a breakdown has been repaired or the like, checks whether or not the resource updating has been completed by the other server 121b. And this AP 125 has a log file 127 which records the history of resource updating.

Further, in the other server 121b, a resource manager 129 manages a resource such as a database 131 or the like, and a management table is provided for recording update log data which record whether or not actual updating has been performed for each record individually in the resource.

During transaction processing, first the update requesting section 133 of the AP 125 acquires a time stamp and writes in the log file 127 the name of the record which is the subject of updating and the time stamp, and thereafter requests the resource manager 129 to write the update of the subject record and the time stamp. The resource manager 129, when it has received this request, along with writing an item of update log data including the time stamp in an area corresponding to the subject record of the management table in the database 131, executes the actual updating of this subject record.

In the case that a breakdown such as the system down occurs, after this breakdown has been repaired and the system has restarted, the update checking section 135 of the AP 125 first reads in from the log file 127 the name of the record which was the subject of updating at the time that the breakdown occurred and the time stamp, and moreover reads in the time stamp of the corresponding record from the management table in the database 131 via the resource manager 129, and compares both time stamps. If the result of this comparison is that the time stamps agree, then it is deemed that the execution of the actual updating is completed, while if they do not agree then it is deemed that the actual updating was not executed.

With the prior art procedure described above the construction of the AP 125 becomes complicated, since the AP 125 is required to perform the update decision procedure. Further, since the management table is provided in the database 131, and therein a comparatively complicated item of update log data including a time stamp is recorded for each record individually, and further corresponding to this the time stamp and the record name are also recorded in the log file 127, therefore the size of the management table of the database 131 and the log file 127 becomes large, and wasteful file capacity is required.

The fifth embodiment of the present invention described in the following is able to determine whether or not actual updating of the resource has been executed with a simpler program structure and with a smaller file area than required by the above described prior art system.

Figure 36:
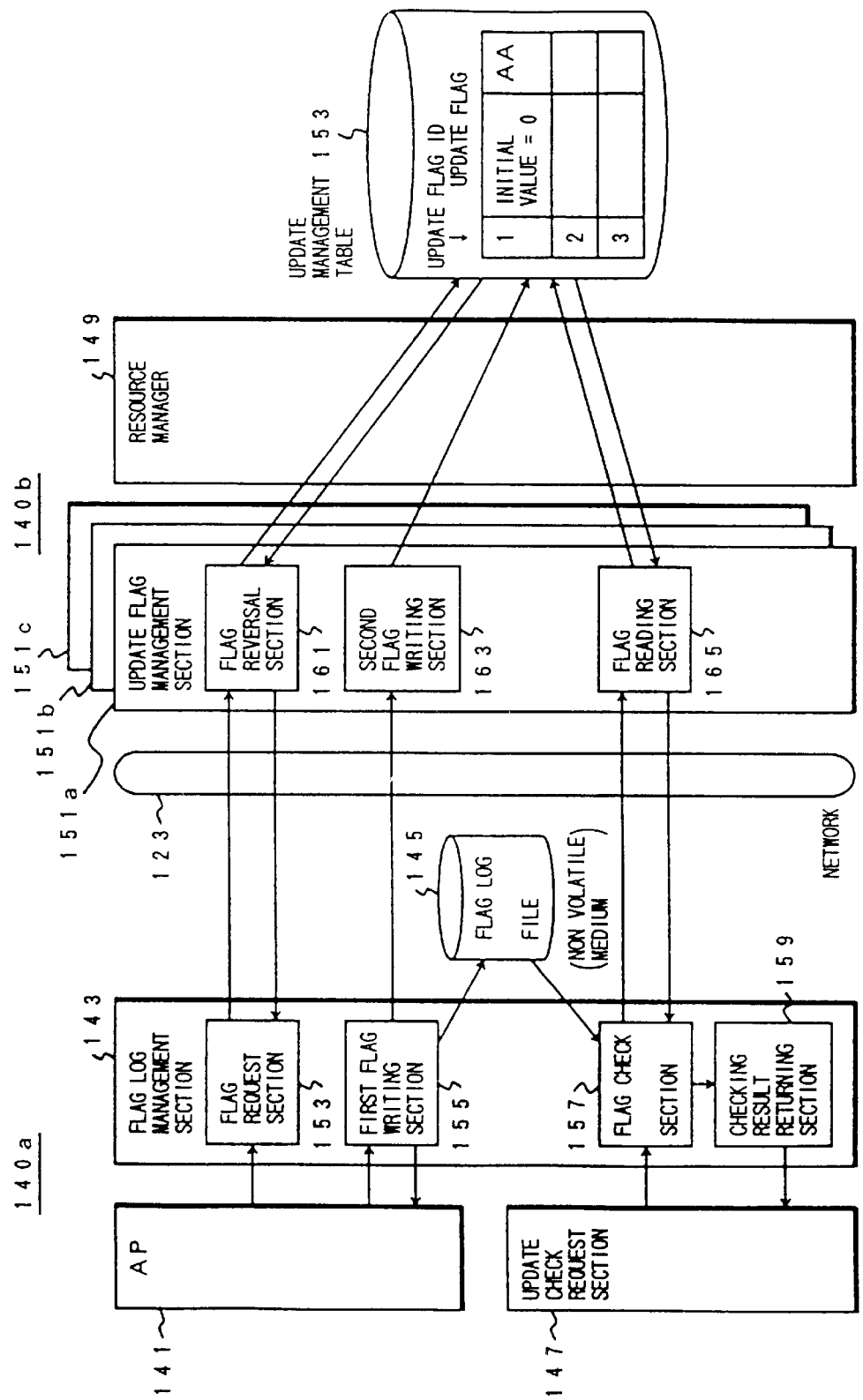
FIG. 36 is a block diagram showing the system structure of a fifth embodiment of the present invention.

FIG. 36 shows the system structure of the fifth embodiment.

As shown in FIG. 36, two servers 140a and 140b are connected together via a network 123. The first server 140a comprises an application program (AP) 141 which mainly performs transaction processing. The second server 140b comprises a resource (not shown in the figures) such as a is database, a table, a file or the like which is updated during transaction processing, and a resource manager 149 which manages this resource.

In the following, the first server 140a which has the AP 141 will be termed the "coordinator", while the second server 140b which manages the resource will be termed the "participant". Although in practical terms the two servers 140a and 140b may be of the same construction and either of them may become the coordinator or the participant, nevertheless for the convenience of explanation FIG. 36 relates to the case that the first server 140a is the coordinator and the second server 140b is the participant, and only the essentials of the procedure for them to function as the respective servers are shown in the figure.

The coordinator 140a also, apart from the AP 141, comprises a flag log management section 143, a flag log file 145, and an update check request section 147. Further, the participant 140b also, apart from the resource manager 149, comprises a predetermined number (in this embodiment, three) update flag management sections 151a, 151b, and 151c, and an update management table 153.

In the update management table 153 of the participant 140b there are provided the same number update flags as the update flag management sections 151a, 151b, and 151c. Each of these three update flags is lock controlled, in other words is controlled to the state "vacant (unlocked)" or "in use (locked)". And, when any one of the three update flag management sections 151a, 151b, or 151c receives a transaction, one of the update flags in the state of unlock is allocated to this management section. FIG. 36 shows the exemplary case in which the update flag which has the update flag ID "1" is allocated to the update flag management section 151a. Each update flag can take on either of the two values "0" and "1", and thereby it comes to be shown whether or not the actual updating of the resource has been executed.

Each of the update flag management sections 151a, 151b, and 151c of the participant 140b is allocated for processing a separate individual transaction, and writes the corresponding update flag (in other words, reverses the value of the flag) when the actual updating of the resource is executed during the processing of the allocated transaction. The participant 140b is able to execute the processing of a maximum of three transactions in parallel by using these three update flag management sections 151a, 151b, and 151c.

Overall, the flag log management section 143 of the coordinator 140a performs the following three jobs. The first job is, during the processing of each transaction, to inquire the reversed value of the update flag from the participant 140b based upon a flag control command from the AP 141. The second job is, during the processing of each transaction, in response to the commit command issued from the AP 141 to the participant 140b, to store in the flag log file 145 the reversed value of the update flag which was requested earlier. And the third job is, in the event that a breakdown has occurred, after the breakdown has been repaired, to inquire from the participant 140b the details of the update flag, corresponding to a request from the update check request section 147.

As described above, the flag log management section 143 records in the flag log file 145 the reversed values of the update flags which were obtained by inquiry from the participant 140b.

When a breakdown has occurred, after the breakdown has been repaired, the update check request section 147 requests the flag log management section 143 to check whether or not the actual updating of the resource had been executed at the time point when the breakdown occurred during the processing of the transaction.

The flag log management section 143 comprises a flag request section 153, a first flag writing section 155, a flag check section 157, and a checking result returning section 159. Further, each of the update flag management sections 151a, 151b, and 151c comprises a flag reversal section 161, a second flag writing section 163, and a flag reading section 165.

Figure 37:
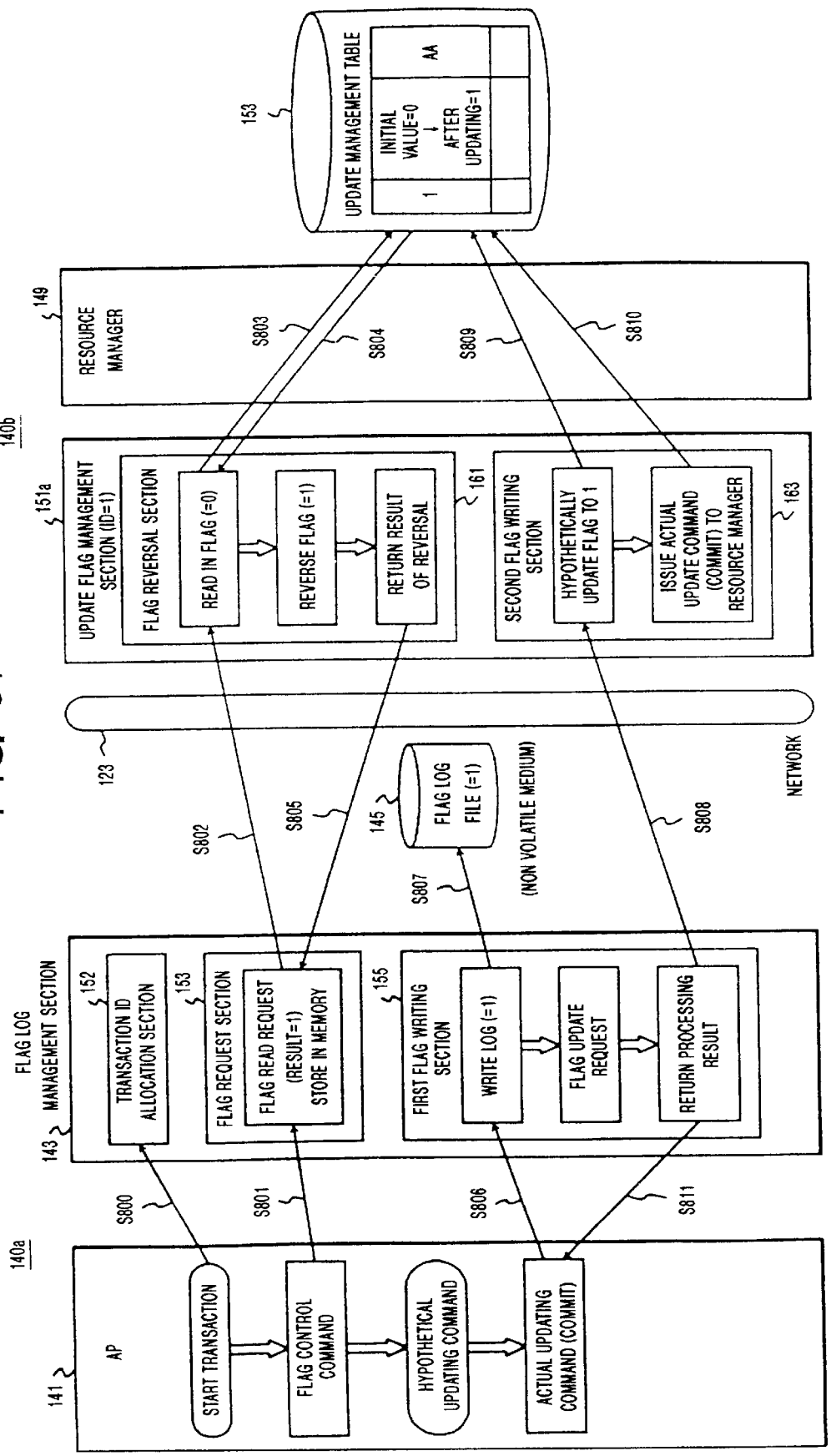
FIG. 37 is a flow chart showing the operation of the fifth embodiment during normal transaction processing.

FIG. 37 is for showing the flow of processing of each section when processing a transaction normally, for this embodiment.

When the AP 141 starts the processing of a transaction, a transaction ID which is unique within the system is allocated (S800) to this transaction by a transaction ID allocation section 152. Next, the AP 141 issues a flag control command to the flag log management section 143 (S801). In response to the flag control command, in the flag log management section 143, the flag request section 153 requests (S802) the one of the update flag management sections which has been allocated to this transaction, for example 151a, to read the value of the update flag.

In the update flag management section 151a which has received this read request, the flag reversal section 161 reads out (S803, S804) the initial value (the current value) of the corresponding update flag from the update management table 153. At this point, although the initial value may be "0", or "1", herein it will be supposed that it is "0". Next, the flag reversal section 161 reverses this initial value, and transmits (S805) the result "1" of this reversal to the flag log management section 143. In the flag log management section 143, the flag request section 153 receives the reversed result "1", and stores it in the memory. After the AP 141 has issued the flag control command, it issues a hypothetical updating command for the resource (which includes information specifying the record which is to be updated and the details of the updating and the like). This hypothetical updating command, although not shown in the figure, is passed over to the resource manager 149, and the resource manager 149, according to this hypothetical updating command, requests hypothetical updating from the resource which is the subject of updating; and, if the hypothetical updating of the designated record in this resource is successful, the resource manager 149 notifies the AP 141 of the success of the hypothetical updating.

Moreover, if any breakdown has occurred in the stages up to this hypothetical updating, since the aforesaid transaction is rolled back, all of the results of processing up to now are revoked, and the state before the start of transaction processing is restored.

Now, if the hypothetical updating has succeeded, the AP 141 next issues (S806) an actual updating (commit) command for the resource to the flag log management section 143. In the flag log management section 143, the first flag writing section 155 responds to the commit command, and writes (S807) the reversed result "1" which is stored in the memory along with the corresponding transaction ID and the identification code ID of the update flag into the flag log file 145.

Next, the first flag writing section 155 issues (S808) a flag update request to the update flag management section 151a. In the update flag management section 151a, the second flag writing section 163 responds to this flag update request and hypothetically updates (S809) the value of the corresponding update flag from its initial value of "0" to "1", and next issues an actual updating (commit) command to the resource manager 149, and, if the actual updating of the resource based upon this commit command is successful, actually updates (S810) the update flag to the reversed value "1". Moreover, it would also be possible to perform the step S809 after the flag reversal section 161 had reversed the flag. If a breakdown such as the system going down or the like occurs in the second server 140b and the actual updating in the resource has failed, then the resource manager 149 performs recovery procedure for itself, and rolls back the hypothetical updating of the resource from the AP 141, and moreover rolls back the update flag which has been hypothetically updated and returns it to its original initial value of "0".

In the flag log management section 143, the first flag writing section 155, after it has issued the flag update request, returns (S811) a processing result to the effect that the commit has been completed to the AP 141. With this, the transaction processing is terminated.

With this processing sequence, in response to the issuing of the commit command for the transaction, a value which corresponds to the success or the failure of the actual updating in the resource is recorded in the update flag which corresponds to the said transaction in the update management table 153, while on the other hand the expected value which the update flag should have if the actual updating in the resource has been successful is recorded in the flag log file 145. Accordingly, if the actual updating in the resource has been successful, then the actual value of the update flag and the expected value which is recorded in the flag log file 145 will agree with one another. However, if the actual updating in the resource has failed, then the actual value of the update flag and the expected value which is recorded in the flag log file 145 will mutually differ.

Moreover, although it is not so shown in the figure, during transaction processing the record in the resource which is the subject of updating is kept in the locked state in order to prevent access by any other transaction, and after the actual updating has succeeded is released into the unlocked state, while on the other hand if the actual updating fails then the locked state is maintained continuously hereafter. Correspondingly to this, if the actual updating has failed, in an identical manner the update flag which has been allocated to the said transaction is maintained in the locked state continuously hereafter, so that it can no longer be allocated to any subsequent transaction. As a result, the mutual difference which has occurred during the failure of actual updating between the actual value of the update flag and the expected value in the flag log file 145 is maintained continuously hereafter, only if any recovery procedure for this transaction (repetition or rollback of the actual updating) has not been performed. Accordingly, after the breakdown has been repaired, by detecting this mutual difference, it is possible to discover whether for any record the updating has not yet been executed, and if so for which.

Figure 38:
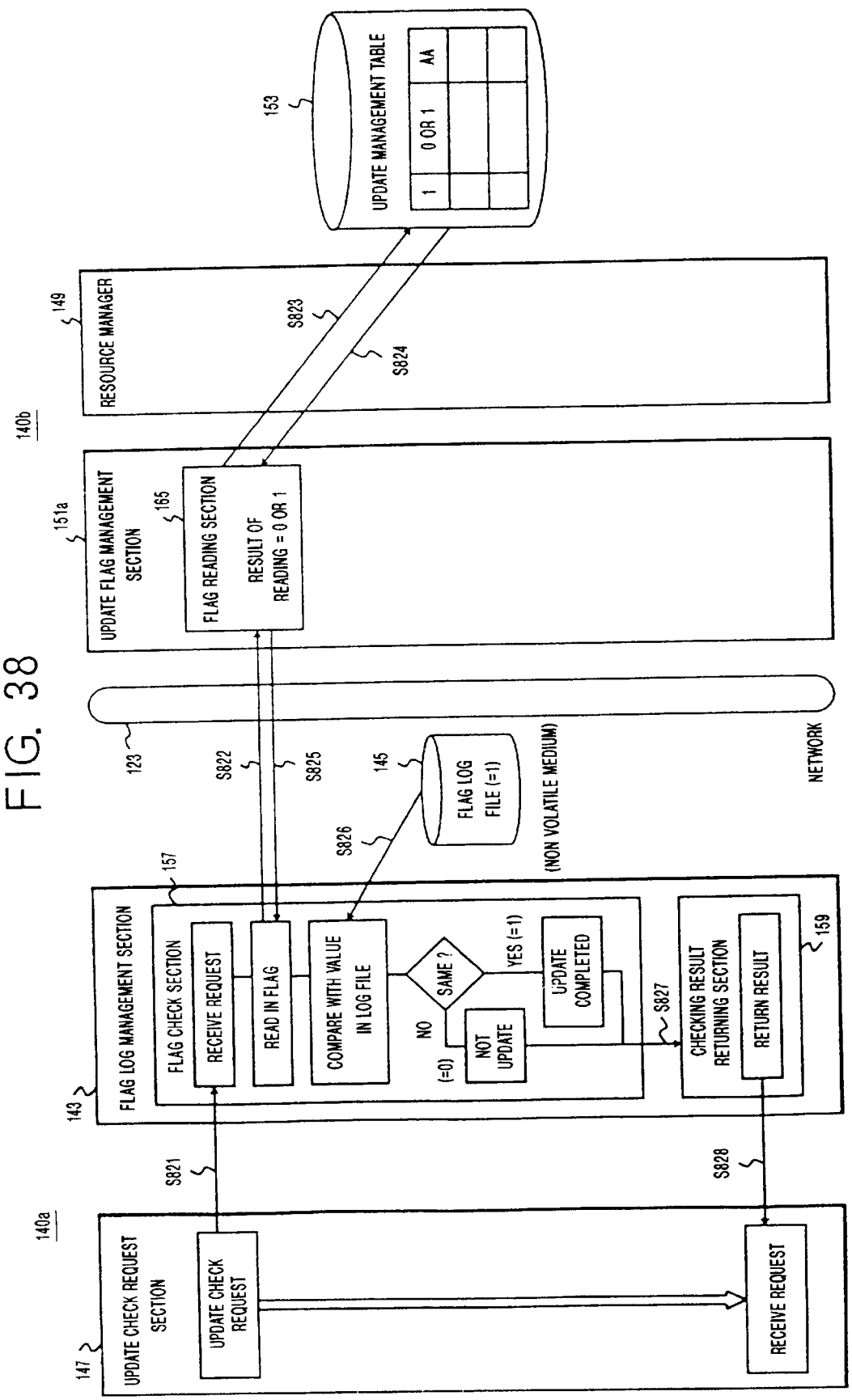
FIG. 38 is a flow chart showing the operation of the fifth embodiment when a breakdown has been repaired.

FIG. 38 is a flow chart showing the flow of processing if a breakdown has occurred, after the breakdown has been repaired.

As shown in FIG. 38, when the breakdown is repaired, first, the update check request section 147 issues a request for update checking to the flag log management section 143. In the flag log management section 143, when the flag check section 157 receives this request, it issues flag read requests (S822) to each of the update flag management sections 151a, 151b, and 151c, using the transaction ID and the update flag ID which it has read out from the flag log file 145.

Upon receipt of these flag read requests, in each of the update flag management sections 151a, 151b, and 151c, a flag read section 165 reads in (S823, S824) the value of the update flag from the update management table 153. At this time, if the received transaction ID and the transaction ID read out from the update management table 153 are the same, this means that actual updating was taking place at the time the breakdown occurred; while, on the other hand, if they are different, this means that the transaction was completed, and of course the actual updating was completed as well. From the result of this comparison, each of the update flag management sections 151a, 151b, and 151c determines whether or not the transaction which was in the process of actual updating at the time that the breakdown occurred was the one which was allocated to itself, and if it was the one which was allocated to itself (in the example shown in the figure, the update flag management section 151a corresponds to this), then sends the value of the update flag which was already read in to the flag log management section 143 (S825).

In the flag log management section 143, the flag check section 157 receives the value of the update flag which has been sent from the update flag management section 151a, and reads in (S826) the value of the corresponding update flag from the flag log file 145, and compares the two together. If the result is that they agree, then it is checked that the execution of the actual updating is completed, while if they mutually differ then it is checked that the actual updating is not yet completed; and this checking result is transferred (S827) to the checking result returning section 159.

The checking result returning section 159 sends (S828) this result of checking to the update check request section 147, and the update check request section 147 determines whether the execution of the actual updating is completed or is not yet complete from this checking result. An appropriate recovery procedure is performed based upon this checking result, although this is not shown in the figure.

As described above, in this embodiment, it is determined whether or not the actual updating of the resource has been executed by using update flags which take two values. These update flags are not provided for each record in the resource individually, but for each of the update flag management sections 151a, 151b, and 151c individually; in other words, are provided for each of the individual transactions which are processed in parallel. Due to this, the update management table 153 by comparison with the ones of the prior art becomes a simple item of much smaller size, and also the flag log file 145 which corresponds to it in the same manner becomes a simple item of small size, and the access procedures to these items also become simple. Further, since in the present embodiment the flag log management section 143 and the update check request section 147 are provided separately from the AP 141, thereby it is not necessary for the AP 141 to manage the execution or non execution of resource updating, and the structure of the AP 141 program becomes simple.

Moreover, the procedure described above for determination of whether or not the resource has actually been updated can be implemented both in the case that closed transaction processing is performed within a single processing device, and also in the case that a plurality of processing devices manage a resource in a distributed manner and thereby perform distributed processing of transactions.

6.6 The Sixth Embodiment

Generally, when searching out the item of log data for a specific transaction during the recovery procedure, it is very important to search out the target log item from a huge log file speedily.

As a method of searching out items of log data with the intention of increasing the speed of search, there is known, for example, the method of Japanese Patent Laying Open Publication Serial No. Heisei 3-202956. With this prior art method, apart from the main body of the log file, there is provided a small sized index file in which is recorded a time stamp for each item of log data. It is possible to find the subject item of log data at high speed by referring to this index file.

Further, a similar method is also disclosed in Japanese Patent Laying Open Publication Serial No. Heisei 4-190454. With this method, within the log file there is provided a subfile in which are stored time stamps and header pointers for groups of log data which correspond to these time stamps. It is possible to find the subject item of log data at high speed by taking advantage of this subfile.

However, there are transaction processing systems in which only log data for transactions which have been committed are stored, while log data for transactions which have been rolled back are not stored. With this type of system, if the result of searching for the item of log data for a specified transaction is that it has not been discovered anywhere in the log file, then it is decided that the said transaction is one which has been rolled back, and that this transaction is beyond the scope of recovery, for example.

If an item of log data which is not present in the file is the object of search in this manner, then it is necessary to search the entire file in order to be apprised of the fact that this log data is not present. Accordingly, it is necessary to search the entire extent of the file in the event that the time stamp of the item of log data which is the object of search is not present within the file, even if for example the above described prior art is employed. As a result, the problem occurs that the search time becomes long.

Furthermore, searching the entire extent of the file increases the load upon the disk device on which the file is stored. Also, since access to the disk upon which this file is stored is greatly limited while the file is being searched, accordingly when transactions have been executed at the same time the response time for these transactions becomes long, and the throughput of the entire system is considerably deteriorated.

In the sixth embodiment of the present invention explained in the following, if an item of log data which is not present in the log file is the object of search, then it is possible to check that this item of log data is not present in a short time period without searching the entire log file.

Figure 39:
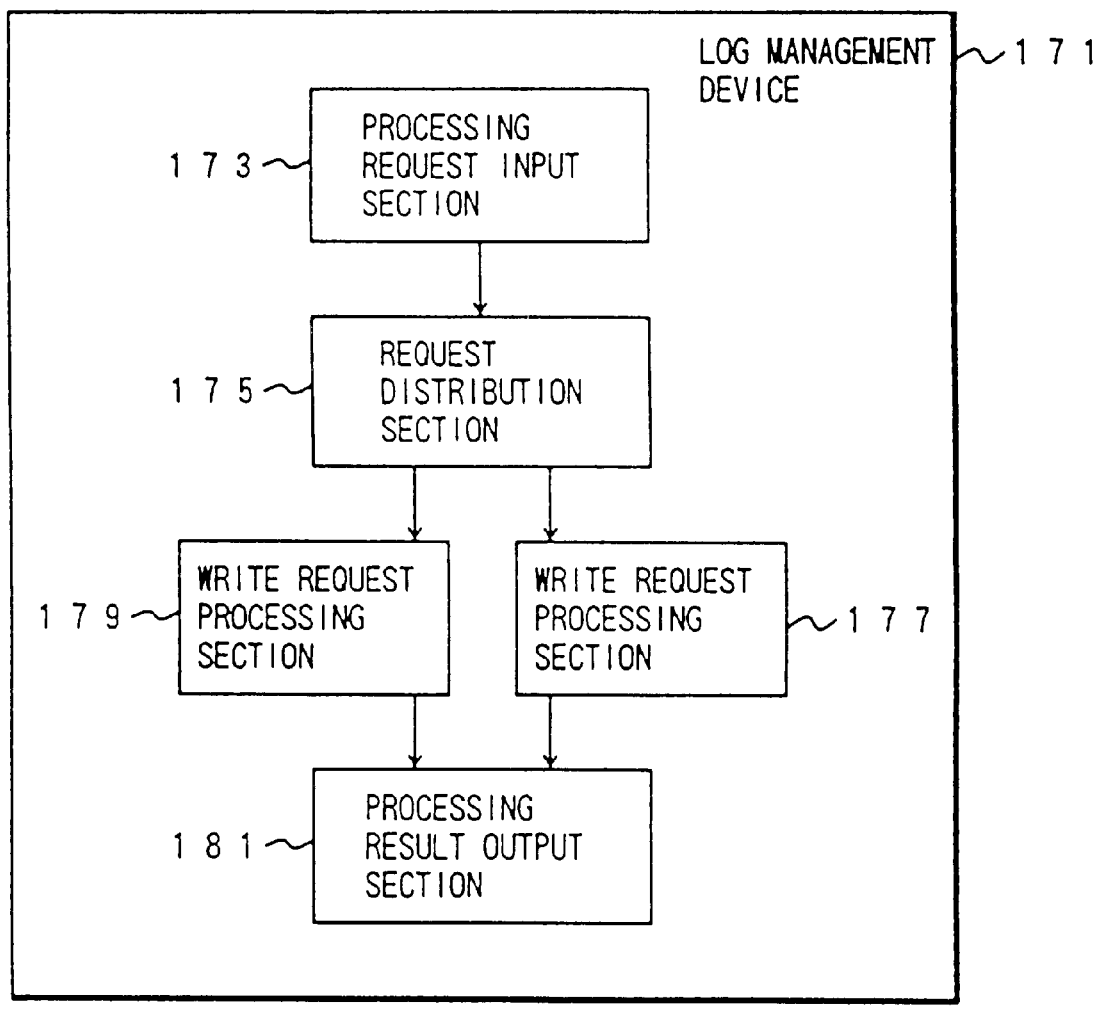
FIG. 39 is a block diagram showing the structure of a sixth embodiment of the present invention.

FIG. 39 shows the structure of an embodiment of a log processing device to which the log search method of the present invention has been applied.

This log management device 171 manages a log file which is stored upon a disk device which is not shown in the figures. Items of log data for transactions which have been processed in the past are accumulated in time sequence in the log file. Moreover, for the convenience of explanation this log management device 171 is shown as though it were a single independent hardware device, and although of course it may be thus constituted, in fact preferably it is a functional element realized by a program which constitutes a portion of the transaction processing system, the load of which may fall upon a single hardware device or may be distributed between a plurality of hardware devices.

Now, this log management device 171 receives at a processing request input section 173 thereof log write requests and log read requests from external transaction processing devices not shown in the figure. Here, by a log write request is meant a request to write in the log file an item of log data for a transaction which has been newly processed, and this request includes at least an identification code for this transaction and the details of an update for the resource which has been performed in this transaction. Further, by a log read request is meant a request to search out from the log file an item of log data for a specific transaction and to read it out to the outside, and this request includes at least an identification code for this transaction.

The log write requests and the log read requests which have been received are distributed according to type by a request distribution section 175, and the log write requests are sent to a write request processing section 177, while the log read requests are sent to a read request processing section 179.

The write request processing section 177 constructs items of log data in a predetermined format based upon the log write requests, and writes them into the log file. The read request processing section 179 searches the log file for items of log data which are designated based upon the log read requests and reads them out therefrom.

A processing result output section 181 receives the processing results from the write request processing section 177 and from the read request processing section 179, and returns the results to the transaction processing devices which originated the requests.

Figure 40:
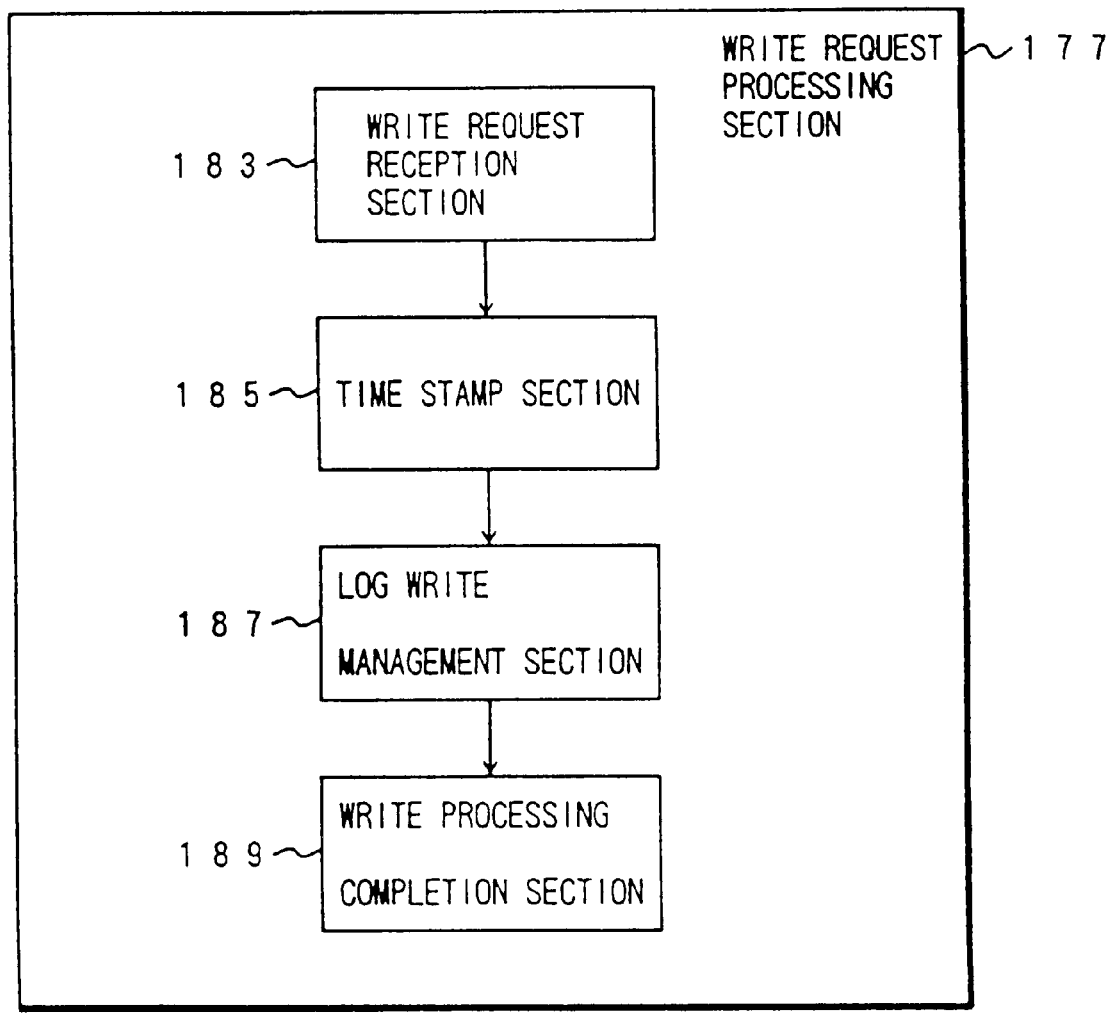
FIG. 40 is a block diagram showing the structure of a log write request processing section of the sixth embodiment.

FIG. 40 shows the structure of the write request processing section 177.

A write request reception section 183 receives the log write request, allocates to it a log number which is peculiar for the item of log data, and transfers it to a time stamp section 185. The time stamp section 185 constructs an item of log data in a specific format based upon the log write request, and then adds to the item of log data a time stamp which shows the time at the present time point.

A log write management section 187 writes the item of log data which was made by the time stamp section 185 in the log file. At this time, since past log data are arranged in time sequence in the log file, the new item of log data is appended to the latest end of this sequence. A write processing completion section 189 checks that the writing of the item of log data has been completed, and along with outputting the completion result terminates the operation of this write request processing section 177.

FIG. 41 is for explaining the procedure of the time stamp section 185 in concrete terms.

FIG. 41(A) shows the transaction identification code 600 which is included in the log write request. This transaction identification code is produced by an external transaction processing device, and includes a transaction number which is specific to this transaction and a time stamp which shows the instant that this transaction was started.

FIG. 41(B) shows the log data item 700 which the time stamp section 185 constructed based upon the log write request. In this log data item 700, apart from the reproduction 703 of the details (not shown in the figure) of the resource updating and the transaction identification code 600 (FIG. 41(A)) which were acquired from the log write request, there is also included a log data item identification code 701 which was added by the time stamp section 185.

In this log data item identification code 701 there are included the log number which is specific to this item of log data which was allocated by the write request reception section 183, and the time stamp which was allocated at this processing time point by the time stamp section 185. This time stamp in practice shows the instant of writing this item of log data, and naturally it is an instant of time somewhat later than the instant (the instant of starting the transaction) of the time stamp within the transaction identification code 703 (600).

The items of log data of format as shown in this FIG. 41(B) are accumulated in time sequence in the log file.

Figure 42:
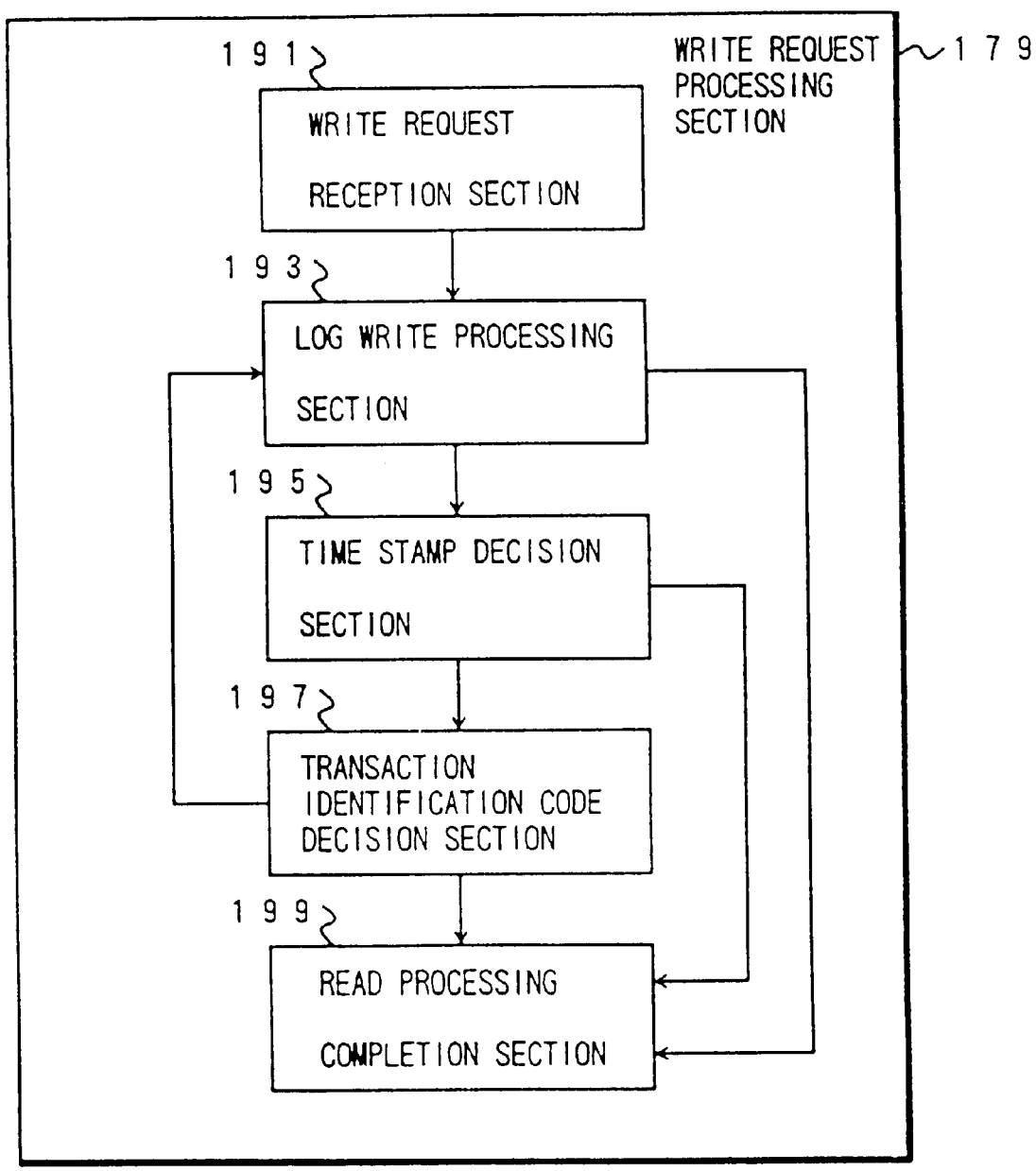
FIG. 42 is a block diagram showing the structure of a log read request processing section of the sixth embodiment.

FIG. 42 shows the structure of the read request processing section 179.

A write request reception section 191 receives the log read requests and notifies a log write processing section 193 thereof.

The log write processing section 193 first reads out from the log file the item of log data at the latest end (in other words, the one whose instant of writing is the most recent). Next, if it receives a notification from a transaction identification code decision section 197 described hereinafter to the effect that the transaction identification code is not in agreement, the log write processing section 193 reads in the next most recent item of log data. By doing this, the log write processing section 193 reads in the items of log data in sequence of lateness of write instant from the latest end of the log file towards its head.

A time stamp decision section 195 compares the time stamp in the log data item identification code 701 in the item of log data which has been read in by the log write processing section 193 with the time stamp of the transaction identification code 600 in the log read request. If the result of this is that the time stamp in the log data item identification code 701 (the instant of writing the item of log data) is later than the time stamp of the transaction identification code 600 (the instant that the transaction was started), then the transaction identification code decision section 197 is asked for transaction identification code decision processing; while, on the other hand, if the instant of log writing is not earlier than the transaction start instant, then the read processing completion section 199 is notified to that effect.

When the transaction identification code decision section 197 receives the above described request from the time stamp decision section 195, it compares the transaction identification code 703 in the item of log data which was read in by the log write processing section 193 with the transaction identification code 600 in the log read request. If the result of this is that both the transaction identification codes 703 and 600 do not agree, then this fact is transmitted to the log write processing section 193, while if they do agree then the read processing completion section 199 is notified to this effect.

The read processing completion section 199, if the above described notification to the effect of not later has been received from the time stamp decision section 195, deems that the item of log data which is the object of search is not present in the log file, and, along with outputting this decision result, terminates the operation of the read request processing section 179. On the other hand, if the above described notification to the effect of agreement has been received from the transaction identification code decision section 197, then along with outputting the item of log data which was read in by the log write processing section 193 as the search result, it terminates the operation of the read request processing section 179.

Figure 43:
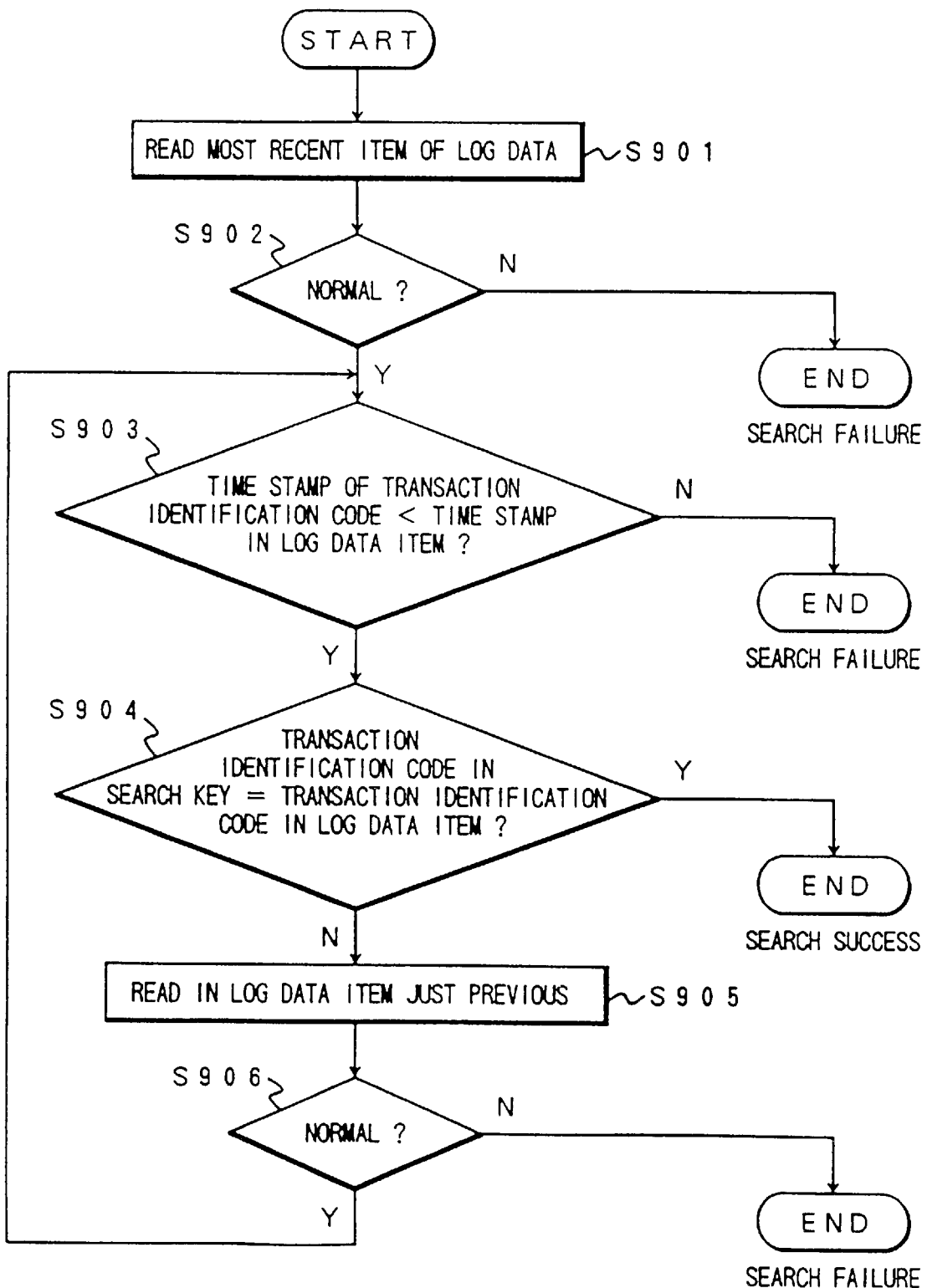
FIG. 43 is a flow chart showing the operation of the log read request processing section of the sixth embodiment.

FIG. 43 shows the flow of the operation of the read request processing section 179 which was shown in FIG. 42.

When a log read request is received, the read request processing section 179 performs a search operation like that described below using this log read request which has been received in the search key.

First, the item of log data at the latest end of the log file is read (S901). At this time, if normal reading is not possible (S902), the processing is terminated as an error during searching.

If the item of log data has been read in normally, next the time stamp (the instant that the transaction was started) in the transaction identification code 600 in the search key and the time stamp (the instant of log writing) in the log identification code 701 in the log data item which was read in are compared (S903). Since the instant that the transaction was started is certainly earlier than the instant of writing its item of log data, in the event that it appears that the result of this comparison is that the transaction start instant is not earlier than the instant of log writing, then the processing is terminated as an error during searching.

On the other hand, if it appears that the result of the above described comparison is that the transaction start instant is earlier than the instant of log writing, then next the transaction identification code 600 in the search key and the transaction identification code 703 in the item of log data which has been read in are compared (S904). If the result of this is that they agree, then this item of log data is output and the processing is terminated as a successful search.

If the transaction identification codes do not agree, then the item of log data one earlier is read out (S905). If at this time it is not read out normally then the processing is terminated as an error during searching, while if it is read out normally then the checks in the step S903 and in the step S904 are again performed for this item of log data.

By the above operation, the search for the log data item is performed only over the range of the items of log data for which the instant of writing is later than the instant of starting the transaction which is the subject of being read in, and the search over the range of the items of log data for which the instant of writing is earlier than the instant of starting the transaction is omitted. Accordingly, it becomes unnecessary to search the entire range of the log file even if the object of reading in is an item of log data which is not present in the file, and the search is completed within a short time period.

Further, since the range of searching in the log file is limited to only a portion of the range, thereby the load on the disk device upon which the log file is stored is also lightened. Also, if a transaction is executed during the search, the response time for the said transaction, and the throughput, are enhanced.

Now, the search method of the above described embodiment can also be applied to searching with an index file such as was disclosed in Japanese Patent Laying Open Publication Serial No. Heisei 3-202956, or to searching with a subfile such as was disclosed in Japanese Patent Laying Open Publication Serial No. Heisei 4-190454. That is to say, in the index file or in the subfile, only the range is searched for which the time stamp is later than the time instant which is shown in the search key. By doing this, it is all the more possible to complete the shortening of the time period required for the search.

We claim:

1. A cooperative type distributed system, comprising a plurality of processing devices which can mutually intercommunicate to perform distributed processing of transactions in a cooperative manner, and a resource which is distributed over said plurality of processing devices; characterized in that:

at least one of said plurality of processing devices is a coordinator for receiving transactions, and the other processing devices are participants for performing distributed processing of the received transactions;

said coordinator comprises; an update information issuing means for issuing to said participants items of update information for said distributed resource related to each transaction which have been received in said coordinator and means for assuming that each transaction has been committed after issuing said items of update information relating to each transaction without any dependence upon success or failure of actual updating of said distributed resource by said participants;

one of said coordinator and said participants comprises a log file which records all said items of update information which have been issued by said coordinator, an identification code for the transaction corresponding to each of said items of update information being appended to each of said items of update information; and each of said participants comprises:

an actual updating means for updating said distributed resource in response to said items of update information; and a recovery means for specifying the transaction performed in the past at which said actual updating means has failed in the updating of said distributed resource, for acquiring from said log the item of update information to which is appended the identification code of said transaction which has been specified, and for updating said distributed resource according to said item of update information which has been acquired.

2. A cooperative type distributed system according to claim 1, characterized in that each of said plurality of distributed devices comprises said update information issuing means, said log, said actual updating means, and said recovery means; and thereby each of said distributed devices can become both of said coordinator and said participant.

3. A cooperative type distributed system according to claim 1, characterized in that said coordinator comprises said log.

4. A cooperative type distributed system according to claim 1, characterized in that each of said participants further comprises:

an exclusion control means for locking said distributed resource before updating said distributed resource and for unlocking said distributed resource after updating said distributed resource, and a lock/unlock log for recording a history of locking and unlocking said distributed resource;

wherein said exclusion control means can lock and unlock each record in said distributed resource.

5. A cooperative type distributed system according to claim 1, characterized in that each of said participants further comprises:

an exclusion control means for locking said distributed resource before updating said distributed resource and for unlocking said distributed resource after updating said distributed resource, and a lock/unlock log for recording a history of locking and unlocking said distributed resource, the identification code of the transaction corresponding to each item of this history being appended to said each item of this history;

wherein said recovery means refers to said lock/unlock log to specify said transaction in the past at which said actual updating means has failed.

6. A method for performing distributed processing of transactions in a cooperative manner among a plurality of processing devices over which a resource is distributed and which are capable of mutual signal transmission, said method comprising:

the step in which one from among said plurality of processing devices acts as a coordinator to receive a transaction;

the step in which said coordinator issues, to other processing devices which act as participants, items of update information for said distributed resources relating to said transaction which has been received;

the step in which one of said coordinator and said participants stores in a log all of said items of update information which have been issued from said coordinator, an identification code of the transaction corresponding to each of said items of update information being appended to each of said items of update information;

the step in which said coordinator assumes that said transaction has been committed after issuing said items of update information relating to said transaction without any dependence upon success or failure of actual updating of said distributed resources by said participants;

the step in which each of said participants responds to said items of update information and updates said distributed resource; and the step in which each of said coordinator and said participants specifies a past transaction at which the updating of said distributed resource in each of said devices was failed, acquires from said log the item of update information to which the identification code of the specified transaction is appended, and updates said distributed resource according to said acquired item of updating information.

7. A system for performing distributed processing of transactions among a plurality of processing devices which are capable of mutual signal interchange, comprising:

a resource which is managed by at least one of said processing devices, wherein each of at least two of the processing devices comprises:

a means for issuing updating commands for updating said resource, and a log for accumulating items of log data relating to the updating commands which said each of at least two of the processing devices has been issued;

wherein the processing device which manages said resource comprises;

a log data item request means for requesting the items of log data which are necessary for the recovery processing of said resource from each of the processing devices which comprises said log, and a recovery means for receiving said items of log data which have been requested from each of the processing devices which comprises said log, and for executing actual updating of said resource according to said items of log data which have been received; and wherein each of the processing devices which comprises said log further comprises:

a log data item signal sending means being responsive to said request from said log data item request means, for searching out requested items of log data from said log, and for sending searched out items of log data to the processing device which manages said resource.

8. A system according to claim 7, characterized in that each of the items of log data in said log shows an image of said resource after updating, and said recovery means updates said resource based only upon the most recent one of the items of log data relating to said resource.

9. A system according to claim 7, characterized in that the processing device which manages said resource further comprises a lock log for accumulating a history of lock processing of said resource, and said log data item request means specifies the items of log data which are necessary for said recovery processing based upon said lock processing history in said lock log.

10. A system according to claim 7, characterized in that the processing device which manages said resource further comprises a lock log for accumulating a history of lock processing of said resource, and said log data item request means specifies the most recent one of the items of log data for said resource based upon the latest history of lock processing in said lock log, and requests said most recent one of the items of log data from each of the processing devices which comprises said log.

11. In a system in which a plurality of processing devices which are capable of mutual signal transmission perform distributed processing of transactions, a recovery processing method for a resource which is managed by a single processing device, comprising:

the step, for each of at least two of the processing devices, of managing a log which accumulates items of log data relating to updating commands for updating said resource which said each of at least two of the processing devices have issued;

the step, for the processing device which manages said resource, of requesting the items of log data which are required for recovery processing of said resource, from each of the processing devices which manages said log;

the step, for each of the processing devices which manages said log, of extracting from said log the items of log data which have been requested from said processing device which manages said resource, and of sending the items of log data which have been extracted to the processing device which manages said resource; and the step, for the processing device which manages said resource, of executing updating of said resource based upon the items of log data which have been sent from each of the processing devices which manages said log.

12. In a transaction processing system, a device for determining whether or not actual updating of a resource for a transaction has been executed, comprising:

an update flag allocated to a transaction which is being processed by said system;

a flag log file for recording the history of said update flag;

a flag writing section for reading an initial value of said update flag, and for writing in said flag log file a value reversed from said initial value in response to a commit command which has been issued from said system;

a flag management section for reversing said update flag when actual updating of said resource has been executed based upon said commit command;

an update checking request section for issuing a request for checking whether or not said actual updating has been executed; and a flag check section for, in response to said request, checking whether or not the actual updating of the resource has been executed, by comparing the value of said update flag and said reversed value in said flag log file.

13. In a transaction processing system, a method for determining whether or not actual updating of a resource has been executed for a transaction, comprising:

the step of allocating an update flag to a transaction which is being processed by said system;

the step of writing in a flag log file the reversed value of an initial value of said update flag, in response to a commit command which has been issued from said system;

the step of reversing said update flag along with the execution of actual updating of said resource based upon said actual updating command;

the step of issuing a request for checking whether or not actual updating of said resource has taken place; and the step of checking, in response to said request, whether or not said actual updating has been executed, by comparing the value of said update flag and said reversed value in said flag log file.

* * * * *